US012802066B2

(12) United States Patent
Dolev et al.

(10) Patent No.: US 12,802,066 B2
(45) Date of Patent: Nov. 17, 2026

(54) SYSTEM AND METHOD FOR FAST, POST-QUANTUM BLOCKCHAIN CONCENSUS GENERATION AND SMART CONTRACTS EXECUTION

(71) Applicant: B.G. NEGEV TECHNOLOGIES AND APPLICATIONS LTD., AT BEN-GURION UNIVERSITY, Beer Sheva (IL)

(72) Inventors: Shlomi Dolev, Omer (IL); Ziyu Wang, Beer Sheva (IL)

(73) Assignee: NEGEV TECHNOLOGIES AND APPLICATIONS LTD., AT UNIVERSITY BEN-GURION, Beer Sheva (IL)

( * ) Notice: Subject to any disclaimer, the term of this patent is extended or adjusted under 35 U.S.C. 154(b) by 482 days.

(21) Appl. No.: 17/997,242

(22) PCT Filed: Apr. 27, 2021

(86) PCT No.: PCT/IL2021/050491
§ 371 (c)(1),
(2) Date: Oct. 26, 2022

(87) PCT Pub. No.: WO2021/220278
PCT Pub. Date: Nov. 4, 2021

(65) Prior Publication Data

US 2023/0186293 A1 Jun. 15, 2023

Related U.S. Application Data

(60) Provisional application No. 63/072,173, filed on Aug. 30, 2020, provisional application No. 63/061,815,
(Continued)

(51) Int. Cl.
*G06Q 20/38* (2012.01)
*G06Q 20/40* (2012.01)
(Continued)

(52) U.S. Cl.
CPC ....... *G06Q 20/3825* (2013.01); *G06Q 20/389* (2013.01); *G06Q 20/401* (2013.01);
(Continued)

(58) Field of Classification Search
CPC ............. G06Q 20/3825; G06Q 20/389; G06Q 20/401; H04L 9/50; H04L 9/085; H04L 9/0852; H04L 9/3218; H04L 2209/46
See application file for complete search history.

(56) References Cited

U.S. PATENT DOCUMENTS

2017/0324551 A1* 11/2017 Ahn ...................... H04L 9/0855
2019/0058581 A1* 2/2019 Wood .................... H04L 9/3239
(Continued)

FOREIGN PATENT DOCUMENTS

WO WO-2012122994 A1 * 9/2012 ............. G06F 21/45
WO WO-2019116248 A1 * 6/2019 ........... H04L 63/166
WO WO-2020061593 A1 * 3/2020 ......... H04L 63/0442

OTHER PUBLICATIONS

PCT International Search Report and Written Opinion for International Application No. PCT/IL2021/050491, dated Aug. 31, 2021, 11 pages.

(Continued)

*Primary Examiner* — Neha Patel
*Assistant Examiner* — Davida Lee King
(74) *Attorney, Agent, or Firm* — Nathan & Associates; Menachem Nathan

(57) ABSTRACT

A system for performing real-time quantum-safe computation of a digital transaction using in a blockchain consensus protocol, comprising a plurality of permissioned verification servers being a plurality of distributed participants that are adapted to create common randomization to all of said participants which remains unrevealed until being used by
(Continued)

said participants, by assigning to each participant a unique polynomial having a maximal degree being common to all participants; allowing each participant to select a random value; allowing each participant to send his selected random value to all other participants using a secret sharing scheme based on points on his unique polynomial, such that said secret hides the details of said selected random value and all other participants that receive shares of said selected random value will not be able to reconstruct said selected random value from the received shares; create a pool of all shares of all participants; build a quantum-safe consensus of honest participants, in rounds, by sharing symmetric keys between participants before a consensus round and recovering said keys after each consensus round; during each round, generate common random coins for which a consensus has been obtained, from shares belonging to at least one honest participant in said round, and locking new created coins by a quantum-safe asynchronous Byzantine Fault Tolerance (aBFT)-based blockchain consensus protocol, while the consensus itself provides the consensus ability on transactions in Block(s) for said aBFT protocol; at the end of each round, validate said transaction using the locked common random coin and revealing the secret to all participants.

20 Claims, 23 Drawing Sheets

Related U.S. Application Data filed on Aug. 6, 2020, provisional application No. 63/045,856, filed on Jun. 30, 2020, provisional application No. 63/015,691, filed on Apr. 27, 2020.

(51) Int. Cl.
*H04L 9/00* (2022.01)
*H04L 9/08* (2006.01)
*H04L 9/32* (2006.01)

(52) U.S. Cl.
CPC ............ *H04L 9/085* (2013.01); *H04L 9/0852* (2013.01); *H04L 9/3218* (2013.01); *H04L 9/50* (2022.05); *H04L 2209/46* (2013.01)

(56) References Cited

U.S. PATENT DOCUMENTS

2019/0312727 A1* 10/2019 Del Pino ............... H04L 9/3093
2020/0394471 A1* 12/2020 Ganapavarapu ......... G06N 3/08

OTHER PUBLICATIONS

Sun et al., "Towards Quantum-Secured Permissioned Blockchain: Signature, Consensus, and Logic", Entropy, 2019, 21, 887, 15 pages.
Seet et al., "Quantum Consensus," IEEE, Asia-Pacific Conference on Computer Science and Data Engineering, 2019, pp. 1-8.
Fernandez-Carames et al., "Towards Post-Quantum Blockchain: A Review on Blockchain Cryptography Resistant to Quantum Computing Attacks," IEEE Access, vol. 8, 2020, pp. 21091-21116.
Bitan et al., "Optimal-Round Preprocessing-MPC of Polynomials over Non-Zero Inputs via Distributed Random Matrix," Association for Computing Machinery, vol. 1, No. 1, Article, Publication date: Nov. 2020, 20 pages.

* cited by examiner

| state\input | Q=00 | Q=01 | Q=10 | Q=11 |
|---|---|---|---|---|
| $P_{equal}=00$ | equal | small | great | equal |
| $P_{small}=01$ | small | small | small | small |
| $P_{great}=10$ | great | great | great | great |

| state\input | Q=00 | Q=01 | Q=10 | Q=11 |
|---|---|---|---|---|
| $P_{nCarry}=0$ | nCarry,0 | nCarry,1 | nCarry,1 | carry,0 |
| $P_{carry}=1$ | nCarry,1 | carry,0 | carry,0 | carry,1 |

SYSTEM AND METHOD FOR FAST, POST-QUANTUM BLOCKCHAIN CONCENSUS GENERATION AND SMART CONTRACTS EXECUTION

FIELD OF THE INVENTION

The present invention relates to the field of cyber security. More particularly, the invention relates to a system and method for performing real-time quantum-safe computation to support fast, post-quantum blockchain consensus and smart contracts execution, without using quantum sensitive cryptographic functions.

BACKGROUND OF THE INVENTION

Permissioned blockchains (a blockchain is a growing list of records, called blocks, that are linked using cryptography. Each block contains a cryptographic hash of the previous block, a timestamp, and transactions data. A blockchain is resistant to modification of its data, since once recorded, the data in any given block cannot be altered retroactively without the alteration of all subsequent blocks) employ Byzantine Fault-Tolerance (BFT—is the property of a system that is able to continue operating even if some of the nodes fail or act maliciously) protocols as their consensus cores to reach an agreement of ordered transactions without trusting a centralized authority [30]. The increasing popularity of blockchains has renewed interest in BFT protocols, especially in asynchronous BFT (aBFT) protocols that do not rely on any message transferred time upper bound. Several aBFT protocols such as HoneyBadger [34] and Dumbo [25], which solve an Asynchronous Common Subset (ACS) [6] of block parts generated from all participants are known.

Honeybadger [34] is the first practical aBFT for blockchains using n randomized Binary Byzantine Agreement (BBA) instances in parallel to make participants one-by-one agree on whether a block part is accepted, which is named as the BBA-ACS architecture. In contrast, Dumbo leverages a Multi-Value Byzantine Agreement (MVBA) protocol instance to replace the n BBA instances in Honeybadger, which is referred to as the MVBA-ACS architecture.

MVBA only requires a constant number of BBA rounds (rather than 0 (logn) rounds in Honeybadger) to output a consistent block. Both BBA-ACS and MVBA-ACS architectures are two main practical paths to achieve an aBFT protocol.

Unfortunately, the security of these state-of-the-art aBFT protocols is threatened by quantum computers [38, 40]. For example, Honeybadger instantiates necessary randomness sources via quantum-sensitive threshold signature, and adopts quantum-sensitive threshold encryption for anti-censorship. Dumbo also relies on the quantum-sensitive threshold signature scheme to design the MVBA external validity predicate. As these cryptography components depend on the discrete logarithm (Dlog) math intricate problem, these protocols will be broken by Shor's quantum algorithm in a polynomial time by a quantum computer [38]. Although the current quantum computer is not mature to apply Shor algorithm, many blockchain platforms have begun the studies of post-quantum secure protocols [19, 22], which also motivates us to design a post-quantum secure (i.e. being quantum-safe) framework for asynchronous blockchain consensus protocols, i.e., aBFT protocols. Also, blockchain applications like global payment usually have requirements for performance (i.e., low latency and high throughput).

Supporting smart contracts (computer programs or transaction protocols, which are intended to automatically execute, control or document legally relevant events and actions according to the terms of a contract or an agreement. They typically run on a blockchain) has become one of the most attractive properties of blockchain besides decentralization. In Ethereum [13], each contract could be executed by a miner according to the contract code. After calculating the final state, the miner packages several contract results, i.e., the updated blockchain state, as a block, and propagate this block. Other miners recognize this block after verifying whether the block creator follows the contract code. The deterministic contract executing result ensures a consistent blockchain state updating. However, the public verifiable contract execution reveals the user anonymity and privacy in a contract including: (1) who joins a contract? (2) what is the business logic of a contract? (3) what intermediate data is in a contract? The user anonymity problem is not limited to a smart contract. The Blockchain publishes all transaction history, which reveals the payer and payee's identity for all transactions including the users who interact with a contract. Mixing technology is one of the solutions to break the linkage connections between blockchain pseudonyms and protects the payer and the payee's identities.

Several permissionless blockchain private contract systems [10, 12, 30] cope with the contract privacy problem relying on Zero-Knowledge Proof (ZKP—a protocol by which one party (the prover) can prove to another party (the verifier) that they know a value x, without conveying any information apart from the fact that they know the value x). In these systems, contract users off-chainly execute the contract (with or without privacy protection). Then, the execution result proof is included in the blockchain, which may not reveal the contract executions. However, most deployed ZKP schemes are not quantum-safe in private contract systems [10, 12, 30].

A permissioned blockchain consensus relies on the Byzantine fault-tolerance algorithm executed by n servers. In this architecture, it is possible to require these servers to execute contract-oriented MPC programs so that the contract execution correctness and data privacy are obtained. Compared with some Trusted Execution Environment (TEE—a secure area of a main processor) based private smart contract systems [15], MPC protocols can be deployed over standard computers without extra requirements for special hardware. Most deployed Ethereum contracts (decentralized, open-source blockchains with smart contract functionality) are financial-oriented [27] and do not have very complicated logic. Besides, the current preprocessing MPC protocols show that executing millions of multiplication gates can be completed in a reasonable time [16]. Most efficient MPC protocols are "secure-with-abort" against malicious adversaries. If the contract execution correctness and data privacy are based on the MPC correctness and privacy, aborting and re-running may bring more financial disagreements and leak client inputs. In some sense, robustness is the combination of fairness (there is no case in which malicious servers know the MPC result while other honest servers do not) and guaranteed output delivery (an MPC must output the desired result regardless of the Byzantine behavior) [31]. Non-robust preprocessing may require non-constant rounds to reset when there are malicious servers [17]. [1] However, some client-enhanced MPC protocols like Blinder [1] offload the computational burden to the contract users.

Secure and private distributing computation in cloud computing is a key application area of MPC. Dolev et al. [2, 21-23] have accomplished many computation functionalities based on the shared secrets in cloud servers. However, these computation models (universal Turing machine [21], automata [22], one instruction computer set [23]) are not designed to efficiently fit MPC-based contracts, which requires intensive condition checks.

A finite state machine (is an abstract machine that can be in exactly one of a finite number of states at any given time. The FSM can change from one state to another in response to some inputs; the change from one state to another is called a transition. An FSM is defined by a list of its states, its initial state, and the inputs that trigger each transition) better suits the contract application, since a transition in a state machine must be under a specific condition and a contract requires intensive condition checks. Also, an FSM can be blindly computed by an MPC protocol [20]. Besides, the FSM pattern is recommended by the most popular contract coding language, Solidity [36]. Mavridou and Laszka create an FSM contract language to decrease the number of Solidity implemented flaws in Ethereum. A contract is first designed as an FSM, which can be automatically compiled to a Solidity contract.

Quantum-safety Requirement. MPC-based contracts also reflect a security advantage in the upcoming quantum era. Most MPC protocols are perfect or statistic Information-Theoretical (I.T.), which can be proved to resist an adversary who has unbound computation power including a quantum adversary. In practice, some symmetric cryptography schemes (like AES or SHA) are computational, but still are believed to be quantum-safe if the security parameter is well-tuned, which enhances some I.T. schemes in the efficiency aspect.

Two cases must be avoided to make sure that a correct ZKP could be reconstructed from generated ZKP shares. First, one should avoid a piece of significant information to be controlled by a single participant, so that even at most t participants collude (e.g., provide incorrect information) or crash (refuse to provide the necessary information), the ZKP generation will not be disturbed. Second, one should avoid information leakage from each ZKP share. At most t malicious participants should learn nothing on the witness (or circuit internal values) after combining their circuit shares with an exposed ZKP share. Hence, each ZKP share should imply zero knowledge, namely, no information (that should be kept private) exposure.

Another existing method for performing quantum-safe computation is using cryptographic functions. However, such cryptographic functions are not information theoretically secure and also require relatively long processing time.

It is therefore an object of the present invention, to provide a system and method for performing real-time quantum-safe computation to support delegated multi-provers, without using cryptographic functions.

It is another object of the present invention, to provide a system and method for performing real-time quantum-safe computation to support delegated multi-provers, which is information theoretically secure.

It is a further object of the present invention to provide a system and method for performing real-time quantum-safe computation to support delegated multi-provers, which supports n=3t+1 delegated multi-provers to correlatively generate a well-formatted ZKP, when at most t delegated provers are concurrently malicious.

It still another object of the present invention, to provide a system and method for performing real-time quantum-safe computation to support delegated multi-provers, in which details of executed transactions are not revealed.

It yet another object of the present invention, to provide a system and method for performing real-time quantum-safe computation to support delegated multi-provers, that does not deteriorate the performance of existing blockchain protocols.

Other objects and advantages of the invention will become apparent as the description proceeds.

SUMMARY OF THE INVENTION

A method for performing real-time quantum-safe computation of a digital transaction, by a plurality of distributed participants being permissioned verification servers, resulting in a blockchain consensus protocol, comprising the steps of:

a) creating common randomization to all of the participants which remains unrevealed until being used by the participants, by:
   a.1) assigning to each participant a unique polynomial having a maximal degree being common to all participants;
   a.1) allowing each participant to select a random value;
   a.2) allowing each participant to send his selected random value to all other participants using a secret sharing scheme based on points on his unique polynomial, such that the secret hides the details of the random value and all other participants that receive shares of the selected random value will not be able to reconstruct the selected random value from the received shares;
b) creating a pool of all shares of all participants;
c) building a quantum-safe consensus of honest participants, in rounds, by sharing symmetric keys between participants before a consensus round and recovering the keys after each consensus round;
d) during each round, generating common random coins for which a consensus has been obtained, from shares belonging to at least one honest participant in the round, and locking new created coins by a quantum-safe asynchronous Byzantine Fault Tolerance (aBFT)-based blockchain consensus protocol, while the consensus itself provides the consensus ability on transactions in Block(s) for the aBFT protocol; and
e) at the end of each round, validating the transaction using the locked common random coin and revealing the secret to all participants.

The method may further comprise the step of generating consensus for additional extra coins.

The shares may belong to AES keys, which are distributed before each consensus.

Each participant may generate a coin for obtaining a consensus.

The agreement for the pool may utilize the aBFT protocol used for locking the common randomization.

The selected random value may be “0” or “1”.

The method may further comprise the step of generating a nested hash value from a previous committed block in the blockchain and generating a new nested hash value for future Provable Reliable BroadCast (PRBC).

A participant may launch the following instances:

a) a block part RBC proposal using AES encryption; and
b) secretly sharing a transaction using an awVSS invocation for future BBA coins.

The method may further comprise the step of dividing an original transaction into two successive transactions by performing a commit and unlock process, by:

a) generating a committed transaction that commits a payment to a payee with an encrypted pad;
b) generating an unlock transaction to open a committed transaction by decrypting the pad and prove the ownership of a user by revealing the secret of the money source.

A method for performing real-time quantum-safe execution of smart contracts using online Multi-Party Computation (MPC), comprising the steps of:

a) Representing the contract as a Final State Machine (FSM) having hidden logic;
b) assigning one of the N contract clients to be the contract creator;
c) allowing the contract creator to share all coefficients of a blind polynomial with secret-shared coefficients, the blind polynomial representing state transition of the FSM and having a maximal degree being common to all contract clients;
d) using MPC to compute the blind polynomial, to obtain contract business logic privacy of the contract;
e) allowing the contract creator to create a transaction including the Merkle tree roots of all the coefficient shares;
f) After at least n-t servers verify the transaction, putting the transaction in a blockchain;
g) allowing the contract creator to communicate with other N−1 contract clients for the actual polynomials and for the shares distributed by the contract creator, to verify to each contract clients the coefficient share roots;
h) allowing the other N−1 contract clients to decide whether to join the contract created by the contract creator;
i) executing the contract by allowing the N clients to deposit money to the contract address and offer their secret inputs to an MPC program using secret sharing;
j) mixing the secret inputs before executing the contract logic to hide the permutation relation between the contract inputs and the outputs.
k) keeping the integer secret shares form for the mixed inputs according to the requirement of an actual contract, or convert the inputs to binary representation on demand.

The mixed inputs may be hidden after mixing.

The contract creator may share also zero coefficients.

The anonymity level of the contract execution may depend on how many honest clients join the contract.

The polynomial may be reveled to the parties that participates in the contract and is blind to all executing parties.

Mixing may be performed by a preprocessed permutation matrix consisting of secret shares, that performs multiplication between a deterministic matrix and a secret-shared input vector, representing a fully randomized collection of the inputs and keeps the secret shares form for the following contract execution stage.

Multiplication of secret shares may be performed by a preprocessing Beaver tuple.

A SWITCH-CASE pseudocode may be used to identify the state transitions in the FSM.

A method for performing real-time quantum-safe computation by a plurality of distributed participants being delegated multi-provers of a digital transaction, using a Zero-Knowledge Proof (ZKP), comprising the steps of:

a) allowing an original prover $\mathcal{P}$ to share a witness ω and (t+1)-degree Verifiable Secret Sharing (VSS) scheme to all actual participants, such that at the end of secret sharing, at most t malicious participants do not learn any information about ω when n=3t+1 is not violated;
b) allowing all participants to run actual and parallel M MPC executions to compute the shares of a ZKP by blind computations for 2M matrices that actual participants compute the ZKP matrices from preprocessed random shares;
c) upon completing the generation of the 2M matrices by the participants, reconstructing the output of the circuit on the input of the shares of the witness ω;
d) if the output is not a correct statement and the prover offers an incorrect witness ω for the statement, allowing participants to abort;
e) allowing each participant to commit his 2M matrices and agree on all the roots from at least n-t participants as an asynchronous consensus;
f) after obtaining the asynchronous consensus, allowing participants to make computations, based on the consensus roots of the shared ZKP matrices and the statement;
g) allowing actual participants to reveal parts of the 2M matrices to generate the final ZKP shares; and
h) allowing a verifier to reconstruct an integrate ZKP from the ZKP shares and verify the ZKP validity.

The method may further comprise the step of using a permissionless blockchain for providing a dynamic consensus committee member selection by:

a) providing a list containing n-size committee members being the current online participant candidates, based on an agreed upon criteria;
b) providing transactions rights to other members, based on the agreed upon criteria;
c) during a current epoch being the time period in which one committee dominates the blockchain, allowing the current n-size committee to select the new n-size committee and wait for new participants to complete a bootstrap process, where until then, the current committee handles over the right to create blocks to the new committee;
d) after the selections:
   d.1) allowing the current participants to write the selection results to the blockchain;
   d.2) allowing the new n participants to start creating end-to-end private and authenticated connections between every two participants.

The agreed upon criteria may be a proof a stack.

The public information of one participant may consist of its IP address and its public key of a hash-based quantum-safe signature.

The choice of any two new participants may not correlated, to thereby ensures uniform selection across all participants.

During the committee reconfiguration, the new committee members may act as normal users related to the old committee members.

The method may further comprise the step of:

a) using a multi-heterogeneous-blockchains, each of which running the contract written in its language, such that at least a threshold of the contract will decide correctly;
b) associating each contract with a portion of a resource that will be revealed to the proper side, upon decision;
c) transferring resources according to the decisions of a threshold of the participants.

The portion of a resource may be selected from the group of:

a secret share element in secret sharing scheme of a resource;

a Bitcoin code.

The method may further comprise the step of providing Self-Stabilization by using randomized consensus over selected participants that are chosen according to commitments.

Commitments may be done in the genesis block of the blockchain on secret shared of random numbers, using Merkle trees and listing the roots of the Merkle trees to be used.

A system for performing real-time quantum-safe computation of a digital transaction using in a blockchain consensus protocol, comprising:

a) a plurality of permissioned verification servers being a plurality of distributed participants that are adapted to:

b) create common randomization to all of the participants which remains unrevealed until being used by the participants, by:

b.1) assigning to each participant a unique polynomial having a maximal degree being common to all participants;

b.1) allowing each participant to select a random value;

b.2) allowing each participant to send his selected random value to all other participants using a secret sharing scheme based on points on his unique polynomial, such that the secret hides the details of the selected random value and all other participants that receive shares of the selected random value will not be able to reconstruct the selected random value from the received shares;

c) create a pool of all shares of all participants;

d) build a quantum-safe consensus of honest participants, in rounds, by sharing symmetric keys between participants before a consensus round and recovering the keys after each consensus round;

e) during each round, generate common random coins for which a consensus has been obtained, from shares belonging to at least one honest participant in the round, and locking new created coins by a quantum-safe asynchronous Byzantine Fault Tolerance (aBFT)-based blockchain consensus protocol, while the consensus itself provides the consensus ability on transactions in Block(s) for the aBFT protocol; and f) at the end of each round, validate the transaction using the locked common random coin and revealing the secret to all participants.

A system for performing real-time quantum-safe computation of a digital transaction using a Zero-Knowledge Proof (ZKP), by a plurality of distributed participants being a plurality of permissioned verification servers, each of which comprising at least one processor and associated memory containing a dedicated execution software, that are adapted to:

a) represent the contract as a Final State Machine (FSM) having hidden logic;

b) assign one of the N contract clients to be the contract creator;

c) allow the contract creator to share all coefficients of a blind polynomial with secret-shared coefficients, the blind polynomial representing state transition of the FSM and having a maximal degree being common to all contract clients;

d) perform MPC to compute the blind polynomial, to obtain contract business logic privacy of the contract;

e) allow the contract creator to create a transaction including the Merkle tree roots of all the coefficient shares;

f) after at least n-t servers verify the transaction, put the transaction in a blockchain;

g) allow the contract creator to communicate with other N−1 contract clients for the actual polynomials and for the shares distributed by the contract creator, to verify to each contract clients the coefficient share roots;

h) allow the other N−1 contract clients to decide whether to join the contract created by the contract creator;

i) execute the contract by allowing the N clients to deposit money to the contract address and offer their secret inputs to an MPC program using secret sharing;

j) mix the secret inputs before executing the contract logicto hide the permutation relation between the contract inputs and the outputs.

k) keep the integer secret shares form for the mixed inputs according to the requirement of an actual contract, or convert the inputs to binary representation on demand.

A system for performing real-time quantum-safe computation of a digital transaction using a Zero-Knowledge Proof (ZKP), by a plurality of distributed participants being a plurality of permissioned verification servers that are adapted to:

a) allow an original prover $\mathcal{P}$ to share a witness ω and (t+1)-degree Verifiable Secret Sharing (VSS) scheme to all actual participants, such that at the end of secret sharing, at most t malicious participants do not learn any information about ω when n=3t+1 is not violated;

b) allow all participants to run actual and parallel M MPC executions to compute the shares of a ZKP by blind computations for 2M matrices that actual participants compute the ZKP matrices from preprocessed random shares;

c) upon completing the generation of the 2M matrices by the participants, reconstruct the output of the circuit on the input of the shares of the witness ω;

d) if the output is not a correct statement and the prover offers an incorrect witness ω for the statement, allow participants to abort;

e) allow each participant to commit his 2M matrices and agree on all the roots from at least n-t participants as an asynchronous consensus;

f) after obtaining the asynchronous consensus, allow participants to make computations, based on the consensus roots of the shared ZKP matrices and the statement;

g) allow actual participants to reveal parts of the 2M matrices to generate the final ZKP shares; and h) allow a verifier to reconstruct an integrate ZKP from the ZKP shares and verify the ZKP validity.

A method for continuously generating a pool of quantum-safe common random coins for executing a digital transaction, by a plurality of distributed participants being verification servers, comprising the steps of:

a) creating common randomization to all of the participants which remains unrevealed until being used by the participants, by allowing each participant to select a random value and to send his selected random value to all other participants using a secret sharing scheme;

b) creating a pool of all shares of all participants;

c) building a quantum-safe consensus of participants, in rounds, while during each round, continuously generating from shares belonging to at least one honest participant in the round, common random coins; and d) using the consensus to obtain an agreement among the participants on the current content of the pool, for generated common random coins required for the next consensus rounds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

1

1

respectively; and

Figure 23:
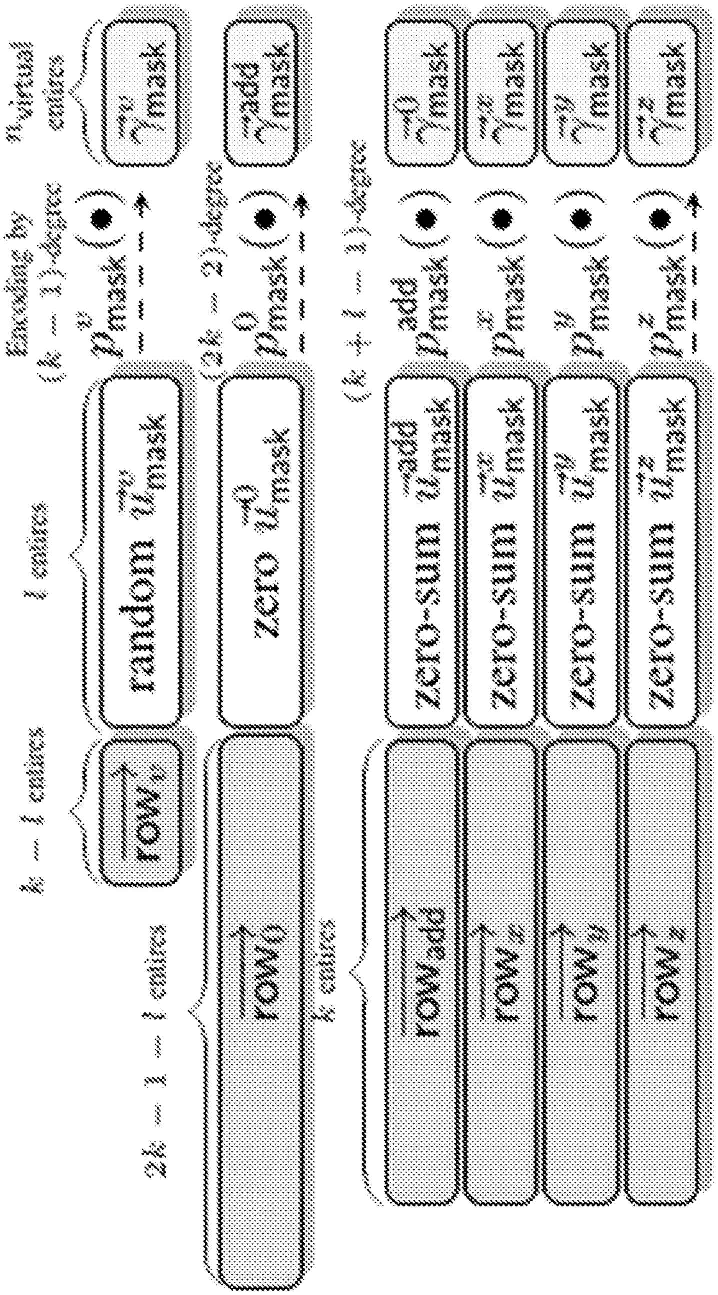

FIG. 23 schematically illustrates a given preprocessed random point rows, participants can encode the shares of the preprocessed masking rows $$\vec{u}^{v}_{mask},\ \vec{u}^{add}_{mask},\ \vec{u}^{0}_{mask},\ \vec{u}^{x}_{mask},\ \vec{u}^{y}_{mask},\ \vec{u}^{z}_{mask}$$

to the shares of rows $$\vec{\gamma}^{v}_{mask},\ \vec{\gamma}^{add}_{mask},\ \vec{\gamma}^{0}_{mask},\ \vec{\gamma}^{x}_{mask},\ \vec{\gamma}^{y}_{mask},\ \vec{\gamma}^{z}_{mask} \text{ by } p^{v}_{mask}(\bullet),\ p^{0}_{mask}(\bullet),\ p^{add}_{mask}(\bullet),\ p^{x}_{mask}(\bullet),\ p^{y}_{mask}(\bullet),\ p^{z}_{mask}(\bullet),$$

respectively.

DETAILED DESCRIPTION OF THE INVENTION

The present invention provides a novel framework for asynchronous permissioned (and extension for the permission-less case) blockchain with high performance and post-quantum security. The proposed framework contains two asynchronous Byzantine Fault Tolerance (aBFT) protocols, called hereinafter SodsBC and SodsBC++. Concurrent preprocessing is used to accelerate the preparation of three cryptographic objects for a repeated consensus procedure, including common random coins as the needed randomness, secret sharing of symmetric encryption keys for censorship resilience, and nested hash values for external validation requirements. All preprocessed objects utilize proved or commonly believed to be post-quantum cryptographic tools to resist an adversary equipped with quantum computation capabilities. The evaluation in Amazon Web Services (AWS) shows that SodsBC and SodsBC++ reduce the latency of two state-of-the-art but quantum-sensitive competitors Honeybadger and Dumbo by 53% and 6%, respectively in the setting that the number of participants is 100 and each block part has 20,000 transactions.

The present invention provides a post-quantum secure framework resulting in two aBFT protocols, SodsBC and SodsBC++, which is superior over quantum-sensitive competitors such as Honeybadger and Dumbo in performance. Perfect information-theoretical (I.T.) secure and symmetric schemes are used to build post-quantum secure aBFT protocols since a perfect I.T. secure algorithm is proved to resist an adversary with unlimited computation power (naturally including quantum computation), while symmetric cryptographic tools are believed to be post-quantum if the security parameter is long enough. Also, the operations in a perfect I.T. secure or a symmetric scheme are generally faster than the the operations in an asymmetric scheme (e.g., the ellipse curve operations).

It is challenging to directly apply I.T. or symmetric schemes to aBFT protocols, since these schemes are usually one-time (or limited-time) used, which cannot support the repeated consensus service. The present invention provides a concurrent preprocessing design to advance these cryptography objects before usage. Preprocessing is widely used in secure Multi-Party Computation (MPC) to offload heavy computational burden from an online stage to a preprocessing stage [4]. The present invention performs a further step from preprocessing to concurrent preprocessing in a consensus protocol. The agreement process of the aBFT architecture is utilized to preprocesses objects for I.T. or symmetric schemes, and then use these objects in the subsequent agreement process. Hence, we do not need additional time to prepare the objects for I.T. or symmetric schemes. Accordingly, an aBFT based blockchain consensus is designed, while the consensus itself provides the consensus ability for the aBFT protocol.

The concurrent preprocessing allows to design three building blocks for aBFT protocols. A post-quantum common random coin scheme and a censorship resilience solution, by which it is possible to realize a post-quantum aBFT protocol (called SodsBC). Also a post-quantum external validation predicate is presented to support MVBA, which renders another post-quantum aBFT protocol, called SodsBC++, compared to Dumbo [25].

The method provides (1) a post-quantum common random coin scheme from secret sharing, which provides necessary randomness for aBFT and (2) a pool for the generated secret shares, and the agreement for this pool utilizes the same aBFT architecture. The solution provides the considerable anti-censorship property for aBFT, utilizing secretly shared symmetric encryption (AES) keys. A post-quantum external validation predicate utilizing concurrent preprocessed nested hash values for the SodsBC++ MVBA core. The method proposed by the present invention showed reduced latency of 53% of Honeybadger latency and 6% less than the latency of Dumbo [25].

System Model

A system with a set of n=3f+1 mutually-distrusting participants is considered, say $\mathcal{P}=\{p_1, \ldots, p_n\}$. It is assumed that up to f participants are Byzantine and are controlled by an adversary. It is also assumed that each pair of participants is connected by reliable and authenticated channels following previous aBFT protocols [18, 25, 29, 34]. Hence, the adversary cannot drop messages among honest participants, as in the TCP protocol. Most symmetric schemes for message authentication code (MAC) satisfies the authenticated requirement. An extra post-quantum requirement is added for the used symmetric schemes. The proposed protocols works in an asynchronous network, i.e., no timing assumptions for message delivery [6]. It is assumed that the adversary with quantum computers can efficiently break some known quantum-sensitive mathematical intractable problems, e.g., Dlog or integer factorization.

Post-Quantum Secure Asynchronous BFT Protocol

In a permissioned blockchain, users/clients propose transactions, and participants batch transactions in blocks and make an agreement of these blocks by utilizing the consensus core, i.e., an aBFT protocol [14, 20, 33]. In addition, such a system should be post-quantum secure and so satisfy the following properties:

- Agreement: Every two honest participants deliver the same block $\mathcal{B}$ in one block height.
- Total order: If an honest participant p delivers a sequence of blocks $\mathcal{B}_1, \ldots, \mathcal{B}_j$ and another honest participant p' has delivered $$\mathcal{B}'_1, \ldots, \mathcal{B}'_{j'}, \text{ then } \mathcal{B}_i = \mathcal{B}'_i \text{ for } 1 \le i \le \min(j, j').$$

- Liveness: If a client submits a transaction TX to at least n-f participants, then there eventually will be a delivered block having TX[2].
- Post-quantum security: The known quantum-sensitive cryptographic tools will not be used in the protocol.

An aBFT protocol can be realized by solving a consistent union of block parts generated from all participants, which is known as an Asynchronous Common Subset (ACS) protocol. An ACS protocol can be further implemented by two practical paths, BBA-ACS and MVBA-ACS.

Honeybadger [34], and its variants [18, 29] adopt the BBA-ACS [6] way to achieve aBFT. SodsBC follows this methodology but introduces novel ways to implement a post-quantum anti-censorship solution and a post-quantum common random coin scheme. Dumbo [25] deploys the MVBA-ACS way. SodsBC++ uses preprocessed nested hash to design a post-quantum external validation predicate to support a post-quantum MVBA in the MVBA-ACS aBFT architecture.

The BBA-ACS architecture is simpler for fewer building blocks, which is easier to understand. Secondly, even though the round complexity of a BBA-ACS or MVBA-ACS aBFT protocol is O(logn) or O(1), respectively, a BBA-ACS-based aBFT protocol still may spend less latency in a relatively low quorum size. When the number of participants, n, increases, the bottleneck of a BBA-ACS protocol gets worse for the n parallel BBA instances. Thirdly, throughput rate is another significant metric other than latency. When every participant is honest and the network condition is relatively good, a BBA-ACS-based aBFT protocol may collect all n block parts while an MVBA-ACS-based aBFT only can collect n-f block parts in the consensus output block.

Components in SodsBC/SodsBC++

Several cryptographic primitives/protocols and their realization in SodsBC/SodsBC++. Are introduced.

Reliable broadcast (RBC) is a kind of protocols achieving an all-or-nothing style broadcast, which satisfies:

- Validity: If an honest broadcaster broadcasts msg, then all honest participants deliver msg.
- Agreement: Honest participants deliver an identical msg.
- Totality: Eventually, honest participants will deliver msg if msg is delivered for an honest participant.

SodsBC/SodsBC++ employs Cachin and Tessaro's RBC [12, 34] that utilize erasure code and Merkle tree cross-checksum.

Provable reliable broadcast (PRBC) provides a proof of termination for an RBC instance. Our PRBC (Algorithm 2) deploys the preprocessed and post-quantum nested hash as the termination proofs.

Binary Byzantine agreement (BBA) is a kind of asynchronous BA protocols focusing on binary input/output values, which satisfies:

- Validity: An output comes from an honest participant.
- Agreement: Honest participants output the same value.
- Termination: All honest participant will eventually have an output.

SodsBC/SodsBC++ adopts the refined signature-free asynchronous BBA protocol proposed by Mostéfaoui et al. [35, 36]. The asynchronous BBA protocol relies on a common randomness source. We offer post-quantum common random coins to the BBA instances as the randomness source.

Multi-value Byzantine Agreement (MVBA) satisfies similar Agreement and Termination properties defined in BBA. Moreover, an MVBA protocol satisfies:

External validity: An output satisfies a pre-defined external predicate.

Integrity: An output comes from an input if all participants are honest.

With External validity, an MVBA protocol output is valid even if the output comes from a malicious participant, since a malicious input should satisfy a predicate Q. SodsBC++ designs a post-quantum and efficient MVBA (enlightened by Cachin et al.'s work [10]) by relying on post-quantum secure threshold signature.

Asynchronous Common Subset (ACS) is used to finalize n parallel computation instances, satisfying:

Validity: The ACS output has at least n-f true values for n predicates. At least f+1 true values correspond to the instances launched by honest participants.

Agreement: Honest participants have a consistent result of n predicates.

Termination: All honest participant will eventually output a result.

ACS can be implemented by two paths: the BBA-ACS and MVBA-ACS. In BBA-ACS protocol [6], participants vote 1 to a BBA if the corresponding computation instance is finished. After waiting for at least n-f terminated instances, honest participants intentionally exclude the too slow instances by voting 0 to the corresponding BBAs. In MVBA-ACS protocol [25], honest participants use an expected constant number of BBA invocations to select a valid view of a random participant.

The following are the building blocks for realizing SodsBC/SodsBC++:

Asynchronous Weak Verifiable Secret Sharing

A secret sharing scheme has two algorithms, sharing and reconstruction. A participant who shares a secret is called a dealer. An asynchronous verifiable secret sharing (aVSS) scheme is to verify whether a dealer shares a secret under a correct threshold in an asynchronous network. Once correctly sharing shares, a consistent secret will be recovered by the reconstruction algorithm. In addition, we adopt the weak commitment concept for the sake of efficiency [2]. Honest participants will set the shared secret to a default value (e.g., zero) after reconstruction when they detect a malicious behavior of a dealer. Concretely, we use Merkle-tree-based hash cross-checksum to achieve the share validation. Formally, the proposed awVSS scheme satisfies:

Secrecy: At most f malicious participant cannot learn any information about the secret if a dealer is honest, before an honest participant invocates the reconstruction.

Share agreement: Honest participants deliver shares corresponding to an identical Merkle root.

Share liveness: At least f+1 honest participants deliver consistent shares, and eventually all honest participants will deliver the identical Merkle root if one honest participant delivers a share and a corresponding Merkle root.

Weak commitment: (Reconstruction correctness) Honest participants will reconstruct a consistent secret s if the dealer is honest. Otherwise, they will consistently set s to a default value (e.g., 0).

Figure 1:
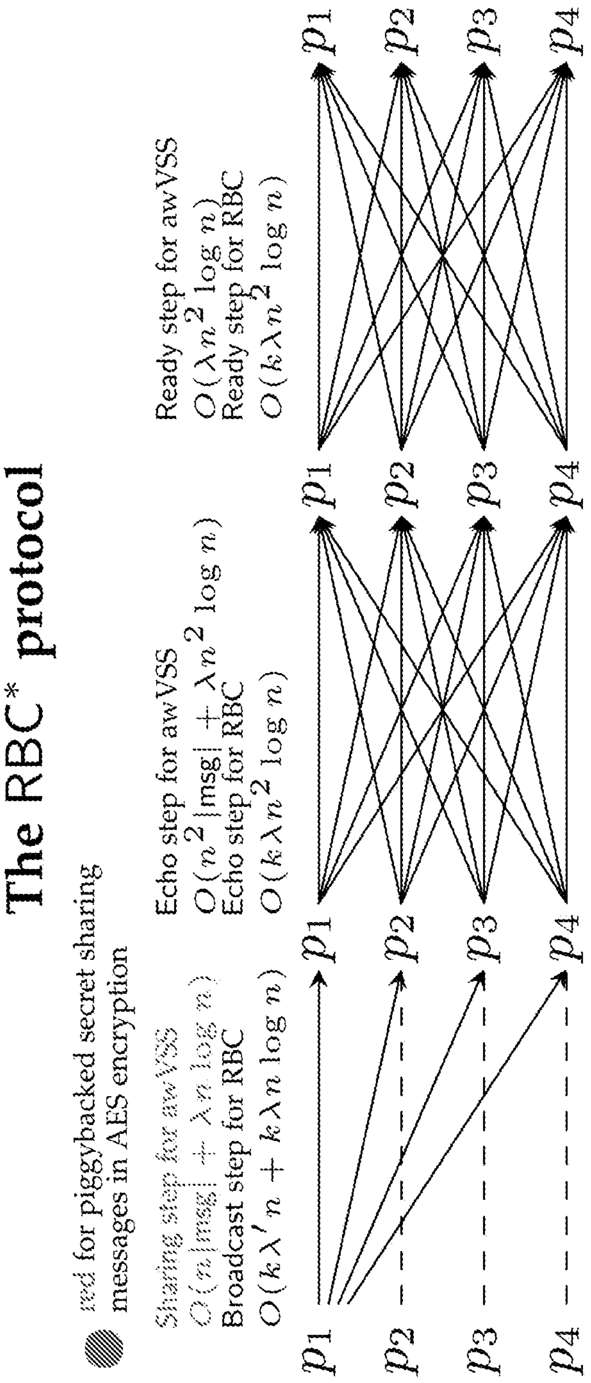
FIG. 1 shows the integrated reliable broadcast (RBC*) protocol in which k secrets are piggybacked in a holistic style.

A holistic structure. Our awVSS scheme (Algorithm 4 consists three steps: Sharing, Echo, and Ready) shares a similar structure with the classical RBC protocol (Algorithm 5 has Broadcast, Echo, and Ready). Therefore, we combine these two protocols into an integrated protocol, i.e., a (batched) awVSS instance for sharing some secrets from a dealer can be piggybacked by an RBC instance from the same broadcaster. To avoid an adversary to eavesdrop the secret shares transmitted by honest participants, the piggybacked secret messages should be encrypted by a post-quantum and symmetric scheme like AES. The holistic combination is depicted in FIG. 1. RBC* is used to denote a combined protocol instance. The detailed awVSS scheme is provided in Appendix A (Algorithm 4). FIG. 1 shows the integrated reliable broadcast (RBC*) protocol in which k secrets are piggybacked in a holistic style. $p_1$ is $P_{broadcaster}/P_{dealer}$. |msg|: the size of a message to be broadcast. λ: the length of a hash function. λ': the size of a secret.

Post-Quantum Censorship Resilience Solution

To prevent the adversary from intentionally excluding some particular block parts (e.g., containing unfavorable transactions), the encryption-consensus-decryption idea [34] is followed to achieve Censorship resilience. Each participant $p_i$ packages some transactions into $\mathcal{B}_{p\_part_i}$, AES-encrypts it, and inputs the ciphertext $\mathcal{B}_{c\_part_i}$ into the consensus core. After the consensus, participants interact with each other, to decrypt the agreed encrypted block parts.

Unlike the previous protocols [18, 25, 34] that use quantum-sensitive threshold encryption schemes [3, 41] to encrypt the AES keys, a SodsBC/SodsBC++ participant shares its AES key by a post-quantum awVSS instance simultaneously as broadcasting the AES ciphertext block part. Concretely, an AES key $aesKey_i$ will be also secretly shared by $p_i$, and the secret sharing messages for $aesKey_i$ are piggybacked by the $RBC_i$ instance for $\mathcal{B}_{c\_part_i}$. This integrated instance is denoted by $$RBC_i^*.$$

After consensus, at least n-f ciphertext block parts and the shared roots of at least n-f AES key shares are consistently delivered. Hence, the AES key sharing (preprocessing) is concurrent as the aBFT block consensus. Then, honest participants broadcast the shares to reconstruct the AES keys, decrypt the agreed block parts and complete the current round consensus. Each SodsBC/SodsBC++ consensus round is a preprocessing stage to sharing AES keys (before consensus), and it is also an online stage to reconstruct the shared keys (after consensus). The fresh AES key secret sharing (and the post-quantum awVSS scheme) offers SodsBC/SodsBC++ the post-quantum anti-censorship. Only symmetric cryptography and algebra operations for secret sharing and reconstruction in fact accelerate the computation process, avoiding the use of the inefficient quantum-sensitive bilinear map pairings.

Since an encrypting participant is also the key share dealer and the ciphertext broadcaster, at least f+1 ciphertexts are guaranteed to be well-formatted and be successfully decrypted. This threshold is the same as in Honeybadger and Dumbo [25], which, however, achieves a similar anti-censorship property by quantum-sensitive threshold encryption.

n awVSS batches are finalized by n BBA instances or a post-quantum MVBA, and the finished awVSS shares construct a global pool. The pool can atomically assign finished secrets to n queues or one queue for the future BBA usage, in SodsBC or SodsBC++, respectively.

Post-Quantum Common Random Coin Scheme

Besides sharing AES keys, SodsBC/SodsBC++ also concurrently preprocesses post-quantum common random coins. In online stages (i.e., the time epoch for agreeing on blocks), the proposed BBA will consume post-quantum, fresh, and one-time used common random coins, reconstructing from the shared secrets distributed in history preprocessing stages. This online stage is also a preprocessing stage, simultaneously, in which each participant shares secrets for future coins by awVSS (Algorithm 4). Unlike the quantum-sensitive coin-flipping protocols [7, 11] used in previous aBFTs [18, 25, 34], the continuously produced secrets in SodsBC/SodsBC++ imply the use of fresh (and post-quantum) coins.

A common random coin in SodsBC/SodsBC++ encompasses f+1 shared random secrets produced by f+1 distinct dealers, i.e., $$\text{coin} = (\text{secret}_1 + \ldots + \text{secret}_{f+1}) \bmod 2.$$

The proposed coin scheme has the following properties:

Random. Honest participants will choose a random value uniformly, so that at least one random coin component makes the coin value uniformly random after the f+1 additions.

Common. Every participant recovers f+1 consistent coin components when all the f+1 components are secretly shared before, resulting in the consistent recovery of the common coin value.

Unbiased. Before the first honest participant invocates the coin recovery, at most f adversaries learn no information about the coin value if at least one coin component is well-shared by an honest participant under the f+1 threshold (the awVSS secrecy).

The coin structure goes through at most f failed secret reconstructions. Honest participants consistently set at most f coin components to zero when detecting malicious behaviors (i.e., at most f failed secret reconstructions), while one successful reconstruction still keeps a well-defined coin with random-value, common-value and anti-adversarial-bias.

However, only one coin is not enough for the repeated consensus service. FIGS. 2*a*-2*c* show how SodsBC/SodsBC++ supplies unlimited number of coins. In FIG. 2*a*, each SodsBC/SodsBC++ dealer runs an awVSS batch to share secrets, and n BBAs in SodsBC finalize (or a post-quantum MVBA in SodsBC++ finalizes) these n awVSS batches. The delivered Merkle tree roots help honest participants figure out the number of secrets shared from a specific participant, leading to a global awVSS pool (FIG. 2*b*). The reason for applying n BBAs (or a post-quantum MVBA) is that different participants may have different observations about the secrets in an asynchronous network. Therefore, a consistent view of the generated secrets is reduced to an asynchronous consensus problem. SodsBC/SodsBC++ itself is employed to solve this secret pool consensus problem.

FIGS. 2*b*-2*c* explain how SodsBC/SodsBC++ deploy the atomic coin assignment. If the finished awVSS pool is globally decided, honest participants can iterate each row from the button of the global pool and assign each f+1 secrets (shared from f+1 distinct dealers) to one coin, and further assign each coin to n BBA queues in SodsBC or one BBA queue in SodsBC++ (FIG. 2*c*).

SodsBC Protocol

The SodsBC protocol is a post-quantum secure aBFT protocol based on the BBA-ACS architecture. In particular, a novel concurrent preprocessing improves the performance of the post-quantum censorship resilience solution and the post-quantum common random coin scheme, described above. The algorithm of SodsBC protocol is provided in Algorithm 1, and the architecture is depicted in FIG. 3.

Algorithm 1: SodsBC Consensus (for $p_i$) [22]

// Block part generation and encryption
1: For $B_{p\_parti}$, AESEncrypt($aesKey_i$, $B_{p\_parti}$) $\rightarrow B_{c\_parti}$.
// Consensus core: make a union of block parts
2: In $RBC_{*i}$, broadcast $B_{c\_parti}$; share $aesKey_i$ and secrets by piggybacked awVSS messages.
3: Input 1 to $BBA_i$ if $RBC_{*i}$ finishes.
4: Input 0 to remained BBAs if $n - f$ BBAs output 1.
// BBA coins are reconstructed by awVSS.
// Decryption and output
5: If $BBA_j$ outputs 1, reconstruct $aesKey_j$ and AES decrypts $B_{c\_partj}$. If the decryption fails, or $RBC_j$ is aborted ($BBA_j$ outputs 0), set $B_{p\_partj} = \perp$.
6: Make $B = \cup_{j=1}^{n} B_{p\_partj}$, and assign agreed awVSS batches to n queues.

Figure 3:
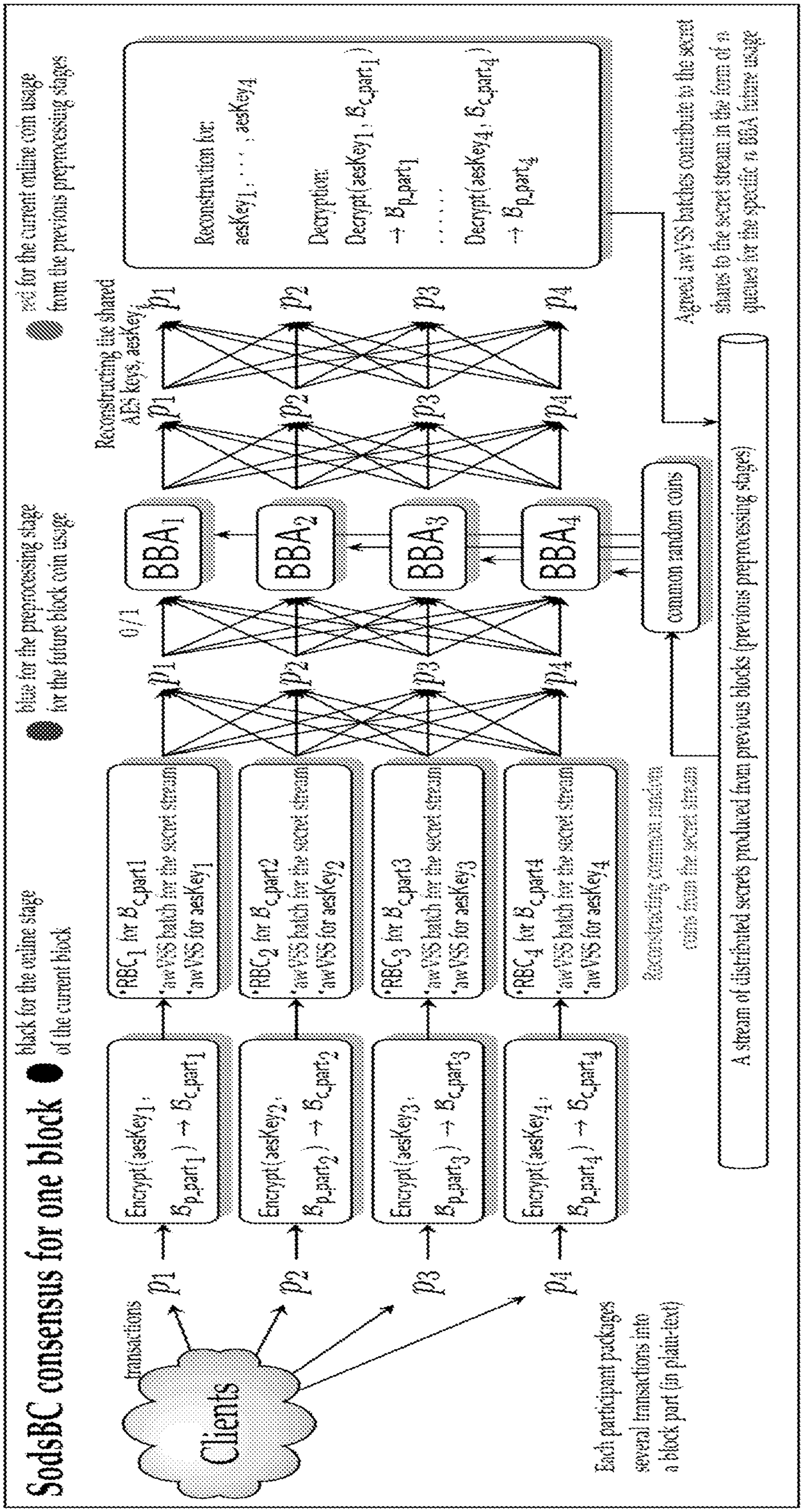
FIG. 3 shows SodsBC consensus overview.

FIG. 3 shows SodsBC consensus overview [22]. RBC: reliable broadcast. awVSS: asynchronous weak secret sharing. BBA: binary Byzantine agreement. $\mathcal{B}_{p\_part_i}$&$\mathcal{B}_{c\_part_i}$: the i-th block part in plain/cipher-text.

A SodsBC participant launches three important sub-instances: a block part $\mathcal{B}_{c\_part_i}$ RBC proposal in AES encryption, $aeskey_i$ secretly sharing (by an awVSS invocation) and other random values secretly sharing for the future BBA coins (by another awVSS batch invocation). SodsBC participants finalize the three sub-instances launched by a participant by one BBA instance. The secret-sharing messages (an awVSS batch for secrets and another awVSS instance for $aeskey_i$) can be piggybacked by the RBC instance for $\mathcal{B}_{c\_part_i}$, as a holistic structure. In the SodsBC architecture each RBC* is finalized by one BBA.

SodsBC Security Outline

Since SodsBC does not change the BBA-ACS architecture, after obtaining a well-defined common random design and an anti-censorship solution, Algorithm 4 can satisfy the required aBFT agreement, total order, and liveness properties. Recall that the BBA-ACS output involves at least n-f terminated instances, i.e., n-f true predicates. SodsBC has a more strict predicate than the original BBA-ACS protocol [6]. A SodsBC predicate is not limited to whether an RBC is finished ($Pred_{RBC}$). Participants also agree on the termination of n awVSS batches distributed by a specific dealer for future coins ($Pred_{awVSS\_coin}$), and n awVSSs for AES keys ($Pred_{awVSS\_aeskey}$). Hence, a SodsBC predicate is $Pred=Pred_{RBC} \wedge Pred_{awVSS\_coin} \wedge Pred_{awVSS\_aeskey}$, which decides a complex instance having three sub-instances.

SodsBC Communication Complexity

In the complexity calculations, $|\mathcal{B}|$ us the size of a block which contains the n block parts ($\mathcal{B}_{part}$). After RS encoding, the size of one block part is expanded to $$|\mathcal{B}_{RSpart}| = \frac{n}{f+1}|\mathcal{B}_{part}|^3.$$

The total expected coin consumption amount for n BBA instances is cNum=4n since one BBA is expected to be finalized in four BBA rounds [36]. Hence, a participant should generates cNum secrets in expectation since one coin involves f+1 secrets and SodsBC only guarantees at least f+1 honest (non-empty) awVSS batches.

One RBC communicates $$n\left(\frac{1}{n}|\mathcal{B}_{RSpart}| + \lambda\log n\right) + n^2\left(\frac{1}{n}|\mathcal{B}_{RSpart}| + \lambda\log n\right) + \lambda n^2$$

bits

Moreover, the piggybacked awVSS messages in one RBC (for one AES key and cNum secrets) communicate $n\times(\lambda+\lambda\log n+cNum(\lambda'+\lambda\log n)+2\times n^2\times(cNum+1)\times\lambda$ bits. The communication overhead for n RBC* instances is $O(|\mathcal{B}|n+\lambda n^4)$ bits.

Calling cNum coins in n BBAs communicates $O(\lambda n^4\log n)$ bits. It takes $O(\lambda n^3\log n)$ bits to reconstruct n AES keys. Therefore, the total communication complexity of SodsBC is $O(|\mathcal{B}|n+\lambda n^4\log n)$ bits.

In HoneyBadger [34], n RBC instances have the $O(|\mathcal{B}|n+\lambda n^3\log n)$ communication overhead. n BBA instances consume $O(\lambda n^3\log n)$ bits for generating quantum-sensitive common random coins, since the size of a threshold signature share is also λ bits. There is another $O(\lambda n^3)$ bits communication overhead for the AES key threshold decryption. So the total communication complexity of HoneyBadger is $O(|\mathcal{B}|n+\lambda n^3\log n)$ bits. Even with a slightly higher communication overhead than HoneyBadger, SodsBC still has a better performance in latency due to much lower computation overhead.

SodsBC++

SodsBC++, is a post-quantum secure aBFT protocol based on the BBA-ACS architecture. The quantum-sensitive threshold signatures in the PRBC and Consistent Broadcast (CBC) instances are replaced with a post-quantum PRBC (pqPRBC) utilizing preprocessed nested-hash values. The nested-hash-based pqPRBC offers the external verification property in a post-quantum multi-value Byzantine agreement (MVBA).

Nested Hash based Post-quantum Provable Reliable Broadcast (pqPRBC)

Compared with RBC, PRBC can provide its participants a proof of termination for an RBC instance. The PRBC proposed in Dumbo adds another Done step in which each participant broadcasts its threshold signature share when delivering the RBC output. The message to be signed by $p_i$ for the $RBC_i$ instance is the round number r and the RBC index j, i.e., $\sigma_{i,j}\leftarrow$Sign $(tSigKey_i, \langle r, j\rangle)$. The broadcaster $p_j$ will aggregate the signature shares as $tSig_j\leftarrow\Sigma\sigma_{i,j}$ from f+1 valid shares. Threfore, when $p_j$ exhibits $tSig_j$ to another participant $$p'_j, p'_j$$

will believe that $RBC_j$ already finishes from the view of at least one honest participant (at most f signing participants may be malicious) after verifying the validity of $tSig_j$. According to the RBC totality, all honest participant will finish $RBC_j$ eventually.

A threshold signature in Dumbo's PRBC only signs a known message, so that we can use a preprocessed hash value to achieve a similar verification effect. For an honest participant, $p_i$ first generates a random secret $s_{i,j}$ and preprocesses $H_{i,j}$=Hash$(s_{i,j}, i, j)$. Then, $p_i$ inserts $H_{i,j}$ into a transaction and proposes this transaction to the blockchain. Assuming that $H_{i,j}$ will be committed in the blockchain before the blockchain round r. Finally, after $p_i$ finishes the $RBC_j$ instance in round r, $p_i$ broadcasts $s_{i,j}$ in the Done step. Other participants can verify $s_{i,j}$ by re-computing $$H'_{i,j} = \text{Hash}(s_{i,j}, i, j)$$

comparing $$H_{i,j} \stackrel{?}{=} H'_{i,j}.$$

When one participant receives f+1 correct hash pre-image values for the round r and $RBC_j$, this participant can believe that at least one honest participant finishes $RBC_j$ and all honest participants will eventually finish $RBC_j$, which achieves a similar effect as the one for Dumbo's PRBC. In addition, for providing the future proving RBC ability, $p_i$ in the propped PRBC should also preprocess another new $H_{i,j}$ before the consensus round r+1.

---

Post-quantum Provable Reliable Broadcast (pqPRBC) for $p_i$

// (A preprocessing stage)

1: $p_i$ generates $t_{i,j}$, and commits $H^r_{i,j}$ in blockchain for $j \in [1, \ldots, n]$, in which $H^r_{ij} = \text{Hash}(\ldots \text{Hash}(\text{Hash}(t_{i,j}, i, j), i, j) \ldots, i, j)$ for $r$ times of hash computation.

// (An online stage in the k-th blockchain round after $p_i$ first consumes $H^r_{i,j}$.)

RBC: // (for a broadcaster, $p_j$)

2: $p_j$ inputs msg $RBC_j$.

RBC-Done-step-send:

3: Upon finishing $RBC_j$, $p_i$ broadcast $\langle \text{Done}, H^{r-k}{}_{i,j}\rangle$.

RBC-Done-step-receive:

4: Upon reveiving $\langle \text{Done}, H^{r-k}{}_{i',j}\rangle$ from $p_{i'}$, $p_i$ store $H^{r-k}{}_{i',j}$, if $H^r{}_{i',j} = \text{Hash}(\ldots \text{Hash}(H^{r-k}{}_{i',j}, i', j) \ldots, i', j)$ after k times of hash computation.

---

A nested hash may be used to increase the usage times for one preprocessed value.

$$H^{r_k}_{i,j}$$

denotes the k times hash for a random secret $s_{i,j}$, i.e., $$H^{r_k}_{i,j} = \text{Hash}(\cdots\text{Hash}(\text{Hash}(s_{i,j}, i, j), i, j)\ldots, i, j).$$

If $$H^{r_k}_{i,j}$$

is preprocessed and committed in blockchain, $p_i$ can consume $$H_{i,j}^{r_k-1}$$

in the first block after the committed block, and can consume $$H_{i,j}^{r_k-2}$$

in the second block, and so forth. Until $s_{i,j}$ is revealed, $p_i$ has the ability to support the PRBC verification for k blocks. When $$H_{i,j}^{r_k}$$

is almost exhausted, $p_i$ generates a new $$H_{i,j}^{r_k}$$

and repeats the process above. The usage of a preprocessed nested hash value (from a previous committed block) and generating a new nested hash value for the future PRBC usage reflects the third concurrent preprocessing case. The nested hash based pqPRBC details are described in Algorithm 2.

SodsBC++ Protocol

Figure 4:
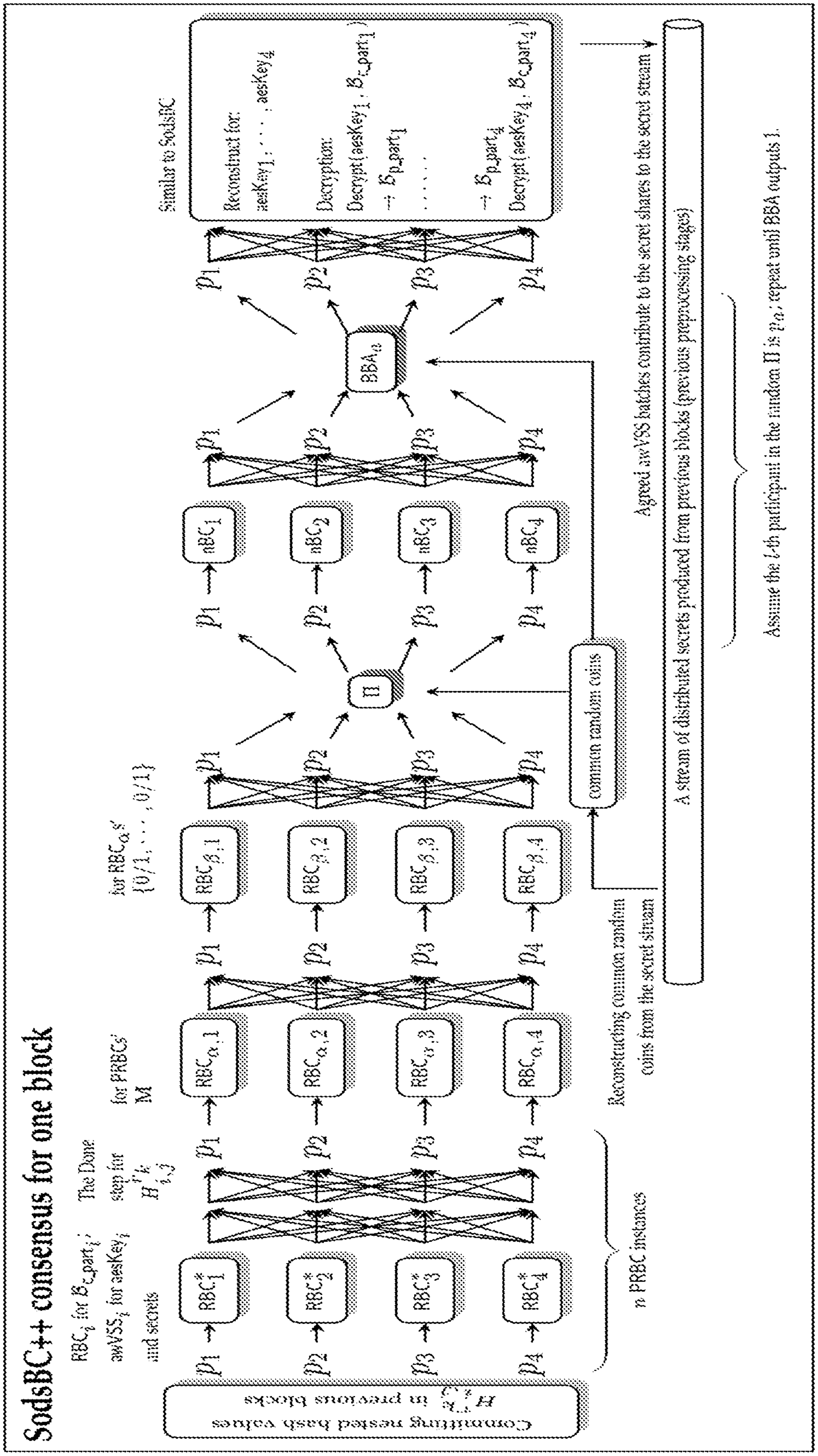
FIG. 4 illustrates the procedure of SodsBC++.

Algorithm 3 and FIG. 4 illustrate the procedure of SodsBC++. The preparing works before the consensus (line 1 to line 2) are similar to the ones of SodsBC. Each SodsBC++ participant $p_i$ AES encrypts its $\mathcal{B}_{\text{p\_part}_i}$, and broadcasts $\mathcal{B}_{\text{c\_part}_i}$, shares $\text{aesKey}_i$ and several secrets in $$RBC_i^*.$$

During each PRBC instance (line 5.2), $p_i$ broadcasts a hash value $$H_{i,j}^{r}$$

in the last Done step after finishing each RBC instance $$RBC_j^*.$$

$$H_{i,j}^{r}$$

can access a preprocessed nested hash value $$H_{i,j}^{r_k}$$

committed in the blockchain after $r_k$–r=k times of hash computation. Then, $p_i$ waits for receiving at least f+1 valid hash values leading to a valid column vector for $$RBC_j^*$$

(line 4).

For n parallel RBC instances, $p_i$ receives a matrix M having at least n-f valid column vector (line 5.2). A predicate is denoted Q(•) so that Q(M)=TRUE when M has n-f valid column vectors and each valid column in M has at least f+1 valid hash values. A valid M reflects the termination of n-f RBC* instances. r denotes the k-th blockchain round after $p_i$ consumes $$H_{i,j}^{r_k}$$

for the first time. The predicate Q(•) acts as the external validation predicate for the following MVBA protocol.

Cachin et al.'s MVBA [10] is modified to avoid quantum-sensitive cryptographic tools, e.g., a threshold signature based consistent broadcast (CBC), to a post-quantum MVBA (pqMVBA) protocol (line 5 to line 13). If $p_i$'s view is valid, $p_i$ inputs M into an RBC instance $RBC_{\alpha,i}$. After n-f $RBC_\alpha$ instances output valid views satisfying the predicate Q(•), $p_i$ constructs a 0/1 vector column C=[$c_1$, . . . , $c_n$] to describe the results of $RBC_\alpha$ instances. If the output of $RBC_{\alpha,j}$ is valid, $p_i$ sets $c_j$=1; otherwise 0. If columnC has 2f+1 1-items, $p_i$ inputs this commitment columnC to $RBC_{\beta,i}$·$p_i$ regards a received $\text{columnC}_j$ from $p_j$ as valid when $\text{columnC}_j$ has 2f+1 1-items. The received columnC vectors construct a matrix C.

After n-f $RBC_\beta$ instances finish, $p_i$ uses a random secret Γ to generate a random permutation Π (line 8). The first index is Π(1)=Hash (Γ), and the second index is Π(2)=Hash (Π(1)), and so forth. This permutation defines a loop as Cachin et al.'s MVBA [16].

The BBA input for a selected view should be carefully treated (line 11 to line 12). For each selected index α=Π(l) in the loop round l, participants require another round of normal broadcast (nBC) to coordinate their opinions, in order to make sure that a subsequent BBA decision has 1-output bias. For the selected $RBC_{\alpha,\alpha}$, if it is finished from $p_i$'s observation and the output of $RBC_{\alpha,\alpha}$ satisfies the predicate Q(•), $p_i$ inputs 1 to the BBA instance and normal broadcast 1. If $RBC_{\alpha,\alpha}$ is finished but Q(•) does not hold, $p_i$ normal broadcasts 0 and inputs 0 to BBA. If $RBC_{\alpha,\alpha}$ is not finished from $p_i$'s observation, $p_i$ normal broadcasts 0 and waits for other opinions. If $p_i$ receives at least f+1 ⟨$\text{MVBA}_{vote}$, 1⟩ messages, $p_i$ will input 1 to BBA. If $p_i$ receives at least n-f valid ⟨$\text{MVBA}_{vote}$, 0⟩ messages, $p_i$ will input 0. A ⟨$\text{MVBA}_{vote}$, 0⟩ is valid from $p_j$, if and only if $p_i$ has received $\text{columnC}_j$ from the finished $RBC_{\beta,j}$ and $\text{columnC}_j$[α]=0.

If the BBA instance outputs 1, the pqMVBA loop terminates and the consensus is achieved (line 13). Otherwise, the loop repeats to the next selected view α←Π(l+1) in line 10.

Figure 2:
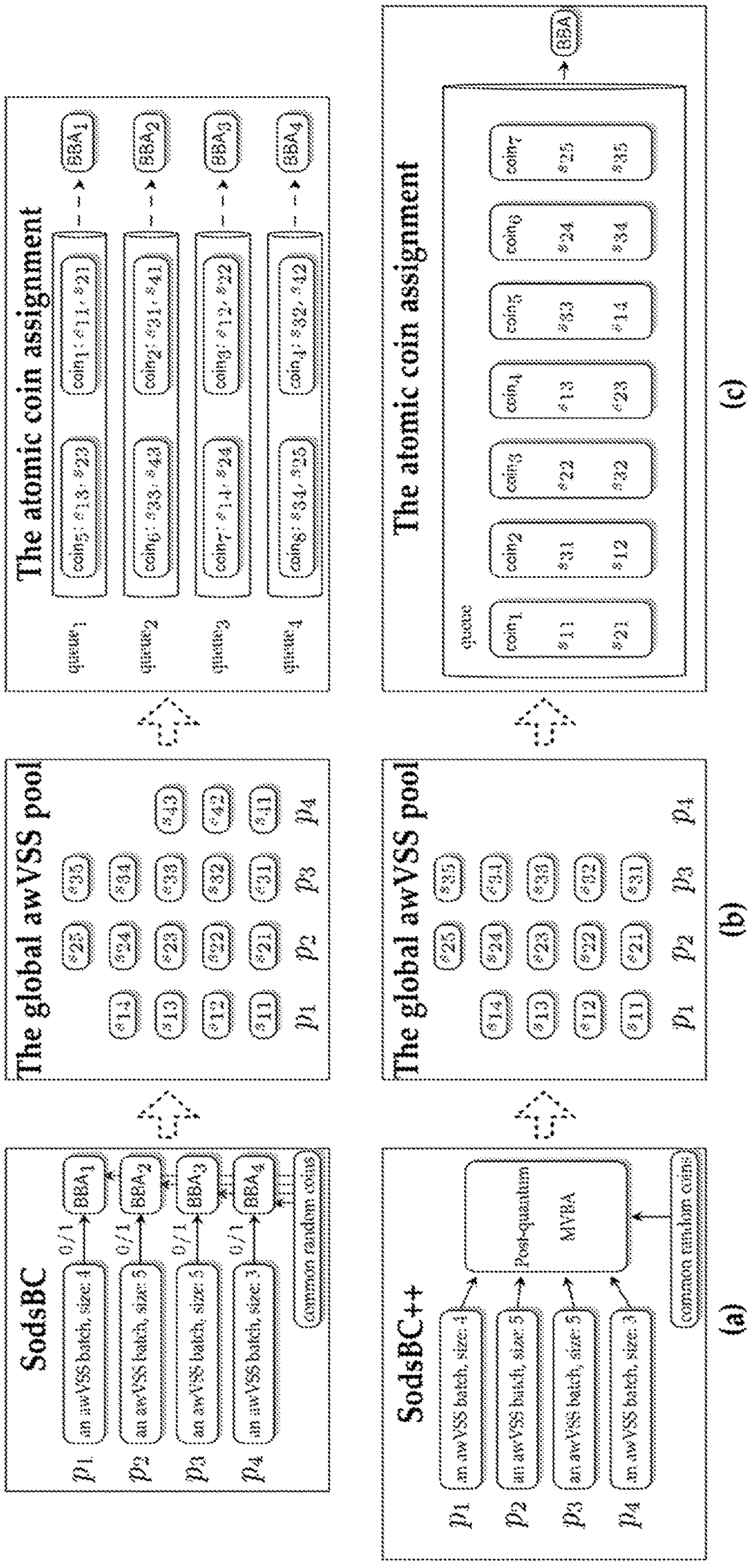
FIGS. 2_a_-2_c_ show how SodsBC/SodsBC++ supplies unlimited number of coins.

After the pqMVBA finishes, participants continue to reconstruct the AES keys, decrypt the valid block parts in ciphertext, and assign the agreed secrets to the global awVSS pool for future usage (line 14, as the workflow in FIG. 2).

The proposed pqMVBA shares the same structure with Cachin et al.'s MVBA leading to similar properties. There are at least 2f+1 honest views among all n=3f+1 views. But an asynchronous adversary can maliciously vote 0 to the selected honest view, such that the pqMVBA only guarantees the BBA 1-output for at least f+1 selected views, and at most f views of these f+1 selected views may come from malicious participants. Fortunately, with the assistance of the external validity predicate Q(•), an output view is also valid even this view is from Byzantine. Therefore, the pqMVBA has a $$\frac{1}{3}$$

probability to terminate, and the pqMVBA loop will repeat three times in expectation.

SodsBC++ Security. Algorithm 2 is a PRBC protocol where we replace the threshold signature-based-proof with the post-quantum and preprocessed nested-hash-based proof, compared with the quantum-sensitive PRBC used in Dumbo [25].

Theorem 1 Algorithm 2 satisfies the PRBC validity, totality, and agreement properties, given the well-committed preprocessed nested hash values in the blockchain.

Agreement: The pqPRBC invocates an RBC as a black-box so that agreement is directly obtained.

Validity: When a broadcaster $p_j$ is honest, every honest participant $p_i$ broadcasts $$H^r_{i,j}$$

in the Done step, corresponding to the finished $RBC_j$ instance in the blockchain round r. Each $$H^r_{*,j}$$

value can be validated after computing k times of hash and accessing a committed and preprocessed $$H^{rk}_{*,j}.$$

So that each participant will receive f+1 valid $$H^r_{*,j}$$

values constructing a valid column vector.

Totality: If any participant has a valid column vector having f+1 valid items, then at least one honest participant finishes RBC; and broadcasts its $$H^r_{*,j}$$

value. From the RBC totality, all honest participants will eventually finish $RBC_j$ and broadcast the $$H^r_{*,j}$$

values. Then, all honest participants will eventually obtain a valid vector.

---

Algorithm 3 SodsBC++: pqPRBC + pqMVBA (for participant $p_i$ in the k-th consensus round after $H^r_{i,j}$ is first consumed.)

---

Let the predicate Q(M) = TRUE when the matrix M has n − f valid columns. Let a column be valid when it has at least $f+1$ valid hash values. Let $H^{r-k}_{i',j}$ be valid when $H^r_{i',j} = \text{Hash}(\ \dots\ \text{Hash}(H^{r-k}_{i',j}, i', j)\ \dots\ , i', j)$ after k times of hash computation.

// Prepare and Encryption
1: For $B_{p\_parti}$, AESEnrypt($aesKey_i$, $B_{p\_parti}$) → $B_{c\_parti}$.
2: Input $B_{c\_parti}$, $aesKey_i$ and secrets to $RBC_{*i}$.
// Consensus core
3: Upon finishing $RBC_{*j}$, broadcast $H^r_{i,j}$.
4: Upon receiving a valid $H^r_{i',j}$ from $p_{i'}$, insert $H^r_{i',j}$ to M.
// post-quantum MVBA
5: Upon a True Q(M), input ⟨MVBAecho, M⟩ to $RBC_{\alpha,i}$.
6: Upon receiving n − f valid (Q holds) $RBC_\alpha$ outputs, make columnC ← [$c_1, \dots, c_n$] ($c_j$ = 1 if the output of $RBC_{\alpha,j}$ is valid; otherwise 0), and input ⟨MVBAcommit, columnC⟩ to $RBC_{\beta,i}$.
7: Upon receiving n − f valid (at least n − f entries are 1) $RBC_\beta$ outputs, broadcast a share ⟨MVBAπ, $\gamma_i$⟩ from the awVSS pool.
8: Upon receiving f + 1 valid ⟨MVBAπ, γ⟩ messages, reconstruct the secret Γ and generate Π from Γ.
9: l ← 0
10: repeat -continued Algorithm 3 SodsBC++: pqPRBC + pqMVBA (for participant $p_i$ in the k-th consensus round after $H^{r}_{i,j}$ is first consumed.)

11: $l \leftarrow l + 1$; $a \leftarrow \Pi(l)$. Broadcast $\langle$MVBAvote, 1$\rangle$ if columnC$_a$ is valid; otherwise $\langle$MVBAvote, 0$\rangle$.

12: Set bbaVote $\leftarrow$ 1 if receive at least $f + 1$ $\langle$MVBAvote, 1$\rangle$. Set bbaVote $\leftarrow$ 0 if $RBC_{\alpha,a}$ finishes but $Q(M_a)$ does not hold, or receive $2f + 1$ $\langle$MVBAvote, 0$\rangle$. Accept a $\langle$MVBAvote, 0$\rangle$ from $p_j$ unless columnC$_j$[a] = 0. Input bbaVote to BBA.

13: until BBA outputs 1

// Decryption and output

14: Reconstruct aesKey$_j$, AES decrypt $B_{c\_partj}$ (set it as $\perp$ if fails), assign the agreed awVSS secrets from $p_j$, and make $B = \cup B_{p\_partj}$, if the j-th column of the $RBC_{\alpha,a}$ output is valid.

The core of Algorithm 3 is a post-quantum MVBA since our pqMVBA enhances Cachin et al.'s MVBA [10] uses a stronger broadcast primitive (RBC relative to CBC) and modify the corresponding RBC validation method (the normal broadcast round).

Theorem 2 Algorithm 3 satisfies the asynchronous blockchain validity, agreement and totality properties.

We first prove the pqMVBA core of Algorithm 3 (Line 5 to 13) satisfy the MVBA external validity, agreement, and termination properties. The pqMVBA-Integrity is satisfied by the protocol inspection. These MVBA properties are the basis of the aBFT properties.

pqMVBA-External-validity:

Assume honest participants output an invalid result, having a 1-value output from the BBA instance. This corresponds to at least one 1-value input from an honest participant, which means that at least one honest participant believes that the view of the selected index $\alpha$, i.e., the input of $RBC_{\alpha,\alpha}$ is valid. This is a contradiction that no honest participant will convince that an invalid view is valid in $RBC_{\alpha,\alpha}$.

- pqMVBA-Agreement: The BBA properties guarantee that the pqMVBA loop outputs a consistent index, e.g., $P_\alpha$, to honest participants. Due to the RBC agreement, honest participants will eventually deliver the same Ma from $RBC_{\alpha,\alpha}$ and output the same $M_\alpha$ in pqMVBA.
- pqMVBA-Termination: If an honest participant $p_i$ has a 1-output from BBA, then every honest participant will receive the BBA 1-output, which corresponds to a selected view as the output of $RBC_{\alpha,\alpha}$. As analyzed for pqPRBC-External-validity, all honest participants will eventually deliver the outputs of the n-f RBC* instances in $M_\alpha$.
- BFT properties: Since the pqMVBA outputs a consistent view $M_\alpha$, all honest participants output the consistent n-f block parts in the n-f RBC* instances in $M_\alpha$, leading to a consistent block part union, which ensures the BFT agreement. Since the consistent block part union corresponds to a specific block round, the BFT total order is also obtained as the BFT agreement is achieved for every block round. Moreover, SodsBC++ does not modify the basic MVBA-ACS approach to achieve aBFT, naturally following the BFT liveness property.

SodsBC++ Communication Complexity. Since a preprocessed nest hash value can be used many times, the communication overhead for committing the hash value $$H^{rk}_{i,j}$$

in a special transaction is omitted. In the Done step of an RBC instance, each participant broadcasts its hash value $$H^{rk}_{i,j}$$

leading to the $O(\lambda n^2)$ bits communication complexity, for which $\lambda$ is the length of a post-quantum hash function. The pqMVBA loop in Algorithm 3 terminates at an expectation of three rounds to select an honest view. Therefore, the number of common random coins the pqMVBA requires is 1+3×4=13 in expectation, and the size of each awVSS batch is 13. Hence, n pqPRBCs with piggybacked messages communicate $O(|\mathcal{B}|n+\lambda n^3 \log n+14\lambda n^3)$ bits.

Next, n $RBC_\alpha$ instances require the $O(n^2|M|+\lambda n^3 \log n)=0(\lambda n^4)$ since $|M|=O(\lambda n^2)$ communication. n $RBC_\beta$ instances communicate $O(n^2|rowC|+\lambda n^3 \log n)=O(\lambda n^3 \log n)$ since $|rowC|=O(n)$ bits. The communication complexity of n normal broadcast instances is $O(n^2)$. The constant number of BBAs spend the communication overhead of $O(\lambda n^3 \log n)$. The secret reconstructions for O(n) shared AES keys require the $O(\lambda n^3 \log n)$ bits communication. In total, the communication overhead of SodsBC++ is $O(|\mathcal{B}|n+\lambda n^4)$ bits, slightly larger than the quantum-sensitive Dumbo, $O(|\mathcal{B}|n+\lambda n^3 \log n)$. However, SodsBC++ can be faster than Dumbo because of using significantly less computation overhead.

We implemented Honeybadger [34], SodsBC, Dumbo [25] and SodsBC++ in a unified program architecture based on Python 3.6 [4]. The same libraries of Honeybadger and Dumbo (e.g., zfec for RS coding) were used for evaluation. The four prototypes are evaluated in the same AWS cloud region (Tokyo, ap-northwest-1)[5], using n=4 to n=100 t2.medium virtual machines (2vCPUs, 4 GB memory).

The evaluation follows the same workflow and benchmark as the quantum-sensitive aBFTs [18, 25, 34]. There is a trust setup offering threshold encryption keys and threshold signature keys for both Honeybadger and Dumbo, and offering distributed coins for SodsBC and SodsBC++. Then, SodsBC/SodsBC++ consumes existing coins and generates fresh coins for the future simultaneously as our concurrent preprocessing design. Besides, the trust setup also provides $n^2$ preprocessed and committed nest hash values for SodsBC++. In SodsBC and SodsBC++, the piggybacked secret messages in the first step of RBC instances are AES encrypted using a common key.

The evaluation selects a dummy transaction sizing 250B as the previous testings [18, 25, 34], which is the size of a typical Bitcoin transaction (quantum-sensitive). A post-quantum transaction structure keeping around 250B for a blockchain payment. Also, every participant proposes an identical size of block parts in our implementations, and each block part has 5,000 to 40,000 transactions (to 20,000 when n=100).

The latency of these four protocols is recorded from the local view of every participant. FIGS. 5, 6, 7 and 8 show the view from a participant (e.g., $p_{40}$) to compare the latency of different protocol components, in a typical setting where n=100 and $\mathcal{B}_{part}$ has 20,000 transactions. The (n-f)-th fastest local latency is regarded as the system latency, among all n participants.

Latency

SodsBC v.s. Honeybadger. Although the communication complexity of SodsBC (i.e., $O(|\mathcal{B}|n+\lambda n^4 \log n)$) has a factor of $O(\lambda n)$ worse than Honeybadger [34] (i.e., $O(|\mathcal{B}|n+\lambda n^3 \log n)$), the results show that SodsBC is outstandingly faster than Honeybadger. In the typical setting, SodsBC spends (87 seconds) around 100 seconds less latency than Honeybadger (186 seconds) for one consensus, an improvement of $$\frac{186-87}{186} \approx 53\%.$$

Figure 5:
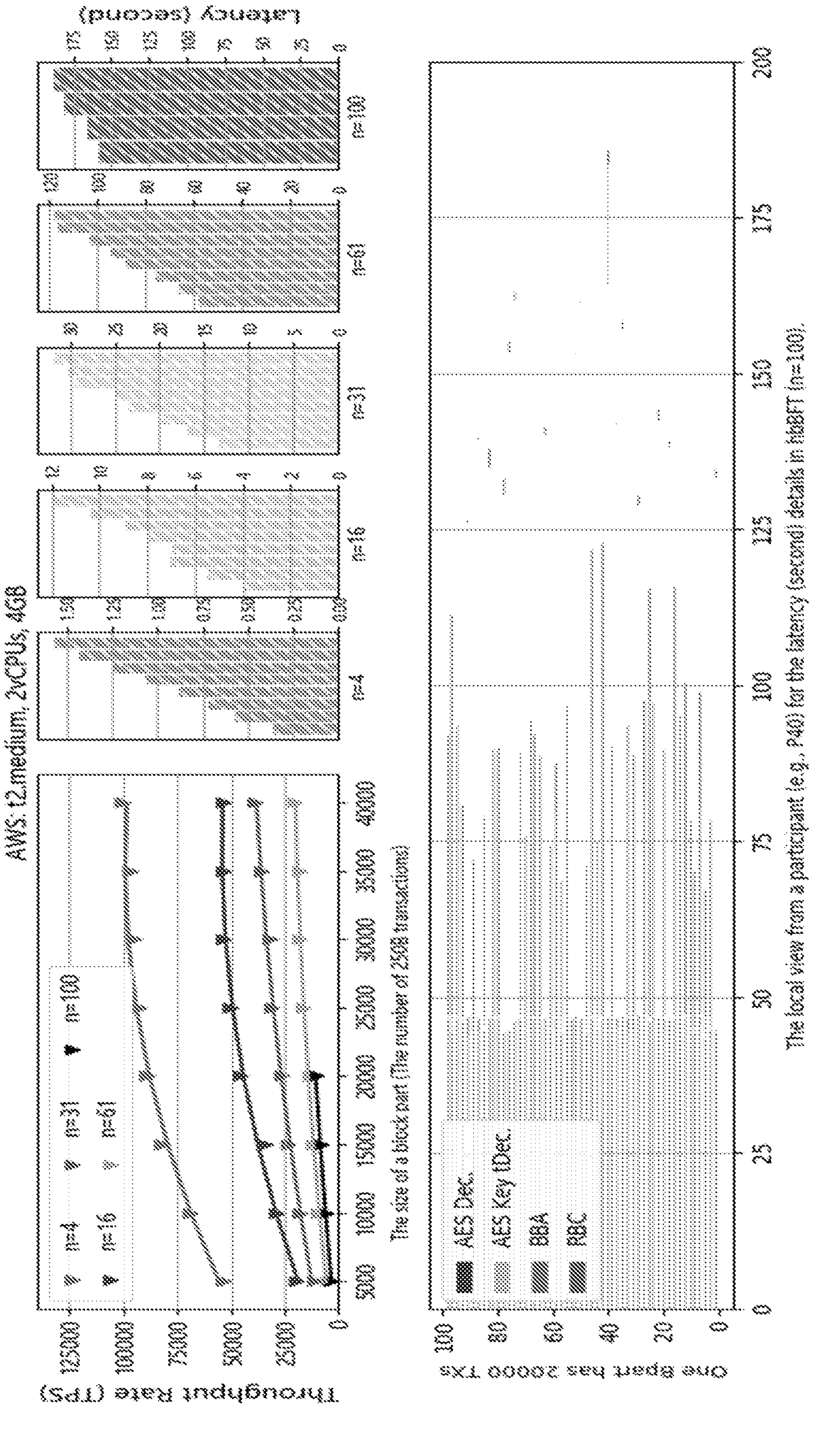
FIG. 5 shows Quantum-sensitive Honeybadger BFT implementation evaluation.
Figure 6:
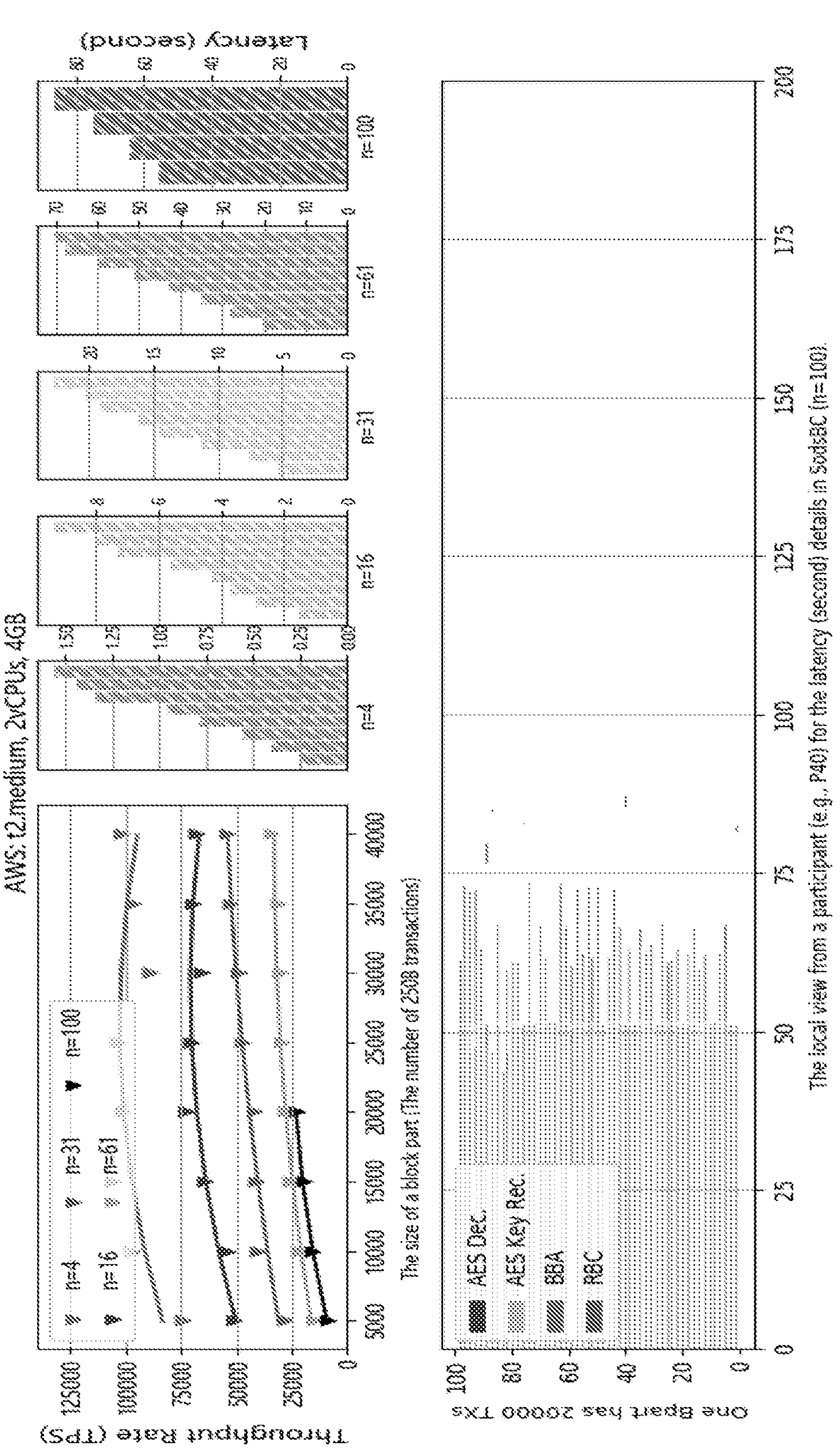
FIG. 6 shows Post-quantum SodsBC BFT implementation evaluation.

FIGS. 5 and 6 reflect the SodsBC efficiency improvements in two aspects.

- The faster common random coin invocations. In Honeybadger, n BBAs spend around 118 seconds while n BBAs only spend 34 seconds in SodsBC. SodsBC participants spend much less time consuming post-quantum coins via symmetric cryptography and algebra operations for coin component reconstructions, the latency of which is much shorter than the one of quantum-sensitive and heavy bilinear map pairings in Honeybadger. Even though a SodsBC coin is one-time used, the coin production overhead is negligible. Participants spend almost the same time for all n RBCs (SodsBC spends 51 seconds and Honeybadger spends 46 seconds). There is not an obvious difference for communicating the extra piggybacked secret sharing messages in SodsBC.
- The faster anti-censorship solution. In Honeybadger, one bilinear map pairing spends several milliseconds, and threshold-decrypting n AES keys require (f+1)×n pairing operations leading to around 19 seconds when n=100 and f=33 in the typical setting. Instead, reconstructing n AES keys spend a negligible time in SodsBC.
- SodsBC++ v.s. Dumbo. SodsBC++ and Dumbo are generally better than SodsBC and Honeybadger when the number of participants is increasing, since the bottleneck of SodsBC and Honeybadger lies in the expected logn rounds for n parallel BBA instances.

SodsBC++ is remarkably faster than Dumbo when n is not so large (n=4, n=16 and n=31) in the performed testings. When n=61 and n=100, the latency of SodsBC++ is still faster than the one of Dumbo. In the typical setting, the consensus latency of SodsBC++ (i.e., 67 seconds) is 5 seconds less than the latency of Dumbo (i.e., 71 seconds); the improvement is around 6%. Compared with Dumbo, SodsBC++ achieves a shorter latency due to three improvements.

- The faster common random coin invocations. Even though the invocation of our post-quantum coins is faster than the one of the quantum-sensitive competitors, this effect is not obvious as the MVBA-ACS architecture requires a small number of coins in SodsBC++ and Dumbo.
- The faster anti-censorship solution. This improvement is still remarkable between SodsBC++ and Dumbo[6].
- The faster MVBA predicates. For the last Done step in n PRBCs, Dumbo participants construct O(n) threshold signatures spending around 3.66 seconds, while SodsBC++ participants verifies $O(n^2)$ nested hash values only consume 0.69 seconds.

The two rounds of n RBCs in SodsBC++ spend more time than the two rounds of n CBCs in Dumbo since one RBC has a factor of $O(\lambda n \log n)$ larger communication complexity than the CBC complexity. However, the RBC-CBC time difference is not significant when n is not so large. When n is large, the faster and post-quantum anti-censorship solution and MVBA predicates still make up the worse efficiency of 2n RBC instances, which still helps SodsBC++ run faster than Dumbo.

Throughput

The largest throughput in theory has been calculated by $$\frac{n|\mathcal{B}_{part}|}{\text{Latency}}$$

for Honeybadger and SodsBC[7], and by $$\frac{(n-f)|\mathcal{B}_{part}|}{\text{Latency}}$$

for Dumbo and SodsBC++, respectively. FIGS. 5-8 illustrate the throughput variation trend for different sizes of transactions in one block part or different network scale. The throughput for all four protocols in Tab. 1 were compared when n=4 or n=100 and $\mathcal{B}_{part}$ has 20,000 transactions.

TABLE I

The performance when n = 4 or n = 100, $|\mathcal{B}_{part}|$ = 20,000 transactions

| | n = 4 | | n = 100 | |
|---|---|---|---|---|
| Protocol | latency (second) | TP (TPS) | latency (second) | TP (TPS) |
| Honeybadger | 0.89 | 89,888 | 185.86 | 10,760 |
| SodsBC | 0.79 | 101,266 | 87.17 | 22,944 |
| Dumbo | 1.05 | 57,143 | 70.64 | 18,969 |
| SodsBC++ | 0.64 | 93,750 | 67.16 | 19,952 |

(TP: throughput. TPS: transactions per second. The latency is from the (n − f)-th slowest participant.).

Table I shows when n=4, SodsBC can achieve around 101,000 TPS compared with 90,000 TPS for Honeybadger. When n=100, the throughput for SodsBC is 23,000 TPS, while the corresponding for Honeybadger is 11,000 TPS. In both settings, SodsBC achieves a higher throughput rate than Dumbo. It is clear that SodsBC can significantly outperform Honeybadger for different network scales.

SodsBC++ can achieve around 94,000 TPS and 20,000 TPS when n=4 and n=100, respectively. Correspondingly, the throughput for Dumbo in n=4 or n=100 is 57,000 TPS and 19,000 TPS, respectively. This result shows that SodsBC++ has better performance than Dumbo with post-quantum security by design. When n is small, the performance advantage is obvious.

Even though SodsBC++ can be the fastest protocol, SodsBC has the best "largest throughput rate in theory" since SodsBC may collect all n block parts in one block part union.

The practical throughput considers the random selection in each un-verified transaction pool when each participant packages a block part, to avoid selecting overlapping transactions. SodsBC and SodsBC++ also supports the random bucket technique for the unverified transaction pool, in order to mitigate the duplicated-transaction attack.

The Global Wait-Free Bootstrap

Figure 9A:
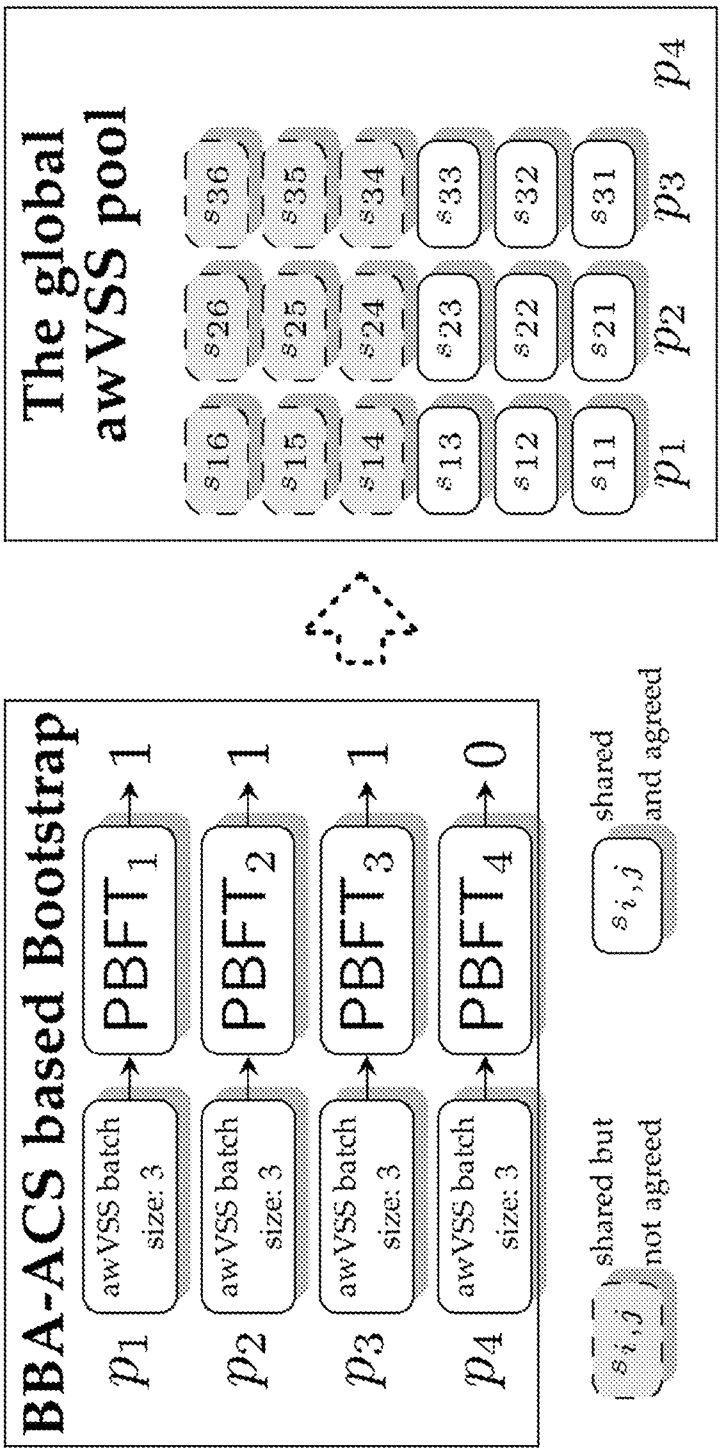
FIG. 9A shows a "wait-free" bootstrap using the BBA-ACS architecture. Each PBFT finalizes an awVSS batch. In this example, during the waiting time to 0-finalize $awVSS_4$, $p_1$, $p_2$, and $p_3$ launch extra awVSS batches contributing to the pool.

The SodsBC/SodsBC++ common random coin scheme offers randomness for an aBFT. However, since each block round only constructs fresh coins for future usage, there is no coin to be used in the very beginning. Usually a setup phase assigns the keys/coins as a bootstrap process. The present invention suggests a practically wait-free alternative. Therefore, the timing limitation in the bootstrap has been reinforced, i.e., allowing timeouts, and design the bootstrap in a similar way as a BBA-ACS-based aBFT, which is depicted in FIG. 9.

In the proposed bootstrap, all participants keep running awVSS in batches. These participants also join n PBFT [28] instances to agree on the n awVSS batches, rather than n BBA instances in the regular stage as in Honeybadger and SodsBC (Algorithm 1). Since a PBFT is a concrete protocol of the BA primitive, it is reasonable to replace n BBAs with n PBFTs.

These concurrent PBFTs allow honest dealers to contribute to the global completed awVSS pool, later used as coins, without significant influences of the waiting time delayed by malicious dealers. Even though malicious participants can block some PBFT processes, other honest participants may be required to continue to launch extra awVSS batch instances, before all PBFT instances finish. The increasing the size of the coin pool is still Byzantine wait-free. The generated (but not agreed upon) secrets (extra shared during the local waiting time) can be agreed in the first block with newly generated secrets. In the example of FIG. 9, $PBFT_4$ may spend a lot of time to wait for 0-finalizing $awVSS_4$. During this time, $p_1$, $p_2$, and $p_3$ launch extra awVSS batches.

Adding one partial-synchronous round in the very beginning before the full asynchronous protocol is performed using asynchronous MPC [5], which is referred to as a hybrid network model. This model does not change the fact that SodsBC/SodsBC++ is a fully asynchronous protocol in regular stages when a one-time setup provides the first coins or alternatively when these coins are provided by a partial-synchronous bootstrap. When the partial-synchronization overcomes the distrusted worry for a trusted third party, SodsBC/SodsBC++ can also be launched from the distributed coins generated in a trusted setup, and start the first/genesis block in a fully asynchronous way.

An Efficient Post-Quantum Transaction Structure

When a user wants to spend money in blockchain, the user should prove his balance ownership. A Bitcoin user offers his signature related to the public key input of a transaction. If the ECDSA signature scheme is directly replaced with a hash-based and post-quantum signature scheme, the size of a transaction will be very large.

If a transaction ownership proof is only one-time used, the user can expose some secrets in a spent transaction related to the previous public information in the previous deposit transaction. In order to reach unforgeability, the user should not directly transfer his secret to a participant who may be malicious. Therefore, a first-commit-then-unlock scheme is proposed to divide an original transaction into two successive transactions. A committed transaction will commit a payment to a payee with an encrypted pad. An unlock transaction will open a committed transaction (decrypt the pad) and prove the ownership of a user by revealing the secret of the money source.

Example $$TX_0\colon * \overset{\$100}{\rightarrow} \text{Hash}(\text{Hash}(\text{secret}_{Alice}\big)\big)$$

$$TX_{comm}\colon \text{Hash}(TX_0) \overset{\$100}{\rightarrow} \text{Hash}(\text{Hash}(\text{secret}_{Bob}\big)\big),$$

$$AESEncrypt(\text{secret}_{Alice})_{Key=Hash(secret_{Alice})}$$

$$TX_{unlock}\colon \text{Hash}(TX_{comm}), (\text{Hash}(\text{secret})_{Alice}\big)$$

Assume a coin-base and agreed transaction minting $100 for Alice in $TX_0$. $TX_0$ includes the twice hash of the secret of Alice. When Alice should transfer the money to Bob, Alice constructs a committed transaction $TX_{comm}$ including the point to $TX_0$ to refer the money resource, also including the twice hash of the secret of Bob. $secret_{Alice}$ is AES-encrypted under the AES key Hash($secret_{Alice}$). Alice proposes $TX_{comm}$ and waits for that $TX_{comm}$ is committed in the blockchain.

After confirming $TX_{comm}$, Alice generates an unlock transaction $TX_{unlock}$, which points to $TX_{comm}$ and decrypts the ciphertext of $secret_{Alice}$ in $TX_{comm}$ by the AES key Hash($secret_{Alice}$). If $secret_{Alice}$ corresponds to the twice hash in $TX_0$, then $TX_{unlock}$ is enabled and Alice's money is indeed transferred to Bob. For the next payment, $TX_{comm}$ acts as the next $TX_0$ (money source) for Bob.

If $TX_{comm}$ or $TX_{unlock}$ is refused by a malicious participant, Alice can sent $TX_{comm}$ or $TX_{unlock}$ to another participant. A malicious participant cannot modify $TX_{comm}$ without knowing $secret_{Alice}$. Also, if a malicious participant steals $secret_{Alice}$ from $TX_{unlock}$, it cannot steal Alice's money. The modified $TX_{comm}$' and $TX_{unlock}$' will not be accepted since $TX_{comm}$ is previously agreed. Honest participants will scan all pending committed transactions when enabling an unlock transaction.

$TX_{comm}$ and $TX_{unlock}$ spend five 32B values when deploying AES-256 and SHA-256. When considering other relevant information and two payees, it is still possible to make the total size of the two successive transactions around 250B as similar as the size of a typical Bitcoin transaction used as benchmark.

The proposed post-quantum transaction should prove the ownership of a crypto-coin (i.e., a payment). If the Bitcoin-liked wallet is needed, a lattice-based signature may be better to support post-quantum and multi-use signatures.

Asynchronous Blockchain and Post-Quantum Blockchain Protocols

Asynchronous blockchain consensus (aBFT) protocols try to achieve a consistent block part union, i.e., a consistent block, via agreeing on the block parts proposed by different participants, which can be distinguished to BBA-ACS and MVBA-ACS architectures.

Under the BBA-ACS paradigm [6], Honeybadger BFT [34], BEAT and EPIC [29] rely on n parallel BBA instances [36] to finalize each RBC-based block part proposal one-by-one, utilizing threshold signature or pseudorandom function (PRF) based common random coins as the randomness source. However, when n increases, the slowest BBA instance may become the system bottleneck especially when the consuming time for a BBA used common random coin is not negligible. HoneyBadger authors [34] already report around six minutes for one block when n=104 in a WAN network, and recognize that the heavy use of bilinear map pairings for threshold signature [7] may account for the bottleneck. BEAT [18] focuses on several different performance metrics and application scenarios for aBFTs, replaces the bilinear map pairing-based threshold signature with a Dlog-based PRF [11], and proposes a homomorphic fingerprint [26] based partial blockchain structure. EPIC [29] considers an adaptive adversary and deploys an adaptive security PRF-based common random coin scheme [28, 31].

Dumbo [25] firstly adopts the MVBA-ACS architectures to achieve an aBFT protocol, which decreases n BBA instances to only a constant number. Aleph [21] combines an MVBA with the direct acyclic graph block structure resulting in an asynchronous permissionless blockchain.

Besides the usage of MVBA in the blockchain consensus area, the design of MVBA is also developing. Cachin et al. [10] first introduce external validity to MVBA, which enforces an output from a malicious participant to also satisfy a pre-defined predicate, in order to dramatically increase the probability of a valid output. Ittai et al. [1] employ the idea of Hotstuff [44] and four-stage lock each participant input, which removes the $O(n^3)$ communication complexity item of Cachin et al.'s MVBA [10]. Dumbo-MVBA [32] further adopts erasure code and vector commitment to decrease the communication overhead of an MVBA protocol to $O(\ell n+\lambda n^2)$, which is optimal. Still, these MVBA designs [1, 10, 32] heavily rely on quantum-sensitive threshold signature.

Post-quantum blockchain consensus protocols can be distinguished into two types, i.e., for a permissioned or permissionless setting. In the scope of permissioned blockchain, although recent researches make a leap in the efficiency of a partial-synchronous or asynchronous BFT, there is less concern about the potential quantum risk when designing a long-term used permissioned blockchain. More importantly, designing a post-quantum blockchain should not directly replace quantum-sensitive cryptographic tools like threshold signature. For one thing, to the best of our knowledge, there is no post-quantum non-interactive threshold signature. The state-of-the-art post-quantum signatures can not be converted to a non-interactive threshold scheme [15]. For another thing, most post-quantum signature schemes like lattice-based or hash-based are not efficient in length and computation. It may amplify the current BFT bottleneck if naively replacing the quantum-sensitive cryptographic tools. Praxxis [43] follows the Thunderella optimal responsiveness idea [37] to construct an efficient and quantum-safe blockchain based on $WOTH^+$ signatures. [8] Even though $WOTH^+$ is the state-of-the-art one-time signature scheme achieving quantum-safety, Praxxis [43] still requires the network to be partially synchronous.

Several permissionless blockchain solutions try to enhance post-quantum security also without considering the efficiency.

BitcoinPQ ["https://bitcoinpq.org/download/bitcoinpq-whitepaper-english.pdf"] adopts post-quantum hash function Equihash96x3 and hash-based signature scheme XMSS [9] to resist quantum adversaries. Abelian adopts lattice-based cryptographic schemes and especially uses ring signature and zero-knowledge proof in lattice to improve privacy. Shen et al. [39] suggest the multivariate signature scheme, Rainbow [16], in Ethereum.

However, these post-quantum improvements do not cope with or even further deteriorate the low-efficiency problem of the proof-of-work consensus. No matter in a permissioned or a permissionless setting.

A post-quantum framework is introduced for aBFTs, and this framework is instantiated to two protocols, SodsBC and SodsBC++. Concurrent preprocessing is used to generate three cryptographic objects: symmetric keys, common random coins, and nested hashes. These preprocessed objects help SodsBC or SodsBC++ achieve aBFT under the BBA-ACS or MVBA-ACS architecture, respectively. Evaluation results show that both SodsBC and SodsBC++ are faster than the quantum-sensitive competitors Honeybadger and Dumbo by 53% and 6%, respectively.

Using a Permissionless Blockchain

A permissionless blockchain is more distributed, in which a participant can freely join and leave the consensus blockchain system. Many hybrid consensus blockchain systems pursue decentralization and high efficiency simultaneously, by utilizing a dynamic membership consensus committee [1, 29, 30]. The idea of using Proof-of-Work (PoW—a form of cryptographic zero-knowledge proof in which one party (the prover) proves to others (the verifiers) that a certain amount of computational effort has been expended for some purpose) or Proof-of-Stake (POS—a type of consensus mechanism by which a cryptocurrency blockchain network achieves distributed consensus) to select a consensus committee follows the PoW or PoS randomness.

The fact that SodsBC keeps producing fresh coins by a stream of distributed secrets provides a good randomness source. Following the network layer setting of a permissionless blockchain like Bitcoin [1, 28, 30] (in which the communication between a user and a participant is based on gossiping), the communication inside a committee should be in direct, private and authenticated links as discussed above.

According to this embodiment, the present invention also provides a dynamic consensus committee member selection mechanism to extend SodsBC to a permissionless blockchain. It is assumed that there is a list containing the current online participant candidates, the list can be based on the blockchain record for proof of (a needed threshold) stack (and/or transactions rights to other members based on proof of stack). The public information of one participant consists of its IP address ($IP_{name}$) and its public key of a hash-based quantum-safe signature scheme ($PK_{name}$), which is denoted by $Pub_{name}$:$IP_{name}$, $PK_{name}$. The time period in which one committee dominates the blockchain is called an epoch. We do not stipulate the length of an epoch. During the current epoch, the current n-size committee will select the new n-size committee and waits for that the new participants finish the bootstrap. Until then, the current committee will handle over the right to create blocks to the new committee, which is also called committee reconfiguration [1, 30].

Figure 9B:
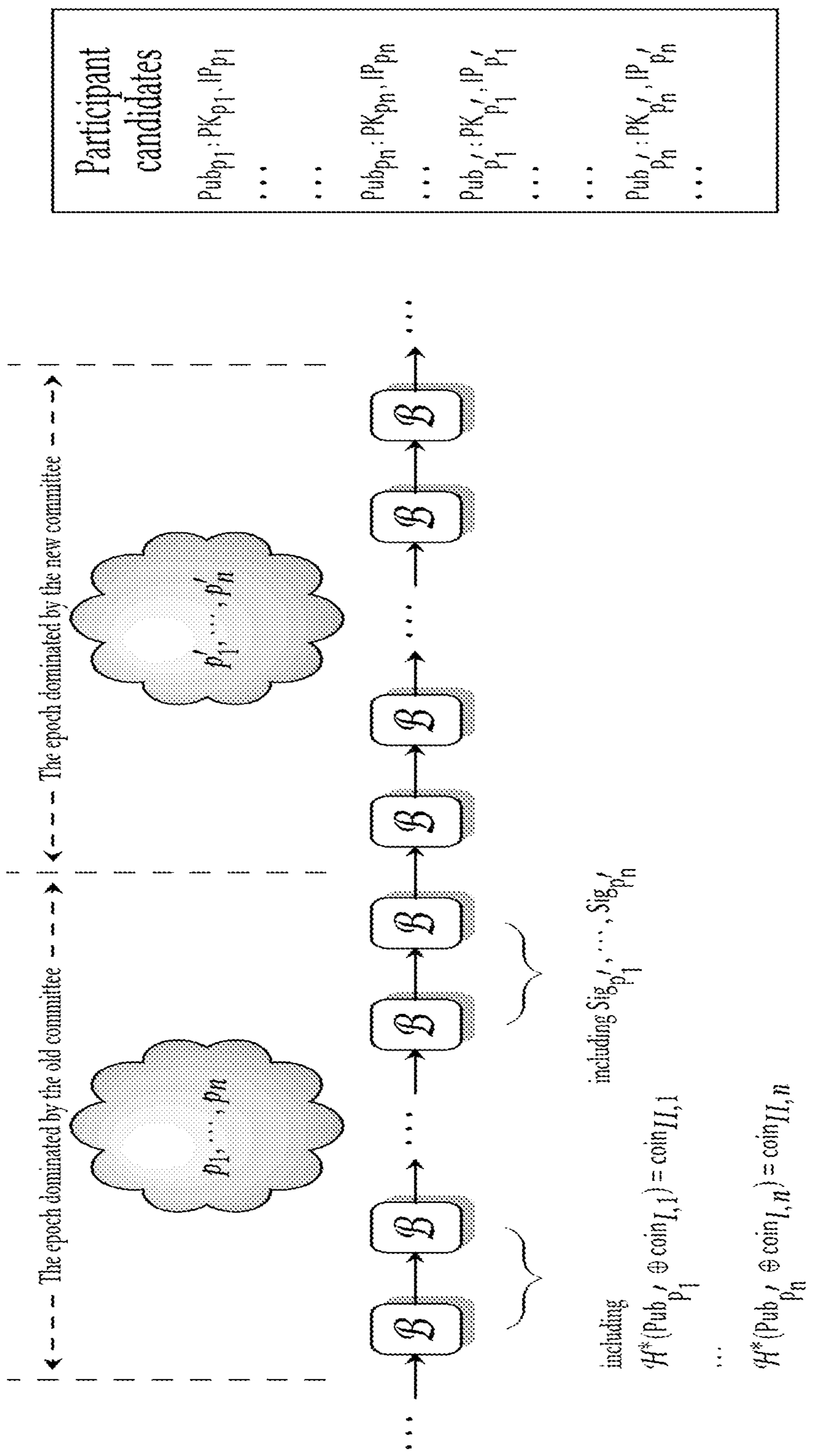
FIG. 9B shows a committee reconfiguration example when the committee size is n.

FIG. 9B shows a committee reconfiguration example when the committee size is n. The old $(p_1, \ldots, p_n)$ and new $$(p'_1, \ldots, p'_n)$$

committees dominate two successive epochs, respectively. The old participants first select the new participants and agree on the public information in the blockchain, and then wait for the n-f new participants to finish the bootstrap process.

We denote the module m operation of a hash result by $\mathcal{H}^*(\bullet)=\mathcal{H}(\bullet)$ modm, and also denote two special common random coin types reconstructed from f+1 secrets by $$\text{coin}_I = \sum_{i=1}^{f+1} \text{secret}_i \text{mod}\left|\text{Pub}_{name}\right|, \text{coin}_{II} = \sum_{i=1}^{f+1} \text{secret}_i \text{mod} m.$$

The field size to represent a secret should satisfy the responding length, i.e., max{$|\text{Pub}_{name}|$, m}. These special coins are distinguished from the regular coins for BBA randomness. When honest participants reconstruct two special coins, they select (with high probability) one participant candidate from the list as $\mathcal{H}^*(\text{Pub}_{name} \oplus \text{coin}_I)=\text{coin}_{II}$.

The parameter m can be larger by a constant factor, reducing the collision probability, avoiding the selection of more than one participant at a time. As this mode, the current participants $p_1, \ldots, p_n$ repeat this selection for O(n) times to select the n new participants $$p_1', \ldots, p_n'$$

utilizing O(2n) special coins. This selection method ensures uniform selection across all participants, such that the choice of any two new participants is not correlated. After the selections, the current participants write the selection results to the blockchain.

After the selections, the new n participants start to create end-to-end private and authenticated connections between every two participants. The channel requirements are the same as discussed above. Then, the new participants bootstrap their common random coins by AWSS batches. Each AWSS batch is finalized by a PBFT [11] as discussed above. When each new participant finishes its PBFT instance, this new participant (e.g., $$p_1'$$

as a user) sends a special transaction to an old participant including the signature of $$p_1', \text{ i.e., } Sig_{p_1'},$$

to inform the old committee that $$p_1'$$

finishes the bootstrap. Until there are n-f special transactions including the signatures of n-f new participants, the new bootstrap is finished and the old committee stops creating blocks. During the committee reconfiguration, the new committee members act as normal users related to the old committee members. The communication between the old and new committees is also based on gossiping.

It is possible to use a hash-based and quantum-safe signature scheme as $\text{Sig}_{name}$, i.e., $\text{WOTH}^+$ [21] to introduce our dynamic committee member selection mechanism. However, it is still possible to replace this signature scheme as the first-commit-then-unlock technique, to make the signature transactions (including $\text{Sig}_{name}$) smaller. This replacement would not decrease the transaction procession rate. The old committee will denominate a longer time to wait longer for the bootstrapping of the new committee, which does not harm the throughput rate.

The present invention also provides a novel quantum-safe smart contract system that is fully robust in both preprocessing and online Multi-Party Computation (MPC) phases, and does not offload the computational burden to the contract users, called hereinafter SodsMPC.

SodsMPC permissioned servers (verification nodes) execute contracts by secure multi-party computation (MPC) protocols. MPC ensures contract execution correctness, while keeping the data privacy. Moreover, SodsMPC accomplishes the contract business logic privacy while protecting the contract user anonymous identity simultaneously. The logic of a contract is express by a finite state machine (FSM). A state transition of the FSM is represented by a blind polynomial with secret-shared coefficients. When using MPC to compute this blind polynomial, contract business logic privacy is obtained. These coefficients which control the logic are binary secret shares. A base conversion method is also proposed, among binary and integer secret shares by MPC.

Contract anonymity originates from the "mixing-then-contract" paradigm. The online phase of the SodsMPC mixing is a multiplication between a preprocessed permutation matrix and an input vector in the form of secret sharing, which accomplishes a fully randomized shuffle of the inputs and keeps the secret share form for the following contract execution. All SodsMPC components, including a verifiable secret sharing scheme, are quantum-safe, asynchronous, coping with $t<n/3$ compromised servers, and robust (tolerates Byzantine servers) in both preprocessing and online phases.

A set of n servers is denoted by $\mathcal{S}=\{S_1, \ldots, S_n\}$, and the N users/clients in a contract by $\mathcal{C}=\{C_1, \ldots, C_N\}$. The MPC is defined over a finite prime field $\mathbb{F}_p$. p should be larger than max{N, $2n \cdot 2^K$, n+t+1}. p>N is due to the permutation matrix verification algorithm, while $p>2n\cdot 2^K$ originates from the need to verify a claimed Beaver tuple and a square tuple (SqrtVer, Algorithm 4_MPC). κ is the statistic secure parameter used to limit the error probability under $2^{-\kappa}$. The value of κ does not affect a statistical I.T. secure protocol to resist a quantum adversary.

Publicly known distinct elements $\{\alpha_1, \ldots, \alpha_n\}$ and $\{\beta_1, \ldots, \beta_t, \beta\}$ are selected from $\mathbb{F}_p$ as the server identities and secret identities, respectively. Thus, p>n+t+1 ensures that the assignment is not in conflict. For a secret s, a share of s is denoted by [s], or the specific share $[s]_i$ for a server $S_i$.

MPC Building Blocks

Beaver triple tuple and its robust preprocessing: SodsMPC will handle a multiplication gate for secret shares during the protocols, utilizing a preprocessing Beaver tuple [4]. For two secret shares [x] and [y] and a tuple, ([a], [b], [ab]=[c]), servers reconstruct two masked inputs d=x−a and e=y−b, and locally derive the multiplication shares of the inputs [xy]=de+d[b]+e[a]+[c]. Choudhury et al. have achieved robustly preprocessing Beaver tuples.

Asynchronous consensus for consistent MPC inputs: A binary Byzantine agreement (BBA) tackles the asynchronous barrier with randomization. The asynchronous common subset (ACS) [6] is significant in asynchronous MPC, which agrees on the input values from all n servers and outputs an agreed subset ACSResult. ACSResult includes at least n-t servers, each of which is related to a BBA instant having 1-output. Since an asynchronous permissioned blockchain also adopts this ACS architecture, SodsMPC is adaptive to the blockchain projects like Honeybadger [33] and BEAT [25].

SodsMPC Working Flow

Figure 10:
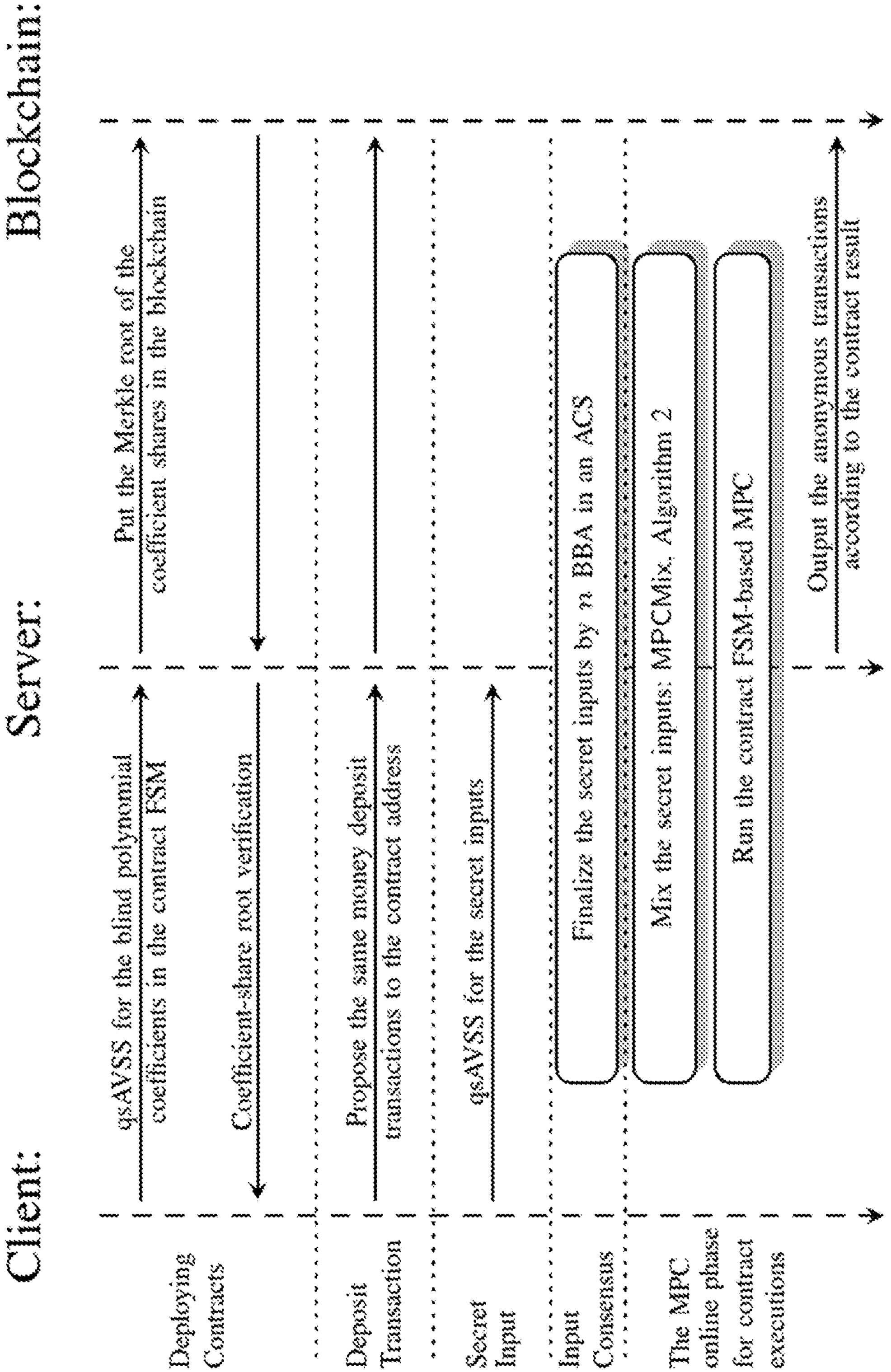
FIG. 10 illustrates the SodsMPC working flow that starts from the contract deployment process, according to an embodiment of the invention.

FIG. 10 illustrates the SodsMPC working anonymous and private contract workflow that starts from the contract deployment process, according to an embodiment of the invention. One of the N contract clients/users is assigned to be the contract creator, $C_{creator}$·$C_{creator}$ shares all coefficients (including zero coefficients) of a blind polynomial, by qsAVSS (Algorithm 7) for the t+1 reconstructed threshold. $C_{creator}$ will extra create a special transaction including the Merkle tree roots of all the coefficient shares. After at least n-t servers verify this transaction and put this transaction in the blockchain, the contract is well-deployed. At the same time, $C_{creator}$ also communicates with other N−1 contract clients for the actual polynomials and for the shares distributed by $C_{creator}$, which helps $C_1, \ldots, C_{N-1}$ to verify the coefficient share roots. Then, $C_1, \ldots, C_{N-1}$ decide whether to join the contract created by $C_{creator}$. Extra requirements not made for whether $C_1, \ldots, C_{N-1}$ and $C_{creator}$ are honest. It is only possible to guarantee that a contract creator deploys a consistent contract, while a meaningless contract without the client participating will be eventually disregarded. For a contract execution, N clients first deposit (typically a fixed amount of) money to the contract address. Then, N clients offer their secret inputs to the contract MPC program by secret sharing (qsAVSS, Algorithm 7_MPC). There is an asynchronous consensus for the inputs each server receives. Then, SodsMPC servers run MPCMix (Algorithm 2 MPC) for mixing the secret inputs before executing the contract logic, which obeys the proposed "mixing-then-contract" paradigm. After mixing, at most t malicious servers (and other clients and blockchain observers) cannot infer the permutation relation between the contract inputs and the outputs. The anonymous level depends on how many honest clients join the contract (i.e., mixing). If at least two of the N clients are honest, it is sufficient to keep the identity private for the mixing output. To ensure a "mixing-then-contract" state, SodsMPC does not reveal the mixed inputs after mixing (in contrast, existing MPC-based mixing implementations, in particular, the mixing operation in HoneybadgerMPC-PowerMix [8] must reconstruct the mixing outputs. HoneybadgerMPC-SwitchNet [8] has a limited amount of random permutations by only swapping part of input pairs in a butterfly permutation network).

After mixing, servers would keep the integer secret share form for the mixed inputs according to the requirement of an actual contract, or convert the inputs to binary on demand by integerToBinary (Algorithm 1 MPC).

The Private Contract Business Logic

The description details how to express a contract by a blind-coefficient polynomial to protect the contract business logic, and introduces how to use a finite state machine (FSM) to make the polynomial computation more efficient. Then, the description details how several significant FSM constructions for a contract, including a binary comparator and a binary adder. Then, the description details how to blindly convert integer-binary secret shares to each other. It is assumed that each secret is correctly shared under the t+1 threshold to all n servers.

Blind-coefficient Polynomials and Finite State Machine

A smart contract can be a mutual-execution distributed protocol that runs by distrusted entities [37]. If this contract (a computer program) can be expressed by an arithmetic circuit, it is possible to use an MPC protocol to compute this contract. Furthermore, an arithmetic polynomial is a natural representative of an arithmetic circuit [38], so that a polynomial is expressive enough to reflect a contract having arithmetic logic. A boolean logic can be converted to an arithmetic logic when assigning 1/0 alues for True/False, respectively.

If the coefficients of the polynomial are also secret-shared, the contract business logic is also kept secret. Servers execute the computation steps without knowing which parts of the computation will be regarded as the result, so that they cannot know the contract business logic. For two contracts having different business logic, it is possible that these two contract polynomials have different computation overheads (different numbers of addition and multiplication gates). Hence, it is possible to pad the polynomial of the simpler contract as long as the polynomial of the more complex contract, by adding some dummy computations (e.g., adding zero or multiplying one, in secret shares), such that servers still cannot distinguish the business logic of two contracts because computing these two polynomials spends the same overhead.

However, directly computing a contract polynomial may not be efficient. For example, a three-input millionaire problem (find the maximum input index in the field GF(11)) can be encoded to a very long polynomial f (x, y, z), which has 909 monomials from 0 to $x^{10}y^{10}z^{10}$ (the coefficients of some terms are zero). Directly solving this polynomial (with all secret-shared coefficients) requires 30 rounds and around 20,000 multiplication gates [9], which is not efficient. For the logic of a contract, it is possible to first use a finite state machine (FSM) to model the contract logic, and then represent this FSM by an arithmetic polynomial with binary condition control flags.

A SWITCH-CASE pseudocode can show the state transitions in an FSM, so that different conditions will lead the state to transit to different CASE branches. An IF-THEN-ELSE logic is the simplest SWITCH-CASE architecture with only two branches (THEN and ELSE), i.e., a two-state FSM. It is possible to use one binary flag to control an IF-THEN-ELSE logic, i.e., to control the state transition in the two-state FSM. When assigning more bits to the control flags, the computation can support more complex logic as a SWITCH-CASE architecture (a more complex FSM).

Figure 11:
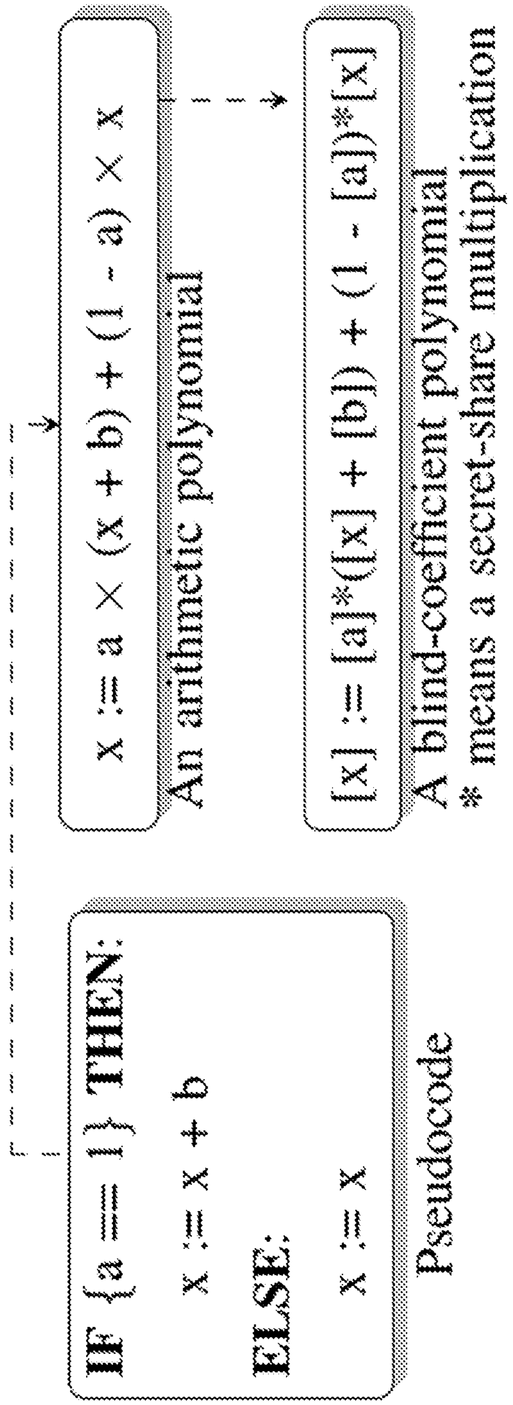
FIG. 11 shows different expression methods for a contract logic and how to convert an IF-THEN-ELSE logic into an arithmetic polynomial.

FIG. 11 s\hows different expression methods for a contract logic and how to convert an IF-THEN-ELSE logic into an arithmetic polynomial, in which 1/0 is assigned to boolean TRUE/FALSE, respectively, such that a boolean predicate can be converted to a binary control flag a. The arithmetic polynomial computes two branches of this logic (THEN and ELSE), but only one branch is actually enabled, depending on the a value. Then, when all internal variables in FIG. 11 are secretly shared (include the control flag a) and we compute the polynomial by an MPC protocol, we keep the logic privacy to the MPC execution entities, i.e., n servers. Still, these servers actually execute both THEN and ELSE branches, but they do not know which branch the contract designer specifies in the result. The multiplication for two secret shares (denoted by *) require an extra degree reduction, which can be avoided by a Beaver tuple.

Expressing the logic of a contract by an FSM is not only due to an efficiency concern. Using an FSM to design a smart contract also assists a contract programmer to express the correct design logic with fewer bugs [32], so that the FSM pattern is officially recommended to contract developers by the Ethereum community in the Solidity (the most popular contract programming language) tutorial documents [36].

Examples of FSMs for Contract Logic

Figure 12:
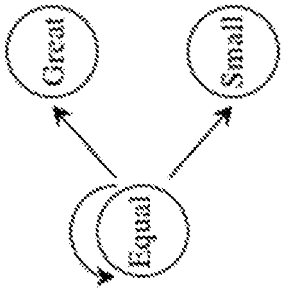
FIG. 12 illustrates an FSM-based three-case comparator (equal to, smaller than, greater than), binComp_3 for two binary 1-bit inputs in secret shares.
Figure 13:
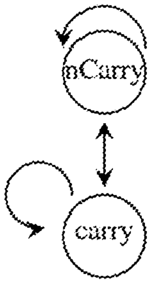
FIG. 13 shows an FSM-based binary adder with a carried bit binAdder, in which there is an extra output symbol for each transition.

The following description shows how to execute FSM state transitions when servers holding the secret shares of binary states and input symbols. FIG. 12 illustrates an FSM-based three-case comparator (equal to, smaller than, greater than), $binComp_3$ for two binary 1-bit inputs in secret shares, which can be simplified to a two-case comparator (not greater than, greater than), $binComp_2$. FIG. 13 shows an FSM-based binary adder with a carried bit binAdder, in which there is an extra output symbol for each transition. When servers blindly compute the FSMs, servers will obtain the shares of updated states and output symbols. At most $$t < \frac{n}{3}$$

malicious servers do not know the state transitions and the value of output symbols.

FSM Comparator: Equal to, Smaller than, and Greater than

Suppose Alice has $Input_a$ and Bob has $Input_b$. Their inputs can be regarded as a 2-bits Input, as the shares of 00, 01, 10 or 11. The transition result (comparison result) is also in the binary format. We assign two binary bits for updated states, by encoding $P_{equal}$=00, $P_{small}$=01, and $P_{great}$=10. The default initial state is $P_{equal}$. Although we define this comparator from two 1-bit inputs, this comparator also works for longer binary inputs when the comparison starts from the Most Significant Bit (MSB). If there is an unequal bit, the state will transit to $P_{small}$ Or $P_{great}$ and keep staying in this state. Servers which execute an FSM-based comparator do not know the state transition for each bit.

The i-th bit of a current state is denotet by $P_i$, the i-th bit of an input symbol by $Q_i$, for $i \in [1,2]$, respectively. After the encoding, the new state representative, denoted by $\overline{P}_i$, is:

$$\overline{P_1} = P_1 + (1 - P_1)\cdot(1 - P_2)\cdot[Q_1\cdot(1 - Q_2)] = P_1 + [1 - P_1 - P_2 + P_1\cdot P_2]\cdot[Q_1 - Q_1\cdot Q_2],$$

$$\overline{P_2} = P_2 + (1 - P_1)\cdot(1 - P_2)\cdot[(1 - Q_1)\cdot Q_2] = P_2 + [1 - P_1 - P_2 + P_1\cdot P_2]\cdot[Q_1 - Q_1\cdot Q_2].$$

In the 1st round, servers compute $P_1 \cdot P_2$ and $Q_1 \cdot Q_2$. In the 2nd round, $[1-P_1-P_2+P_1 \cdot P_2]\cdot[Q_2-Q_1 \cdot Q_2]$ and $[1-P_1-P_2+P_1 \cdot P_2]\cdot[Q_1-Q_1 \cdot Q_2]$ are computed. Hence, a transition of $binComp_3$ consumes 2 rounds and 4 multiplications.

By recalling the three-input millionaire problem example defined in the field GF(11), it is possible to use four binary bits to represent a value in GF(11). Thus, using $binComp_3$ twice for four bits only spends 16 rounds and 32 multiplications, which saves a lot of multiplication invocations compared with the overhead to solving a directly encoded blind polynomial.

FSM Comparator: Not Greater than, and Greater than

A three-case FSM comparator can be simplified to two-case, e.g., $P_{nGreat}$=1 for not greater than and $P_{great}$=0 for greater than. We use 1 to substract the first bit of the final state of $binComp_3$ as $binComp_2$, i.e., $\overline{P_{binComp_2}}$=1−$\overline{P_{binComp_3}(1)}$.

When $Input_a \leq Input_b$, $\overline{P_{binComp_3}(1)}=0$ and $\overline{P_{binComp_2}}=P_{nGreat}=1$. When $Input_a$>Input, $\overline{P_{binComp_3}(1)}=1$ and $\overline{P_{binComp_2}}=P_{Great}=0$. Therefore, $binComp_2$ also spends 2 rounds and 4 multiplications.

FSM Computation: A Binary Adder with Carry Bits

The states of binAdder can be encoded as whether the current addition requires a previous bit, i.e., $P_{nCarry}$=0 for no carry bit and $P_{carry}$=1 for a carry bit. When binAdder has two binary inputs from the Least Significant Bit (LSB), the state transits to an updated case according to if an addition renders a carry bit. The output symbol represents the additive result of two input bits without a carry bit. The FSM transition table is depicted in FIG. 13. The update state and output symbol are $$\overline{P} = (1 - P)\cdot[Q_1\cdot Q_2] + P\cdot[1 - (1 - Q_1)\cdot(1 - Q_2)] = Q_1\cdot Q_2 - 2P\cdot Q_1\cdot Q_2 + P\cdot(Q_1 + Q_2)$$

$$\overline{Q} = (1 - P)\cdot[(1 - Q_1)\cdot Q_2 + Q_1\cdot(1 - Q_2)] + P\cdot[(1 - Q_1\cdot(1 - Q_2) + Q_1\cdot Q_2] = P + Q_1 + Q_2 - 2Q_1\cdot Q_2 + 4P\cdot Q_1\cdot Q_2 - 2P\cdot(Q_1 + Q_2).$$

In the 1st round, servers compute $Q_1 \cdot Q_2$ and $P\cdot(Q_1+W_2)$. In the 2nd round, $P\cdot Q_1 \cdot Q_2$ would be calculated. In total, one transition of binAdder costs 2 rounds and 3 multiplications.

Only individual subroutine FSM for comparison and adder are illustrated. When parallelizing the execution of many subroutine FSMs, it is possible to speed up the blind execution for achieving abundant functionalities, such as a tournament sorting example described in Appendix D.

Secret Sharing Base Conversion: Binary and Integer

An integer secret x in the prime finite field $\mathbb{F}_p$ is denoted by the binary representation $x_{l-1}, \ldots, x_0$ (from MSB to LSB) when $l=\lceil \log_2 p \rceil$. The notation for all the binary secret shares is $[x]_B=([x_{l-1}], \ldots, [x_0])$.

Binary to Integer. The base conversion from binary secret shares to integer shares can be done locally and blindly without an interaction. The secret shares of integer x from the shares of binary bits $$[x_{l-1}], \ldots, [x_0] \text{ are } [x] = \sum_{i=0}^{l-1} 2^i \cdot [x_i].$$

Integer to Binary. Since there is not a mod 2 operation in a prime finite field, blindly converting an integer secret share to a binary share cannot be accomplished locally. We propose an integer-binary conversion protocol in Algorithm 1 MPC, which is enlightened by [18]. Compared with [18], our integerToBinary is more efficient in communication complexity (counting by the number of multiplication invocations) for the FSM usage.

In the online phase of Algorithm 1_MPC, servers first locally and blindly convert the binary shares $[r_{l-1}], \ldots, [r_0]$ to the integer shares [r]. Next, the servers publicly reconstruct the masking secret R=x−r and convert to binary $R_{l-1}, \ldots, R_0$. If $x \geq r$, it is possible to easily obtain the shares of each bit $[x_i]$ utilizing the binary adder for $R_i$ and $[r_i]$ for $i \in [0, l-1]$. If $-p \leq x-r<0$ or $x-r<-p$, the reconstruct R actually equals x−r+p or x−r+2p in the field $\mathbb{F}_p$, respectively. Therefore, the conversion protocol tries to blindly remove the 0×p, 1×p or 2×p addition. When comparing an input in the secret sharing form with another input in the plaintext form, the shares of the plaintext input are the dummy shares (i.e., every share equals the secret).

Algorithm 1_MPC: integerToBinary: blindly converting the secrect shares of an integer to the shares of the binary bits.

Input: The shares of an integer, [x].
Preprocessing: The shares of l bits, $[r_{l-1}], \ldots, [r_0]$.
Online procedure:

1. Reconstruct $[R] = [x] - \sum_{i=0}^{l-1} 2^i \cdot [r_i]$, publicly convert $R$ to binary $R_{l-1}, \ldots, R_0$. Let $[R']_B$ as $([R'_1], [R'_{1-1}], \ldots, [R'_0]) \leftarrow binAdder(R_i, [r_i])$, for $i \in [0, 1-1]$.
2. Let $[p]_B = ([p_1], \ldots, [p_0])$ as the dummy shares of the prime p binary representations. The imaginary MSB $p_l$ of p must be zero. Similarly, let $[p']_B$ as the dummy shares of the binary representations of 2p.
3. $[res1] \leftarrow binCom2([p]_B, [R']_B)$, $[res2] \leftarrow binComp2([p']_B, [R']_B)$. If $p \le R'$, res1 = 1; otherwise res1 = 0. If $2p \le R'$, res2 = 1; otherwise res2 = 0. Let binary $f_{l-1}, \ldots, f_0$ stand for the integer $2^l - p$, then set the shares $[g_i] = f_i \cdot [res1]$ and $[g'_i] = f_i \cdot [res2]$ for $i \in [0, 1-1]$.
4. $([R''_{1+1}], \ldots, [R''_0]) \leftarrow binAdder([g_i], [R'_i])$ for $i \in [0, 1]$, $g_l = 0$. $([R'''_{1+2}], \ldots, [R'''_0]) \leftarrow binAdder([g'_i], [R''_i])$ for $i \in [0, 1+1]$, $g'_1 = g'_{1+1} = 0$.

Output: The lower l bits of $R'''_i$ shares, i.e., $[R'''_{1-1}], \ldots, [R'''_0]$.

An integer x=1 is taken as an example in GF(13) (p=13, l=4) to describe the secret share conversion from integer to binary, utilizing preprocessed binary secret shares, r=15 (binary 1111). In the first step of Algorithm 1_MPC, servers reconstruct R=x−r=−14=12 in GF(13) and publicly convert R=12 to the binary representations 1100. After adding R with $[r]_B$ by a binary adder with carry bits, servers withhold $[R']_B$ as the shares of 1_1011. Then, $[R']_B$ is blindly compared with p and 2p leading to the result shares $[res_1]=[1]$ and $[res_2]=[1]$, respectively. Servers construct $f_{l-1}, \ldots, f_0$ as binary 0011 corresponding to the integer $2^l-p=3$, and set $[g_i]=f_i[res_1]$ for $i \in [0,3]$. Adding $[R']_B$ with $[g]_B$ renders $[R'']_B$, which is the shares of 01_1110. $[R'']_B$ is added with $[g']_B$ leading to $[R_i''']$ as the shares of 010_0001. Finally, the output results are the 4 lower bits of $[R_i''']$ as [0], [0], [0], [1] corresponding to the integer x=1.

The overhead of integerToBinary (Algorithm 1_MPC) is summarized in Tab. 5, which is compared with the previous work about the round complexity and the communication complexity (counting by the number of multiplication invocations). By the FSM-based comparator and adder, we achieve much less overhead for the number of multiplication invocations while keeping the round complexity linear to the binary length of a field $l=[\log_2 p]$. Although we follow the method in to preprocess secret shares of binary bits, the r<p requirement is removed.

TABLE II

The integer-binary secret share conversion overhead.

| Scheme | DFK + 06 [34] | integerToBinary (Algorithm 1_MPC) |
|---|---|---|
| Prep. Bits | 2 rounds, 21 Multi. (Err. prob.: 1p) [34]. | |
| Check Bits | 19 rounds, 221 Multi. (Err. prob.: 1 − $p2^l$) | No need |
| Comparison | 19 rounds, 221 Multi. | 21 rounds, 41 Multi. (run two times) |
| Adder | 37 rounds, 551 $\log_2 l$ Multi. (run two times) | 21 rounds, 31 Multi. (run three times) |
| Total | 114 rounds, 461 + 1101 $\log_2 l$ Multi. | 2 + 101 rounds, 191 Multi. |

(Prep.: preprocessing. Multi.: one invocation of a secret share multiplication protocol. Err. prob.: error probability.)

MPC Mixing for the User Anonymity

THE SodsMPC Online Phase

The proposed MPC for transaction mixing in the online phase is very simple as it requires only one matrix-vector multiplication (Algorithm 2_MPC). Assume there would be N inputs to be mixed (in the secret share form), denoted as a vector $\vec{I}=\{input_1, \ldots, input_N\}$. A preprocessed permutation matrix M is also in the form of secret shares. The mixing outputs the shares of the input random permutation, $\pi(\vec{I})=\vec{I}\cdot M$.

Algorithm 2_MPC: MPCMix: the online phase for MPC mixing (n: the server number. N: the input number for mixing. π: the random permutation.)

Input: The secret shares of N inputs $I^{\rightarrow} = \{input_1, \ldots, input_N\}$ are denoted by $\{[input_1]_k, \ldots, [input_N]_k\}$ for server $S_k$ ($k \in [1, n]$). preprocessed secret shares: $N^2$ Beaver tuples $[a_{i,j}], [b_{i,j}], [c_{i,j}]$ ($i, j \in [1, N]$). One secret shared random permutation matrix $M = \{m_{i,j}\}$, ($i, j \in [1, N]$).
Online: // (For each server $S_k \in \mathcal{S}$, $k \in [1, N]$)
1. Reconstruct $2N^2$ maskings, $d_{i,j} = m_{i,j} - a_{i,j}$, $e_{i,j} = input_i - b_{i,j}$ ($i, j \in [1, N]$).
2. Locally construct the intermediate secret shares, $[temp_{i,j}]_k = d_{i,j}e_{i,j} + d_{i,j}[b_{i,j}]_k + e_{i,j}[a_{i,j}]_k + [c_{i,j}]_k$.
3. Output the permutation, $[output_i]_k = \sum_{j=1}^{N} [temp_{j,i}]_k$, $[\pi(I^{\rightarrow})]_k = \{[output_1]_k, \ldots, [output_N]_k\}$.

Ingredients of the SodsMPC Preprocessing

The preprocessing components of SodsMPC include random integer numbers, random binary bits, Beaver tuples, square tuples, and permutation matrices. All these secrets are shared by the novel quantum-safe asynchronous verifiable secret sharing scheme (qsAVSS, Algorithm 7_MPC) for ensuring the t+1 reconstruct threshold. The randomness extraction for a random integer number is a very simple accumulation of t+1 random numbers from t+1 distinct dealers. However, the verification and randomness generation for other components are more complicated. Beaver tuples can be robustly handled by the protocol in [17]. The shares of random bits can be coped with by another protocol in [18].

Figure 14:
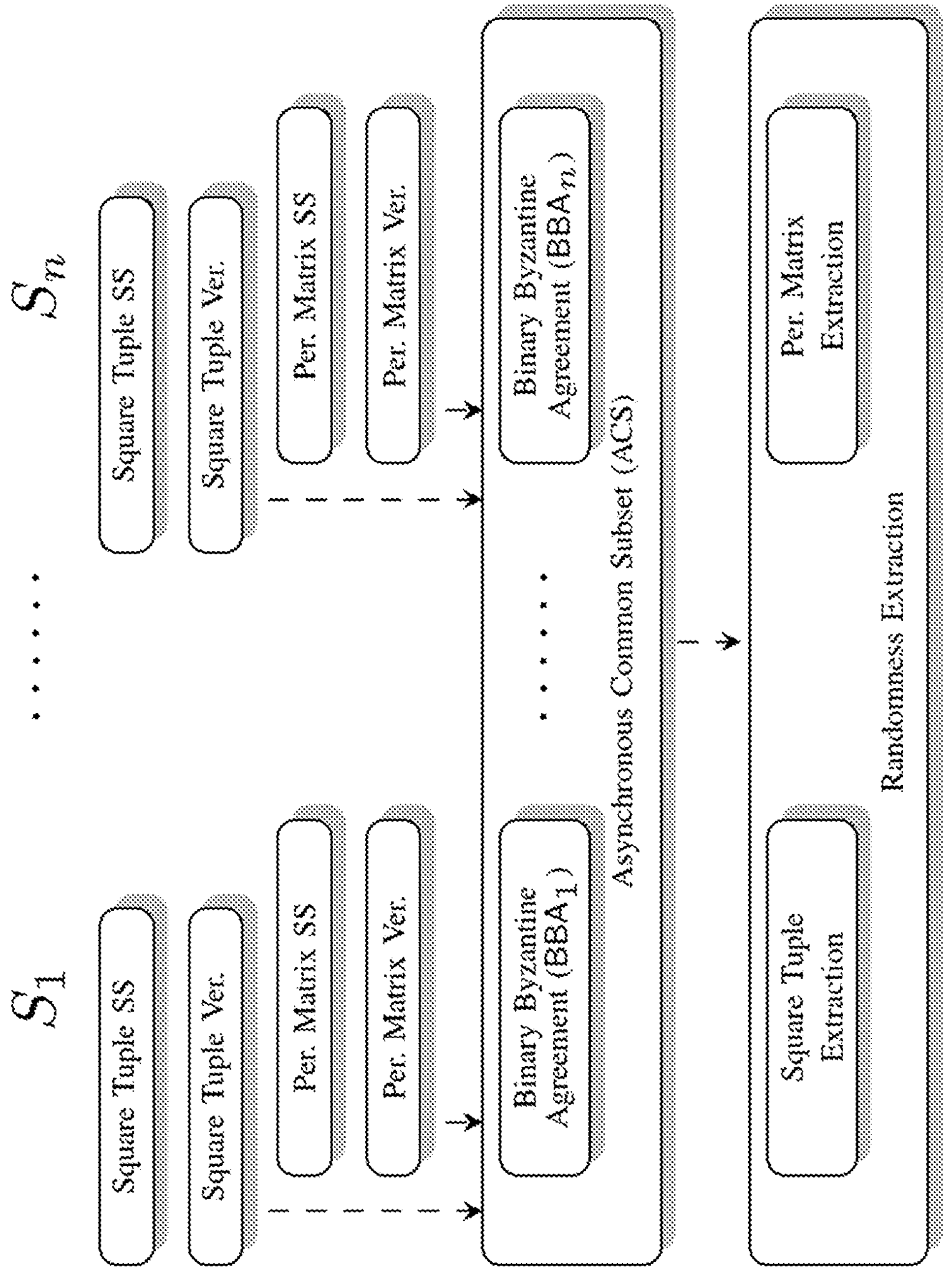
FIG. 14 shows the overall preprocessing phase is described in MPCPrep (Algorithm 3)

In the sequel, we detail the more challenging tasks and techniques, for the verification (verifying whether the generated value from a dealer is valid) and randomness extraction (extracting randomness from t+1 or 2t+1 dealers to avoid at most t malicious dealers to know the random value) for square tuples and permutation matrices. All our preprocessed ingredients are robust. In an asynchronous network, the whole preprocessing should perform after the servers agree on which secret sharing protocols (and their verifications) are finalized. Utilizing ACS [6], at least n−t=2t+1 server related BBAs would output one, and these servers are included in the ACS result set ACSResult, in which the contributions of every server are finalized from the view of all honest severs. Hence, the contributions from the servers in ACSResult will be recognized for further randomness extractions. FIG. 14 shows the overall preprocessing phase is described in MPCPrep (Algorithm 3_MPC) ($S_i$: Servers. SS: Secret sharing. Per.: Permutation. Ver.: Verification.)

Algorithm 3_MPC: MPCPrep: the robust preprocessing phase (n: the server number. N: the input number for mixing. t: the number of the maximum malicious servers) Square Tuple Verification and Randomness Extraction. Similar to a Beaver tuple, the shares of a square tuple (r, $r^2$) helps a square calculation of secret shares [x], by $[x^2]=[r^2]+(x-r)([x]+[r])$. For preprocessing a square tuple, we propose the square tuple verification and randomness extraction protocols enlightened by the ones for a Beaver tuple [17]. However, the overhead for verifying a square tuple is smaller than the one of a Beaver tuple.

---

Secret sharing: $S_i$ shares secrets by qsAVSS (Algorithm 10).

Tuple and matrix verification: All servers will check whether: (1) The square tuples generated by $S_i$ are square tuples by SqrtVer (Algorithm 7). (2) The matrix generated by $S_i$ is a permutation matrix by MatVer (Algorithm 9).

Asynchronous common subset: $S_i$ inputs its opinion about $SqrtVer_i$ and $MatVer_j$ to $BBA_i$ related to $S_j$, 1 for valid and 0 for invalid. The ACS protocol will outputs at least 2t + 1 BBA 1-results in a common subset ACSResult.

Randomness extraction: // (Every server will extract randomness from the contributions of t + 1 or 2t + 1 distinct dealers in ACSResult.)

-continued

---

1. A square tuple from every 2t + 1 valid square tuple by SqrtExt (Algorithm 8).
2. A matrix from every t + 1 valid permutation matrices by $M = \prod_{i=1}^{t+1} M_i$, consuming $t$ rounds and $tN^2$ Beaver tuples.

---

The general idea is to construct two new t and 2t degree polynomials, X(•) and Y(•) using input 2t+1 claimed square tuples. Then, the servers utilize a random evaluating value a, to test whether $$X(\alpha)\cdot X(\alpha) \stackrel{?}{=} Y(\alpha).$$

Figure 15:
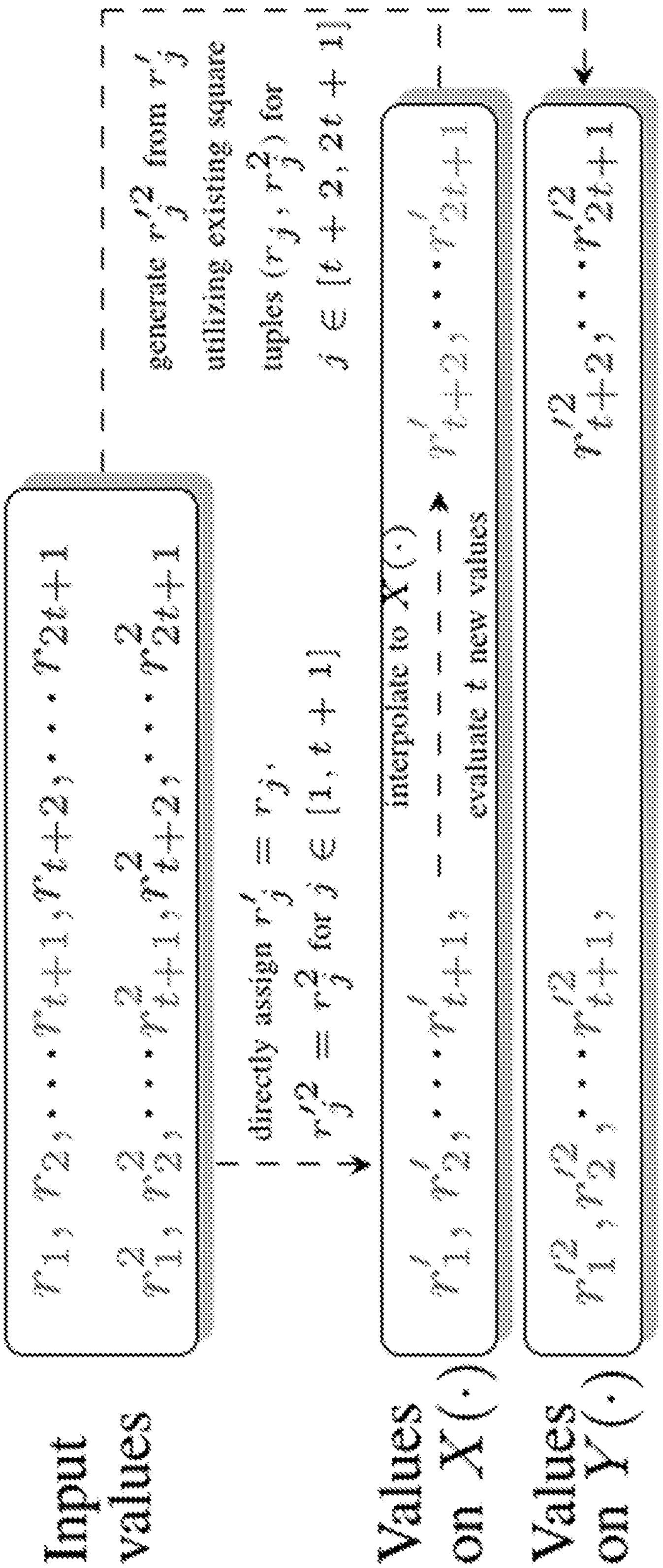
FIG. 15 depicts how input 2t+1 claimed square tuples can be converted to 2t+1 values.
Figure 16:
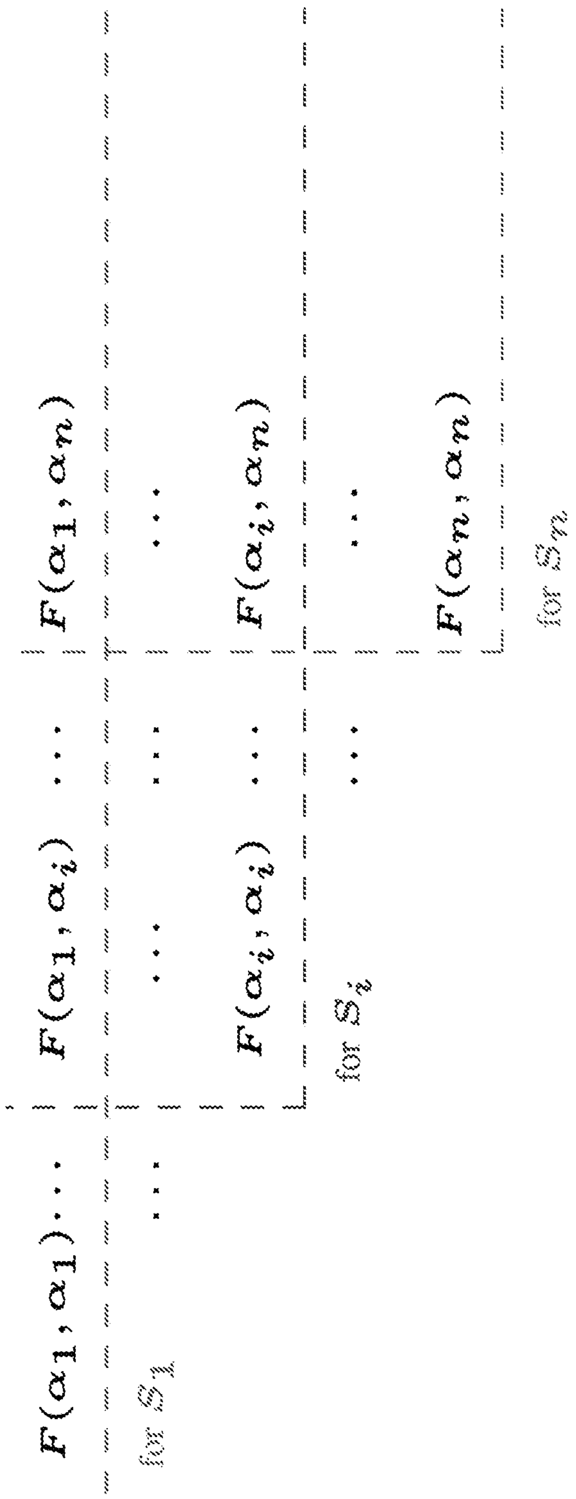
FIG. 16 shows points to be put in a Merkle tree hash commitment.

FIG. 15 depicts how input 2t+1 claimed square tuples can be converted to 2t+1 values, which decides the testing polynomials X(•) and Y(•) and shows the square tuple conversion used in the verification and randomness extraction protocols (SqrtVer, Algorithm 4_MPC and SqrtExt, Algorithm 5_MPC).

After a dealer VSS distributes the t+1 reconstruction threshold shares of 2t+1 claimed square tuples $$(r_j, r_j^2)$$

the servers use the first t+1 input r values to interpolate a t-degree polynomial X(•), then evaluate another t new points in X(•), i.e., $X(\beta_1), \ldots, X(\beta_t)$. Hence, the output 2t+1 values of r' are constituted by the first t+1 input r values and the new evaluated t points. All 2t+1 output r' pass the polynomial X(•). Next, the remained last t inputs (r, $r^2$) will be regarded as square tuples to create the last t output r'2 values for the square of the new evaluated t output r' values. The t generated r'2 values in this step combined with the first t+1 input $r^2$ values construct a 2t-degree polynomial Y(•). The tuple conversion is detailed in the verification protocol SqrtVer, Algorithm 4_MPC and FIG. 6.

---

Algorithm 4_MPC: SqrtVer: verifying square tuples.

---

Input: 2t+1 claimed square tuples $r_j, r_j^2$, and every server $S_i$ has shares of these tuples, $[r_j]_i, [r_j^2]_i$ for $j \in [1, 2t+1]$. Public known values $\beta_k$ for $k \in [1, t]$.

The square tuple conversion:

(The first t + 1 outputs): $S_i$ set the first t + 1 output square tuples $[r'_j]_i, [r'^2_j]_i$ for $j \in [1, t+1]$ as the same as the first $t+1$ input tuples.

Then, $S_i$ interpolates $[r'_j]_i (j \in [1, t+1])$ and gets an $t$−degree polynomails $X(\cdot)$.

(The last t outputs): $S_i$ evaluates $\beta_k$ in $X(\cdot)$, $[r'_j]_i = [X(\beta_k)]_i$ for $k \in [1, t]$, $j \in [t+2, 2t+1]$.

Then, $S_i$ sets the remained $t$ outputs for $[r'^2_j]_i$ by calculating the square of $r'_j$ utilizing $(r_j, r^2_j)$ for $j \in [t+2, 2t+1]$ as existed square tuples. After that, all $2t+1$ $r'^2_j$ could define a 2t-degree polynomil $Y(\cdot)$.

The square tuple verification: All servers reconstruct a common random value α, reconstruct $X(\alpha)$, $Y(\alpha)$, and check whether $X(\alpha)\cdot X(\alpha) \stackrel{?}{=} Y(\alpha)$.

---

Algorithm 4_MPC is a statistic information-theoretical secure verification method whose correctness is based on the random α choice from the finite field $\mathbb{F}_p$. It is trivially true that $$(r'_j, r'^2_j)$$

is a square tuple if and only if $$(r_j, r_j^2)$$

is a square tuple for j∈[1, t+1]. For j∈[t+2,2t+1], $$r'^2_j$$

is calculated from $$r'_j.$$

Hence, $$(r_j, r_j^2)$$

is satisfied if and only if $$(r_j, r_j^2)$$

is a square tuple for j∈[t+2,2t+1]. For a random point a and the testing equation $$X(\alpha)\cdot X(\alpha) \stackrel{?}{=} Y(\alpha),$$

if the equation is satisfied but the claimed square tuples are not satisfied, a must be a root of the testing polynomials, i.e., X(α)=0 and Y(α)=0. Therefore, when the random a is uniformly selected from $\mathbb{F}_p$, the error possibility is at most $$\frac{2t}{|\mathbb{F}_p|}$$

since Y(•) is at most 2t-degree and has at most 2t roots. From $$\frac{2t}{|\mathbb{F}_p|} < \frac{2n}{|\mathbb{F}_p|} < 2^{-\kappa},$$

we have $|\mathbb{F}_p|=p>2n\cdot 2^{\kappa}$.

Extracting a new random square tuple (SqrtExt, Algorithm 5_MPC) also requires converting the 2t+1 tuples as we verify 2t+1 claimed square tuples (FIG. 6). Compared with the collection of 2t+1 claimed square tuples from one dealer in Algorithm 4_MPC, Algorithm 5_MPC collects 2t+1 valid square tuples from 2t+1 distinct servers. These 2t+1 servers are inside the ACS common subset ACSResult. Instead of evaluating a random point like a in Algorithm 6_MPC, SqrtExt will output a square tuple from a specific point β in the new t and 2t degree polynomial r=X(β) and $r^2$=Y(β) in Algorithm 5_MPC.

| Algorithm 5_MPC:<br>SqrtExt: extracting random square tuples. |
|---|
| Input: 2t + 1 square tuples $r_j$, $r_j^2$ for j ∈ [1, 2t + 1]. Each creator $S_j$ is included in one round ACSResult, and each tuple passes the check SqrtVer (Algorithm 7). There are public known values $\beta_k$ for k ∈ [1, t] and β.<br>Converting the tuples and constructing two output polynomials: Servers creates t-degree polynomials X(•) and 2t-degree polynomial Y(•) utilizing the 2t + 1 inputs as the similar way of SqrtVer (Algorithm 7).<br>Extracting a new random square tuple: $S_i$ outputs the share of the new square tuple as $[r]_i = [X(\beta)]_i$, $[r^2]_i = [Y(\beta)]_i$. |

Permutation Matrix Verification and Randomness Extraction. In MPCPrep (Algorithm 3_MPC), each $S_i$ checks that a matrix generated by $S_j$ is a valid permutation matrix by MatVer (Algorithm 6_MPC). The basic idea is from the permutation matrix definition. The verification algorithm works when all values come from the finite field $\mathbb{F}_p$. The p value should be larger than the number of inputs N to be mixed (p>N).

(1) Every row or every column of a permutation matrix has and only has one 1 element, and the remained $N^2$−N elements should be 0. Hence, we first reconstruct the sums of each row and each column to make sure the sum of each row or column is 1. (2) Moreover, each matrix item should be a 1 or 0 secret. Otherwise, the fact that the row sum or the column sum is 1 cannot ensure the remained $N^2$−N elements in a matrix are 0. So that in the second step, we extra blindly test whether the shares of each matrix item [x] satisfying $[x^2]$-[x]=[0] utilizing a preprocessed square tuple. If the reconstruction is 0, then x must be 0 or 1.

For extracting a random permutation matrix, the direct way is to multiply t+1 valid permutation matrices generated by t+1 distinct dealers, i.e., $$M = \prod_{i=1}^{i=t+1} M_i.$$

| Algorithm 6_MPC: verifying a permutation matrix |
|---|
| Input: The secret shares of a claimed permutation matrix, M = {$[m_{i,j}]$} (i, j ∈ [1, N]), in the finite field $\mathbb{F}_p$ (p > N). $N^2$ square tuples $[r_{i,j}]$, $[r_{i,j}^2]$ $(i, j \in [1, N])$.<br>Row and column sum verification: // (For $S_k \in \mathcal{S}$)<br>The sum of the i-th row and column shares are denoted by rowSumi = $\sum_{j=1}^{N}[m_{i,j}]$ and $colSum_i = \sum_{j=1}^{N}[m_{i,j}]$, respectively. $S_k$ reconstructs all $rowSum_1, \ldots, rowSum_N$ and $colSum_1, \ldots, colSum_N$ to check if all these values equal 1. |

-continued

Algorithm 6_MPC: verifying a permutation matrix

Finite field element verification: // (For $S_k \in \mathcal{S}$)

1. Reconstructing $N^2$ masking secrets, $r^*_{i,j} = m_{i,j} - r_{i,j}$ for $i, j \in [1, N]$, and locally constructing the secret shares for all elements in M by $[m^2_{i,j} - m_{i,j}] = [m^2_{i,j}] - [m_{i,j}] = r^2_{i,j} + r^*_{i,j} \cdot ([m_{i,j}] + [r_{i,j}]) - [m_{i,j}]$.

2. Reconstructing all $m^2_{i,j} - m_{i,j}$ elements for $i, j \in [1, N]$. If every result is zero, then M is valid.

Quantum-Safe Asynchronous Verifiable Secret Sharing (GsAVSS)

We propose a quantum-safe AVSS (qsAVSS) scheme based on a quantum-safe hash-based commitment. Instead of encoding polynomial coefficients, we require a dealer to commit the interactive checking points in a bivariate polynomial. For our qsAVSS scheme, we define security as follows.

Correctness: If the dealer is honest then the honest parties reconstruct the same secret.

Strong commitment: If an honest party delivers a share related to a secret s, even if a dealer is dishonest, all honest parties would eventually deliver the shares of s at the end of a sharing phase[9].

Figure 7:
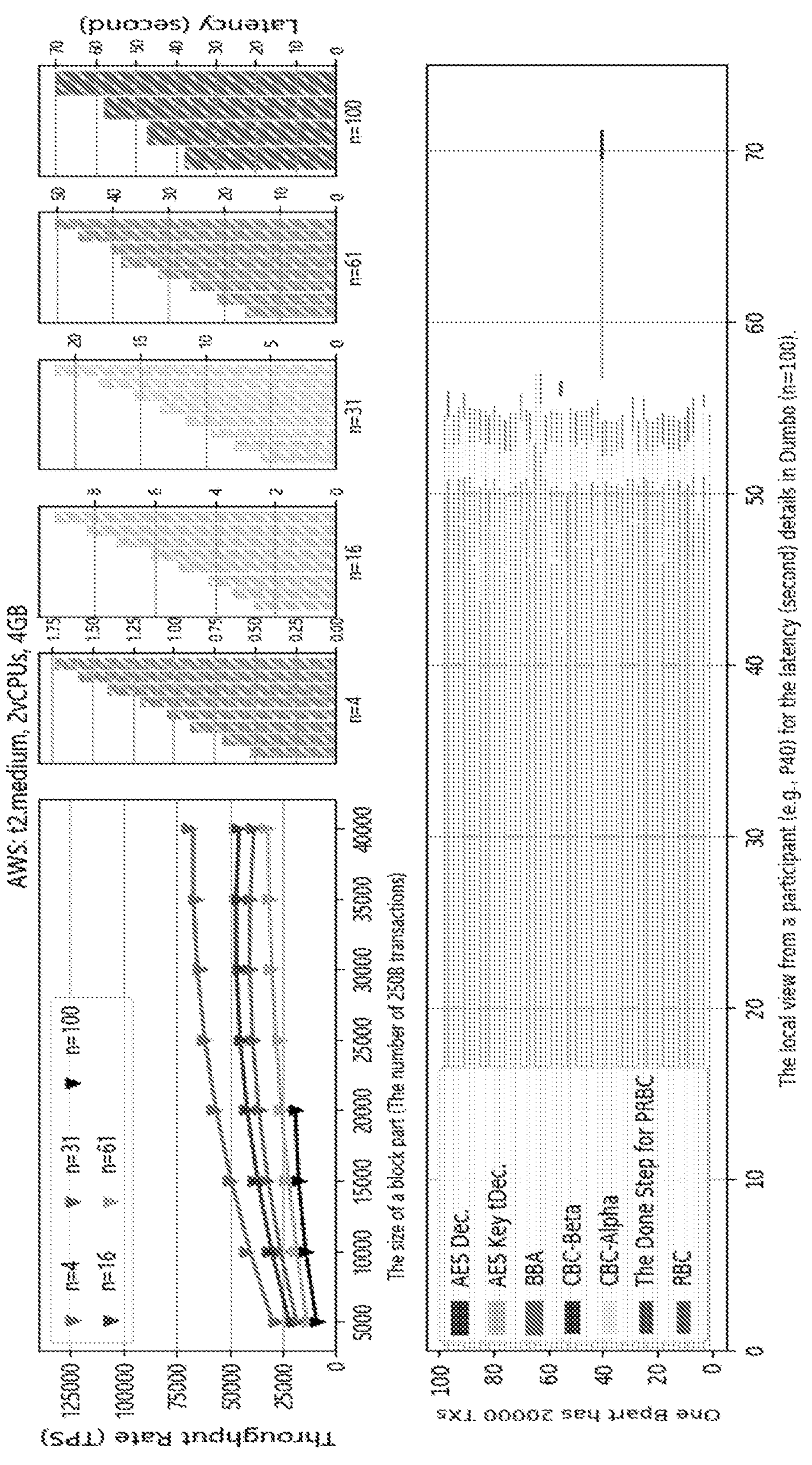
FIG. 7 shows Quantum-sensitive Dumbo BFT implementation evaluation.
Figure 8:
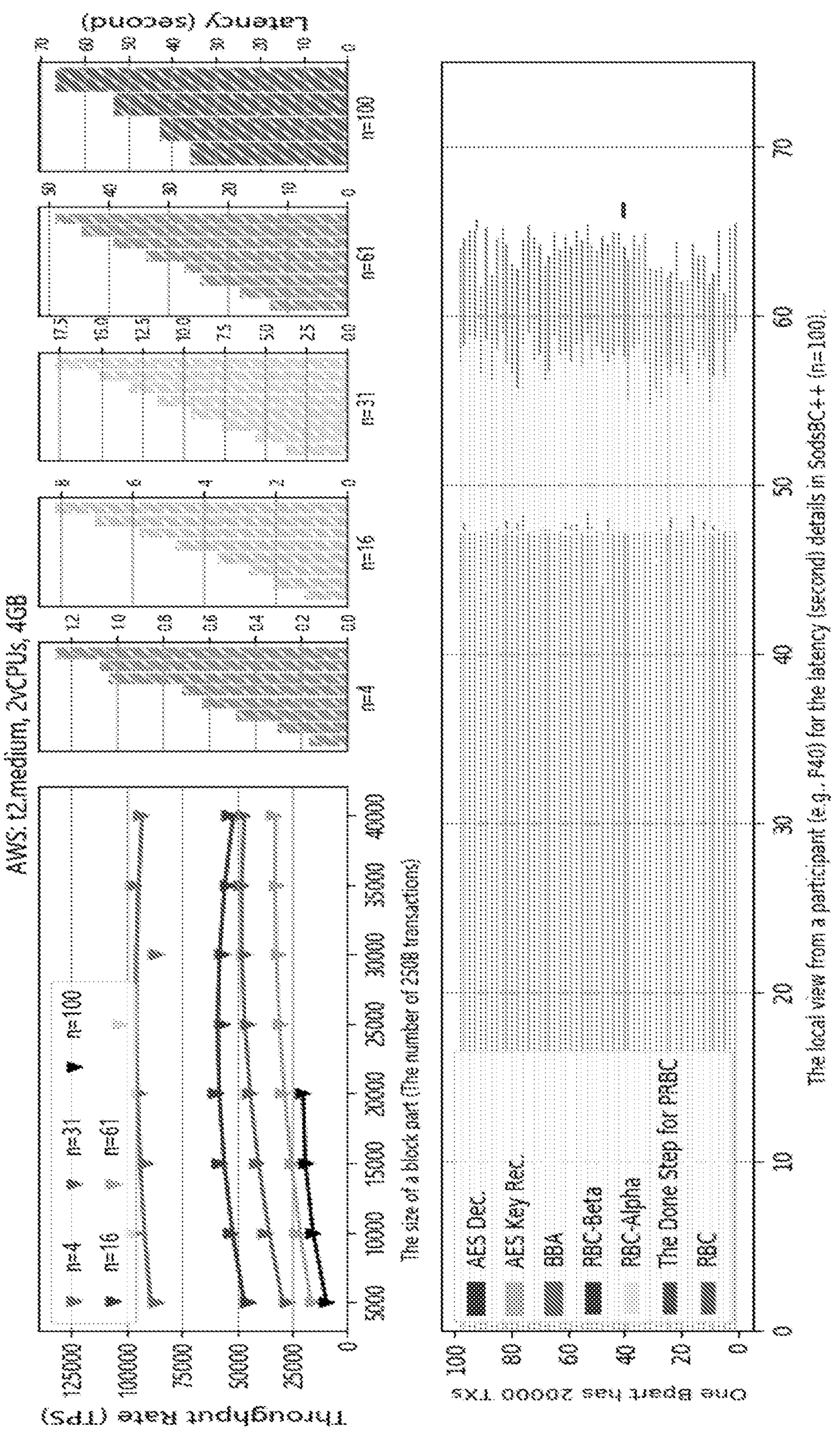
FIG. 8 shows Post-quantum SodsBC++ BFT implementation evaluation.

A Hash-based Merkle Tree Commitment. A dealer evaluates the $$\frac{n(n+1)}{2}$$

points ([$\alpha_1, \ldots, \alpha_n$] for x and y) in a t-degree symmetric bivariate polynomial F(x, y). The dealer removes the overlap points due to the polynomial symmetry property, i.e., F(x, y)=F(y, x). All these points construct a hash up-triangle matrix as depicted in FIG. 7. We further deploy a Merkle tree to compress the commitment by arranging these $$\frac{n(n+1)}{2}$$

points in the leaves, so that every leaf could be verified by a Merkle proof sizing $$O\left(\log_2 \frac{n(n+1)}{2}\right) = O(\log n)$$

branch nodes. The Merkle tree root is denoted by Root.

qsAVSS Protocol. The basic verification idea of the qsAVSS protocol in the sharing stage deploys a hash-based commitment (in a Merkle tree format) to bind all necessary points in the bivariate polynomial, instead of a Pedersen commitment for quantum-safety. The sharing phase for the commitment is similar to the Bracha asynchronous reliable broadcast (RBC) [11], in which even a malicious broadcaster cannot make part of servers deliver a message while the remained servers deliver another message or nothing. The Merkle tree usage is enlightened by the RBC in Honeybadger BFT [33]. In the first sharing step, a dealer $S_{dealer}$ encodes a secret s in a t-degree symmetric bivariate polynomial F(x, y), i.e., F(0,0)=s. $S_{dealer}$ commits all $$\frac{n(n+1)}{2}$$

points in a hash up-triangle matrix, and converts the matrix to a Merkle tree. $S_{dealer}$ sends every univariate polynomial $$f_i(x) \overset{def.}{=} F(x, \alpha_i) = F(\alpha_i, x)$$

to server $S_i$ with a set of Merkle tree proofs, $Branch_i$.

In echo and ready, servers verify if receiving the same bivariate polynomial by echoing and ready-broadcasting the Merkle root. Unlike the hash-based AVSS protocol in [3], the process relies on the interactive points even when servers agree on the same Merkle root of the committed points, which is necessary for "slow but honest" servers to deliver the shares when a dealer is dishonest. Also, at least t+1 honest servers ensure that the interactive points are identical, which guarantees that the threshold is at most t+1.

If $S_{dealer}$ wants to succeed in running a qsAVSS instance, $S_{dealer}$ has to send correct messages to at least t+1 honest servers. If $S_{dealer}$ is dishonest, at most t adversaries may assist $S_{dealer}$ to convince t+1 "fast and honest" servers. The remained at most t "slow but honest" servers may receive incorrect messages or nothing from at most t adversaries (including $S_{dealer}$). According to the ready broadcast rule (receiving t+1 but not broadcast yet), t "slow but honest" servers still deliver the same Root as "fast and honest" servers. "slow but honest" servers can use Root to locate the correct t+1 echo messages, and interpolate them to obtain the shares. The qsAVSS algorithm sharing phase is detailed in Algorithm 7_MPC.

Algorithm 7_MPC shows the quantum-safe asynchronous verifiable secret sharing scheme (qsAVSS), the sharing stage.

Sharing: // (For a dealer $S_{dealer}$)

$S_{dealer}$ generates a random t-degree symmetric bivariate polynomial F(x, y), for which the secret is s = F(0, 0). A univariate polynomial $f_i(x) \triangleq F(x, \alpha_i) = F(\alpha_i, x)$ could be derived for $S_i$. The n(n + 1)/2 points, $F(\alpha_i, \alpha_j)$ (i, j ∈ [1, n], i ≤ j), construct a hash commitment matrix, which is further converted to a Merkle tree having a root, Root. The Merkle branch proof for the hash of $F(\alpha_i, \alpha_j)$ is denoted by $branch_{i,j}$. $Branch_i$ is a set of n Merkle branch proofs for $S_i$, including $branch_{1,i}, \ldots, branch_{i,i}, \ldots, branch_{i,n}$ for the hashes of n points $F(\alpha_1, \alpha_i), \ldots, F(\alpha_i, \alpha_i), \ldots, F(\alpha_i, \alpha_n)$.

$S_{dealer}$ sends ⟨sharing, $f_i(x)$, $Branch_i$⟩ to $S_i$, $\forall S_i \in \mathcal{S}$.

Echo: // (For each server $S_i \in \mathcal{S}$)

Upon receiving a sharing message, $S_i$ checks if all values in $Branch_i$ help $f_i(\alpha_j)$ to get the same Root, for j ∈ [1, n]. If so, $S_i$ echoes ⟨echo, Root, $f_i(\alpha_j)$, $branch_{i,j}$⟩ to $\forall S_i \in \mathcal{S}$.

Upon receiving an echo message from $S_j$, $S_i$ checks whether the received $f_{rev,j}(\alpha_i)$ satisfies $f_{rev,j}(\alpha_i) = f_i(\alpha_j)$. If so, $S_i$ counts this echo message including $f_{rev,j}(\alpha_i)$ and $branch_{j,i}$.

Upon receiving n − t counted echo messages having the same Root, $S_i$ broadcasts ⟨ready, Root⟩.

Ready: // (For each server $S_i \in \mathcal{S}$)

Upon receiving t + 1 ⟨ready, Root⟩ messages, $S_i$ broadcasts ⟨ready, Root⟩ if $S_i$ does not broadcast a ready message.

Upon receiving n − t ⟨ready, Root⟩ messages, $S_i$ delivers Root.

// (directly delivery)

-continued

| Algorithm 7_MPC shows the quantum-safe asynchronous verifiable secret sharing scheme (qsAVSS), the sharing stage. |
|---|
| If $S_i$ received a correct $f_i(x)$ in sharing corresponding to the delivered Root, $S_i$ delivers $[s]_i = f_i(0)$. |
| // (indirectly delivery) |
| If $S_i$ does not receive a correct polynomial in sharing, $S_i$ uses the delivered Root and the Merkle branches in received echo messages to locate t + 1 correct points, $f_{j_1}(\alpha_i), \ldots, f_{j_{t+1}}(\alpha_i)$, which can be interpolated to $[s]_i = f_0(\alpha_i) = f_i(0)$. |

The reconstruction phase of qsAVSS follows the standard robust reconstruction way enhanced by error correction code like Berlekamp-Welch [9]. We describe the robust reconstruction phase of qsAVSS in Algorithm 8_MPC.

| Algorithm 8_MPC shows the quantum-safe asynchronous verifiable secret sharing scheme (qsAVSS), the reconstruction stage. |
|---|
| Reconstruct-Send: $S_i$ broadcasts $\langle$reconstruct, $[s]_i\rangle$. |
| Reconstruct-Receive: |
| Upon receiving 2t + 1 shares (including the share of $S_i$), $S_i$ reconstruct a polynomial from t + 1 shares, and checks if the remained t shares satisfy the reconstructed polynomial. If so, $S_i$ returns s. Otherwise, $S_i$ keeps waiting for more shares. |
| Upon receiving more shares, $S_i$ tries to reconstruct the secret using Berlekamp-Welch to correct errors. $S_i$ returns the secret after a successful reconstruction. In the most pessimistic case, $S_i$ waits for all the n = 3t + 1 shares and returns the secret s. |

Theorem 1 Algorithm 7_MPC (and Algorithm 8_MPC) satisfies the correctness properties of a qsAVSS scheme.

Proof: Considering three cases: (1) $S_i$ and $S_j$ deliver shares directly. (2) $S_i$ and $S_j$ deliver shares directly and indirectly, respectively. (3) $S_i$ and $S_j$ deliver shares indirectly.

Correctness: Assume towards contradiction that an honest server $S_i$ delivers a share $[s]_i$ for secret s while another honest server $S_j$ delivers a share $[s']_j$ for another secret s'. (1) If $S_i$ directly delivers $[s]_i$, $S_i$ receives at least 2t+1 ready messages for Root, which originate from at least t+1 honest servers who receive 2t+1 echo messages. At least t+1 echo messages are from honest servers. If another honest $S_j$ delivers $[s']_j$, at least t+1 honest participants send echo for Root'. This is a contradiction that one honest participant sends two different echo messages or the hash is not collision-resilient. (2 & 3) Similarly, if $S_i$ and $S_j$ deliver shares corresponding to two Merkle roots, it is also a contraction.

Strong commitment: Assume that honest $S_i$ delivers a share $[s]_i$ for secret s. We prove that every honest server delivers a share for s eventually. (1 & 2) If $S_i$ directly delivers $[s]_i$, $S_i$ receives at least 2t+1 ready messages for Root originating from at least t+1 honest servers. These t+1 honest servers can help every honest participant deliver Root. If S; receives a correct sharing message satisfying Root, $S_j$ directly delivers $[s]_j$. Otherwise, $S_j$ utilizes Root and Merkle branch proofs to locate t+1 correct echo messages and indirectly delivers $[s]_j$ by interpolation. (3) If $S_i$ indirectly delivers $[s]_i$, $S_i$ locates at least t+1 correct echo messages utilizing the delivered Root from at least 2t+1 ready messages. Since the distribution of Root has totality, $S_j$ can also deliver Root, locate correct points and indirectly deliver $[s]_j$.

Since at least t+1 honest servers have verified the interactive points in the sharing phase, the t+1 reconstruction threshold of the secret s is ensured. When reconstructing, an error correction code method can correct at most t errors to guarantee the recovered secret s, since at least 2t+1 honest servers will broadcast their shares.

Efficiency analysis. We summary the communication overhead of the qsAVSS sharing stage. Polynomial coefficients and points belong to the field $\mathbb{F}_p$. We use another field $\mathbb{F}_H$ to denote a quantum-safe hash function like SHA-256. The first step requires a dealer to send a univariate polynomial (t+1 coefficients for $f_i(x)$) and $\text{Branch}_i$ to $S_i$. The size of a proof set Branch is $$O\left(|\mathbb{F}_H| n \log_2 \frac{n(n+t)}{2}\right) = O(|\mathbb{F}_H| n \log n).$$

The overhead for the sharing step is $O(|\mathbb{F}_p|n^2)+O(|\mathbb{F}_H|n^2 \log n)$. Then, the echo and ready stages consume $O(|\mathbb{F}_p|n^2)+O(|\mathbb{F}_H|n^2\log n)+O(|\mathbb{F}_H|n^2)$ complexity for n servers. The total overhead is dominated by $P(|\mathbb{F}_H|n^2 \log n)$ when $|\mathbb{F}_H|$ is much larger than $|\mathbb{F}_p|$.

qsAVSS is compared (Algorithm 7_MPC) with other AVSS schemes in Tab. 6. In the echo step of the non-quantum-safe scheme CKL+02 [14], every server broadcasts the coefficient matrix encoded in Pedersen commitments. That matrix has t+1 rows and t+1 columns. Each element belongs to a discrete logarithm (DL) secure field $\mathbb{F}_{DL}$. Hence, the overall overhead is $O(|\mathbb{F}_{DL}|n^2(t+1)^2)=O(|\mathbb{F}_{DL}|n^4)$. The perfect I.T. AVSS scheme CHP13 can share t+1 secrets in a polynomial, so that the amortized overhead for one secret is $O(|\mathbb{F}_p|n)$. But CHP13 broadcasts $O(n^2)$ field elements via broadcast channels in the last step. One broadcast channel invocation requires $O(n^2)$ overhead in a point-to-point network leading to the total $O(|\mathbb{F}_p|n^4)$ overhead. hbAVSS [29] deploys an "encrypt-and-disperse" paradigm to amortize t+1 shares in one time dispersal. The dispersal overhead is $O(|\mathbb{F}_{DL}|n^2)+O(|\mathbb{F}_H|n^2 \log n)$, in which the $O(|\mathbb{F}_{DL}|n^2)$ item comes from t+1 constant-size commitments in a DL secure field. So that the one-secret amortized overhead is $O(|\mathbb{F}_{DL}|n)+O(|\mathbb{F}_H|n\log n)$. However, hbAVSS is still not quantum-safe.

TABLE IV

Communication complexity for AVSS schemes.

| Scheme | Security | Resilience | Comm. Comp. |
|---|---|---|---|
| CKL + 02[20] | Quantum unsafe | n = 3t + 1 | $2 * O(|\mathbb{F}_{DL}|n^4)$ |
| CHP13[9] | Perfect I.T. | n = 4t + 1 | $2 * O(|\mathbb{F}_p|n) + O(|\mathbb{F}_p|n^4)$ |
| hbAVSS[37] | Quantum unsafe | n = 3t + 1 | $O(|\mathbb{F}_{DL}|n) + O(|\mathbb{F}_H|n\log n)$ |
| Algorithm 10_MPC (This work) | Quantum safe | n = 3t + 1 | $2 * |\mathbb{F}_H|n^2\log n)$ |

Implementation

In addition to the fact that SodsMPC has many theoretic innovations that may be of independent interest in the field of secure multi-party computation, our implementation indicates its usefulness in practice. We implemented some SodsMPC core components for demonstrating the performance. We deploy n=4 servers in the AWS t2.medium type. The servers are arranged in São Paulo, Virginia, Tokyo, and Mumbai, which keeps the same settings as HoneybadgerMPC [31]. Due to the overlapping requirement for some asynchronous protocols, like BBA and ACS, our SodsMPC demo runs in the SodsBC platform, which is an asynchronous and quantum-safe blockchain consensus [24].

We run the FSM-based comparator $binComp_3$ (see Sect. 4.2) for two input vectors $Input_A$ and $Input_B$. Each vector entry $\alpha_i$ in $Input_A$ (or $b_i$ in $Input_B$, resp.) has 8 binary bits. Every bit is secretly shared in the finite field GF(251). Thus, the comparison will cost 8 rounds. We execute a parallel test by changing the number of vector entries from 256 to 131,072. In other words, we run parallel 256 (to 131,072) eight-round comparators. The resulting latency for these comparisons is exhibited in Tab. 7. Our results show that the basic FSM component, a bitwise comparator can be computed by MPC in a reasonable time.

TABLE V

The latency of FSM-based comparators $binComp_3$ in a four-node-WAN AWS t2.medium network.

| Comparator amount | 256 | 8,192 | 32,768 | 65,536 | 131,072 |
|---|---|---|---|---|---|
| Latency (second) | 1.62 | 8.57 | 33.32 | 62.16 | 108.60 |

Figure 17:
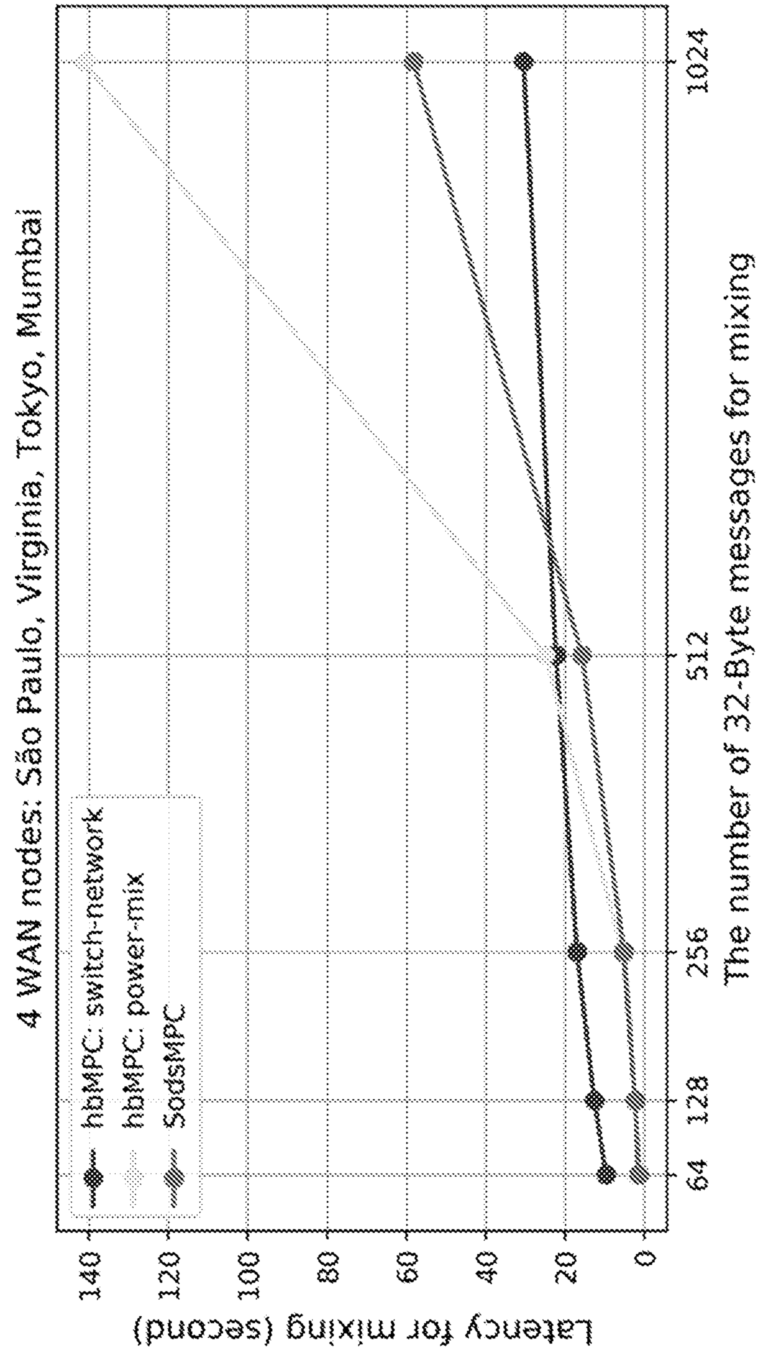
FIG. 17 shows SodsMPC mixing compared with the two mixing protocols in HoneybadgerMPC [8]

Besides, we also run our MPC mixing (online) to compare the previous HoneybadgerMPC mixing (online) protocols [31]. We mix 32-Byte secret shares in the prime finite field as same as the ones of HoneybadgerMPC[31][10]. As depicted in FIG. 17, SodsMPC performs better than both HoneybadgerMPC-PowerMix and HoneybadgerMPC-SwitchNet when the number of input shares ranges from N=64 to 512. Especially for N=1,024, SodsMPC still keeps in a regularly increased latency, while PowerMix spends an intensive time due to its $O(N^3)$ computation. The output of PowerMix is a deterministic lexicographic order in the plaintext form. Compared with the partly randomized shuffle protocol SwitchNet, the fully randomized shuffle of SodsMPC finishes in a shorter time when N=64 to 512.

[10] The prime in hexadecimal is 0x73EDA753299D7D483339D80809A1D80553BDA402FFFE5BFEFFFFFFFF00000001.

We compare SodsMPC with previous private contract systems in Tab. 1. In these permissionless blockchain contract systems, Enigma [39] utilizes blockchain to store Pedersen commitments for verifying the off-chain MPC-based contract correctness. Hawk [30] compiles an off-chain computation into a ZKP-protected circuit, so that the on-chain activities verify the proof utilizing the circuit without knowing the inputs, which protects the data privacy. Arbitrum [28] puts the hashes of off-chain computation steps in the blockchain without proofs, and uses penalty to punish dishonest users. Ekiden [15] efficiently executes contracts in TEE to protect the contract data privacy. While the TEE result verification also requires the contract logic. Zether [12] supports confidential transactions since its on-chain interval ZKPs can prove the transaction input and output amounts are equal in publicly known contracts. The anonymous identity is also kept in Zether when introducing an anonymous set in each transaction. ZEXE [10] follows the Zcash [7] design and the on-chain ZKPs ensure any off-chain computations (logic and data privacy, and user identity) are not exposed in blockchain.

Moreover, the ZKP, signature, and encryption schemes (e.g., Pedersen commitments and zkSNARKs [8]) used in these schemes are not quantum-safe. SodsMPC contract system has a different working flow. SodsMPC contract users only act as clients, and contracts are executed by permissioned blockchain servers via quantum-safe MPC protocols to ensure correctness and protect business logic and data privacy without relying on quantum-unsafe ZKPs.

TABLE II

The anonymous and private smart contract system comparison

| 1*Scheme | Q.S. | I.A. | L.P. | D.P. |
|---|---|---|---|---|
| Enigma [39] | No | No | No | Yes |
| Hawk [30] | No | No | No | Yes |
| Arbitrum [28] | N.A. | No | Yes | No |
| Ekiden [15] | No | No | No | Yes |
| Zether [12] | No | Yes | No | Yes |
| ZEXE [12] | No | Yes | Yes | Yes |
| SodsMPC | Yes | Yes | Yes | Yes |

(Q.S.: Quantum-Safety. I.A.: Identity Anonymity. L.P.: Business Logic Privacy. D.P. Data Privacy).

Besides, SodsMPC also includes a constant round MPC-based mixing protocol for the input anonymity before running the contract, which achieves robust preprocessing and online phases for n=3t+1 servers and against t adversaries in asynchronous settings. The output of a SodsMPC mixing would be a full randomized shuffle of the inputs in secret sharing. Every possible result of the N! input permutations, has the same probability of appearing in the output.

Compared with PowerMix [31], we break the online $O(N^3)$ computation overhead bottleneck for servers. Each server in PowerMix [31] locally calculates all the N-power shares for all N client inputs. PowerMix outputs the plaintext of the input secrets in a lexicographic order, which is a deterministic mixing. SwitchNet [31] swaps every pair of N inputs for $O(\log^2 N)$ layers of a butterfly network, which has $2^{N\log^2 N}$ output combinations, smaller than N!, i.e., a partly randomized shuffle. Blinder [1] outputs a client-defined shuffle in a synchronous network by a fully robust and n=4t+1 MPC. The mixing comparison is shown in Table III.

TABLE III

MPC mixing protocols

| Scheme | Resilience | Synchrony | Robustness | Shuffle | Output |
|---|---|---|---|---|---|
| Blinder [12] | n = 4t + 1 | syn. | full | Client-defined | Secret-sharing |
| SwitchNet [8] | n = 3t + 1 | asyn. | online | partly rand. | Secret-sharing |
| PowerMix [8] | n = 3t + 1 | asyn. | online | deterministic | plaintext |
| SodsMPC | n = 3t + 1 | asyn. | full | fully rand. | Secret-sharing |

(syn. & asyn.: synchronous and asynchronous. SwitchNet and PowerMix are introduced by HoneybadgerMPC [31]. rand.: randomized)

System settings: entities, channel, and network. The proposed contract system runs in a permissioned blockchain having n verification nodes, named server. The number of users or clients a contract can support is unlimited. n servers are connected with private and authenticated channels, while every client connects to all n servers, i.e., a classical client-server MPC architecture [31]. At most $$t < \frac{n}{3}$$

servers can be Byzantine who have quantum computation power. The adversaries can schedule the message orders from honest servers, which satisfies the definition of an asynchronous environment [6]. A message sent by an honest server will be eventually delivered to its destination after a finite (but unknown) delay [11]. Hybrid blockchain also works when the basic Proof-of-work or Proof-of-stake elects several permissionless verification nodes to form a consensus committee.

According to another embodiment, the present invention also provides a novel Zero-Knowledge Proof (ZKP) construction, named SodsZKP, which supports n=3t+1 delegated multi-provers to correlatively generate a well-formatted ZKP, when at most t delegated provers are concurrently malicious. The original prover can only secretly share a witness ω so that delegated multi-provers do not learn the witness value but still can generate a ZKP corresponding to a circuit-based relation $\mathcal{C}$ satisfying a statement st, i.e., $\mathcal{C}$(ω)=st. That is to say, the SodsZKP protocol provides a possibility that (possible malicious) delegated multi-provers execute an actual secure Multi-Party Computation (MPC) and generate a ZKP on behalf of an original prover without holding an integrated witness, i.e., a new "MPC-in-the-real" paradigm.

The new MPC-in-the-real paradigm offers many new cryptography applications. First, an actual-MPC-based ZKP can be regarded as an objective argument whether n participants execute a well-formatted MPC. A classical MPC security threshold relies on an assumption that at most $$t < \frac{n}{3}$$

participants would be malicious. However, this assumption is not realistic, namely, one cannot guide an attacker to avoid trying to break the threshold. Hence, the SodsZKP protocol can be useful in cases where the number of malicious participants may be beyond the $$t < \frac{n}{3}$$

threshold. The malicious participants may learn the witness but cannot fool a verifier by an incorrect ZKP due to the ZKP soundness insurance.

Secondly, a quantum-safe SodsZKP proof plays the role of a quantum-safe threshold signature. There is an important cryptographic challenge in designing a quantum-safe signature scheme. The non-interactive MPC-in-the-head-based ZKP protocol already has been adopted in quantum-safe normal, group, and ring signature schemes. These signature schemes are design for a single signer. However, multi-provers in SodsZKP can be regarded as multi-signers, which makes SodsZKP satisfy the requirement of a quantum-safe threshold signature scheme.

The present invention overviews how to instantiate the MPC-in-the-real SodsZKP from two MPC-in-the-head ZKP schemes. SodsZKP1 extends the preprocessing-based ZKP scheme KKW18 [1], while SodsZKP2 tries to generate a Shamir-secret-sharing-based Ligero [2] ZKP in an actual multi-party scenario.

SodsZKP1: Compiling the KKW18 Virtual-MPC-Based ZKP

A. Reviewing KKW18

KKW18 [1] is one of the state-of-the-art MPC-based ZKP protocols, which is based on the XOR secret sharing and can achieve a relatively small and concrete proof size. The most significant innovation of KKW18 lies in the inclusion of the preprocessing model in an MPC-in-the-head ZKP.

The procedure to generate a KKW18 proof is depicted in FIG. 1. A prover $\mathcal{P}$ would like to prove that it knows a witness @ satisfying a statement st under a relation defined by a circuit, i.e., $\mathcal{C}$(ω)=st, to a verifier $\mathcal{V}$. $\mathcal{P}$ will first prepare preprocessed values in M times of preprocessing phases, and correspondingly run M online phases utilizing the values in the M preprocessing phases. For one virtual execution, the results of all $n_{virtual}$ participants are arranged in two matrices for preprocessing and online, respectively. Each matrix has $n_{virtual}$ columns, in which one column represents the view of a virtual participant. Next, $\mathcal{P}$ will commit the matrices by Merkle trees and obtain Merkle roots. The roots are denoted for all M preprocessing and online matrices by $$h_1, \ldots, h_M \text{ and } h'_1, \ldots, h'_M,$$

respectively, and all sub-roots can be combined into two overall hash values, i.e., H=hash($h_1$, . . . , $h_M$ and $$H' = hash(h'_1, \ldots, h'_M).$$

These two hash values will be regarded as one of the sources of a Fiat-Shamir challenge combined with the statement that, st, the proof needs to prove, i.e., Cha=hash(H, H', st). Finally, according to the challenge, $\mathcal{P}$ selects M−1 preprocessing phases to reveal. For the unrevealed preprocessing phase, $\mathcal{P}$ also reveal the views of $n_{virtual}$−1 virtual participants, and the broadcast messages of the unrevealed virtual participant. In summary, the MPC-in-the-head KKW18 ZKP scheme [1] deploys the WRK17 MPC scheme [3] in the head of a prover. The WRK17 MPC scheme is XOR-secret-sharing-based in the preprocessing model, having a linear round complexity to the number of AND gates in a circuit, against n−1 ($n_{virtual}$−1 in our case) semi-honest participants. Hence, each virtual participant in a KKW18 ZKP proof will hold the shares of the preprocessing values for each input, output and AND gates (one AND gate requires two preprocessing values). In the online phase, each (virtual) participant will broadcast its share and reconstruct a masked value for each AND gate and each output gate. One KKW18 ZKP mainly includes (1) $n_{virtual}$ views of M−1 revealed preprocessing executions; (2) $n_{virtual}$−1 views of the one unrevealed preprocessing execution for all preprocessing values; (3) the remained view of the unrevealed preprocessing execution for all broadcast messages by this virtual participant in the online stage. All other circuit internal values could be computed by a verifier.

B. SodsZKP1 Overview

On the contrary, SodsZKP1 has a totally different working flow. In SodsZKP1, an original prover $\mathcal{P}$ will share a witness ω by a Shamir-based [4] and (t+1)-degree verifiable secret sharing (VSS) scheme to all actual participants. Step 1 in FIG. 2 reflects the secret-sharing results in which each participant holds a secret share vector for the witness ω. After secret sharing, at most t malicious participants do not learn any information about ω when n=3t+1 is not violated. We do not assign a specific secret scheme, while it is emphasized that the VSS scheme should be quantum-safe like a statistic information-theoretic secure scheme [5] or a computational scheme without relying on quantum-insecure components [6].

Next, participants start the ZKP generation procedure. As enlightened by the KKW18 [1] scheme, the SodsZKP1 participants will run actual and parallel M MPC executions to compute the shares of a ZKP $\pi$ for $\mathcal{C}(\omega)$=st. The work mainly lies in the blind computations for 2M matrices, i.e., Step 2 in FIG. 2. For this part, two approaches are proposed, that actual participants compute the ZKP matrices from preprocessed random (or pseudorandom) shares. The first method (random shares) keeps a relatively longer ZKP proof but it is more suitable for a relatively larger number of participants. While the second method (pseudorandom shares) cuts some internal values to trade off a relatively smaller proof size. However, preprocessing pseudorandom shares depends on a trust setup, which also renders a larger overhead when the number of actual participants is not small.

When the participants finish the generation of the 2M matrices, they can also reconstruct the output of the circuit $\mathcal{C}$ on the input of the shares of the witness $\omega$. If the output is not st, participants will abort since the prover offers an incorrect witness $\omega$ for the statement st.

As discussed before, a Fiat-Shamir-based non-interactive ZKP requires a challenge based on the committed result of computations. In a distributed environment, each participant can commit its own 2M matrices and agrees on all the roots from all participants, which proposes a consensus problem. In an asynchronous network, participants can agree on the roots from at least n-t participants [7] as an asynchronous consensus (Step 3 in FIG. 2). After the consensus, participants can calculate the same challenge based on the consensus roots (of the shared ZKP matrices) and the statement.

At the end, SodsZKP1 actual participants will reveal parts of the 2M matrices to generate the final ZKP shares. Then, a SodsZKP1 verifier will reconstruct an integrate ZKP from the ZKP shares, and verifies the ZKP validity (Step 4 and Step 5 in FIG. 2). The reconstructed SodsZKP1 is similar to a KKW18 [1] ZKP, which can be further distributed and verified by other verifiers (Step 6 in FIG. 2).

When constructing a SodsZKP1 proof from the KKW18 [1] scheme, the most advantage is to avoid the requirement to prove a quadratic constraint in an arithmetic circuit. KKW18 [1] was designed to prove logic computations. Especially in a logic circuit, preprocessing values can be verified without exposing the views of all $n_{virtual}$ participants. For one unrevealed MPC preprocessing and online execution, a ZKP reveals only n−1 preprocessing views, while the remained virtual participant reveals its broadcast messages. These two pieces of information can be combined to an integrated ZKP. However, compiling KKW18 to SodsZKP1 may suffer from an efficiency problem. XOR-secret-sharing is homomorphic for an XOR computation. But, an XOR or an AND computation is not homomorphic when using Shamir secret shares. Both XOR and AND gates require multiplication operations in a Shamir-secret-sharing-based MPC. Therefore, computing a KKW18-based matrix (in the SodsZKP actual distributed environment) may not be a non-negligible burden. Each XOR and AND gate one by one need to be evaluated.

SodsZKP2: Compiling the Ligero Virtual-MPC-Based ZKP

A. Reviewing the MPC-Based ZKP Protocol: Ligero

Ligero [2] is another MPC-based ZKP protocol based on Shamir secret sharing and can achieve sub-linear proof size. Compared with an additive or XOR-based secret sharing scheme, the Shamir secret sharing scheme equipped with an error correction method is easier to be deployed in an actual distributed network against malicious adversaries.

The construction of a Ligero-style proof is depicted in FIG. 3. According to the circuit addition and multiplication gates, $\mathcal{P}$ will encode the circuit interval values in sub-matrices $U_v$, $U_x$, $U_y$, $U_z$ as the different constraint requirements. $U_v$ is used to encode the linear constraints, while $U_x$, $U_y$, $U_z$ encode the quadratic constraints. In order to avoid information leakage in a proof I, $\mathcal{P}$ also prepare some random masking rows $$\vec{\gamma}^{v}_{mask}, \vec{\gamma}^{add}_{mask}, \vec{\gamma}^{x}_{mask}, \vec{\gamma}^{y}_{mask}, \vec{\gamma}^{z}_{mask}, \vec{\gamma}^{0}_{mask}$$

having different properties. These four matrices and six rows construct the final $(4m+6)\times n_{virtual}$ size matrix $U_{final}$. $\mathcal{P}$ commits the $n_{virtual}$ columns of $U_{final}$ in a Merkle tree having root Root. According to the Fiat-Shamir transformation, $\mathcal{P}$ sends a non-interactive proof $\pi$ consisting of Root, $t_{virtual}$ selected columns and their Merkle proofs toward Root, and some linear row transformation of $U_{final}$ for the linear and quadratic constraints for the circuit $\mathcal{P}$.

B. SodsZKP2 Overview

The main difference between SodsZKP1 and SodsZKP2 lies in the construction of a ZKP matrix (Step 2 in FIG. 2). While the following operations in SodsZKP2 as the matrix commitment are almost similar to the ones of SodsZKP1. Hence, in this subsection, it is mainly described how to generate a well-formatted Ligero-liked ZKP matrix.

Still, the delegation in SodsZKP2 starts when an original prover $\mathcal{P}$ shares a witness $\omega$ by a Shamir-based [4] and (t+1)-degree verifiable secret sharing (VSS) scheme to all participants. The participants run an actual MPC execution to compute $\mathcal{P}$ on the input of the shares of the witness $\omega$. Shamir-based [87] secret shares are linear homomorphic, so that a linear operation can be done locally for the shares [x] and [y], including addition [x+y]=[x]+[y] and scaler multiplication [rx]=r[x] for a constant r. For a multiplication gate, we follow the classical preprocessing MPC model, in which participant utilize the robustly preprocessed multiplication Beaver triple [a], [b], [c=ab] to reduce the degree. After reconstructing the masks [d]=[x]−[a] and [e]=[y]−[b], the shares for [xy] can be locally derived as [xy]=de+e[a]+d[b]+[c]. Finally, participants reconstruct the circuit output $\mathcal{C}(\omega)$. If st≠$\mathcal{C}(\omega)$, participants will abort since the prover offers an incorrect witness $\omega$ for the statement st.

After this actual circuit $\mathcal{C}$ MPC execution, participants first arrange the circuit input, output, and internal values in a vector $\vec{V}$. For the addition gates in $\mathcal{C}$, one can construct the ml×ml linear constraint matrix $P_{add}$ satisfying $P_{add}\cdot\vec{V}^T=\vec{0}$ and $|\vec{0}|$=ml. If the j-th gate in $\mathcal{C}$ is an addition gate, the linear constraint in $P_{add}$ ensures that the j-th entry of $\vec{0}$ is 0. Similarly, one can also construct the ml×ml matrices $P_x$, $P_y$ and $P_z$ such that $\vec{X}=P_x\cdot\vec{V}^T$, $\vec{Y}=P_y\cdot\vec{V}^T$, $\vec{Z}=P_z\cdot\vec{V}^T$, $\vec{X}\cdot\vec{Y}-\vec{Z}=\vec{0}$ and $|\vec{X}|=|\vec{Y}|=|\vec{Z}|=|\vec{0}|$=ml The vectors $\vec{V}$, $\vec{Z}$, $\vec{Y}$, $\vec{Z}$ can be further arranged in m×l-size matrices $P_v$, $P_z$, $P_y$, $P_z$. Each participant indeed holds the shares of the matrices. In the following sections, we will describe how to encode the matrices $P_v$, $P_x$, $P_y$, $P_z$ to $U_v$, $U_x$, $U_y$, $U_z$ when each participant only has the shares of $P_v$, $P_x$, $P_y$, $P_z$.

Constructing the Shares of the Packed Secret Sharing/Reed-Solomon Encoding Matrices The present invention first details how to generate the matrix $U_{final}$ in a distributed way, i.e., how to let honest participants hold the shares of $U_{final}$. In order to encode each l-length row of $P_v$ in (k−1)-degree, participants require extra (k−l) random points, and interpolate these k points to a (k−1)-degree encoding polynomial. In total, these m×(k−l) random points construct a matrix $R_v$. the i-th row, j-column point in $P_v$ and $R_y$ by $\{P\}_{ij}$ and $\{R\}_{ij}$, are denoted respectively. For the i-th row, the (k−1)-degree $$p_i^y(\cdot)$$

passes the k points as $$p_i^y(-k) = \{R\}_{i(k-l)}, \ldots , p_i^y(-(l+1)) = \{R\}_{i1},$$
$$p_i^y(-l) = \{P\}_{il}, \ldots , p_i^y(-1) = \{P\}_{i1}.$$

So that the i-th row of the encoding matrix $U_v$ has $n_{virtual}$-length, and $$p_i^y(1) = \{U\}_{i1}, \ldots , p_i^y(n_{virtual}) = \{U\}_{in_{virtual}}.$$

Still, participants handle this encoding job on the $[P_v]$ shares and the $[R_v]$ shares for the m rows of $[P_v]$. Here, $[R_v]$ is regarded as the preprocessed values generated in the preprocessing stage of the actual MPC. After the encoding, every participant will have the shares of the encoding polynomial $$p_i^y(\cdot)$$

for i ∈[1, m], and also have the shares of the encoded $m \times n_{virtual}$ matrix $U_v$ (i.e., $[U_v]$). These encoding operations can be done by Lagrange interpolation (linear operations). Hence, the shares of the $$p_i^y(\cdot)$$

coefficients and the $U_v$ shares are both kept in the (t+1) reconstruction threshold. Similarity, participants utilize the preprocessed random point matrix $R_x$, $R_y$, $R_z$ to encode $P_x$, $P_y$, $P_z$ to $U_x$, $U_y$, $U_z$ by (k−1)-degree polynomials $$p_i^x(\cdot), p_i^y(\cdot), p_i^z(\cdot)$$

for i ∈[1, m], respectively.

Constructing the Shares of the Masking Rows

To avoid the generated linear combination in the MPC-based proof to leak witness information, there is a need to construct some masking row to the encoding matrices. It is detailed how to generate the required six virtual-length rows $$\vec{\gamma}_{mask}^{v}, \vec{\gamma}_{mask}^{add}, \vec{\gamma}_{mask}^{0}, \vec{\gamma}_{mask}^{x}, \vec{\gamma}_{mask}^{y}, \vec{\gamma}_{mask}^{z}$$

from the six $l_{virtual}$-length rows $$\vec{u}_{mask}^{v}, \vec{u}_{mask}^{add}, \vec{u}_{mask}^{0}, \vec{u}_{mask}^{x}, \vec{u}_{mask}^{y}, \vec{u}_{mask}^{z},$$

respectively.

The preprocessing random point rows and the masking rows are summarized in FIG. 5. From the value requirement, the entries of rows $$\vec{u}_{mask}^{add}, \vec{u}_{mask}^{x}, \vec{u}_{mask}^{y}, \vec{u}_{mask}^{z}$$

should be zero-sum and the entries of row $$\vec{u}_{mask}^{0}$$

should be zero. These rows can be also preprocessed in the preprocessing stage, so that every participant has the shares of these rows.

From the degree requirement, the encoding polynomial $$p_{mask}^{v}(\bullet)$$

should be (k−1)-degree, $$p_{mask}^{0}(\bullet)$$

should be (2k−2)-degree, and $$p_{mask}^{add}(\bullet), p_{mask}^{x}(\bullet), p_{mask}^{y}(\bullet), p_{mask}^{z}(\bullet)$$

should be (k+l−1)-degree. Hence, one have to prepare extra preprocessing random points for these encoding polynomials. For $$p_{mask}^{v}(\bullet),$$

the preprocessed row $\overleftarrow{\text{row}_v}$ has the length of k−l. For $$p_{mask}^{0}(\bullet),$$

the preprocessed row $\overleftarrow{\text{row}_0}$ consists of (2k−1−1) entries. While for $$p_{mask}^{add}(\bullet), p_{mask}^{x}(\bullet), p_{mask}^{y}(\bullet), p_{mask}^{z}(\bullet),$$

the length of the preprocessed rows $\mathcal{B}_{c\_part_i}$, $\mathcal{B}_{c\_part_i}$, $\mathcal{B}$, and $\mathcal{B}$ are k.

Constructing the Matrix Row Transformations for the Linear PCP Verifications

In order to support the circuit constraint verifications, one needs to further construct the linear combination of the encoding matrix, i.e., the matrix row transformations. Compared with the original Ligero scheme, each participant in SodsZKP2 now hold a share of the matrix $U_{final}$.

Each participant first utilizing the public statement st to construct the pseudo random source as the non-interactive version of Ligero [2], i.e., seed=hash(st) and hash is a cryptographic hash function. Based on seed, each participant can locally generate six pseudo random vectors including 4m-length vector $\vec{r}$, ml-length vectors $\vec{r}_{add}$, $\vec{r}_x$, $\vec{r}_y$, $\vec{r}_z$, and m-length vector $\vec{r}_q$. For simplifying the description, we only use the shared secret value to represent each equation. In practice, each actual participant has shares of these secrets.

For the ml-length vector $$\left(\vec{r}_{add}\right)\cdot P_{add},$$

participants further construct a (l−1)-degree polynomial $$p_{r,1}^{add}(\cdot)$$

in the first l entires of $(\vec{r}_{add})\cdot P_{add}$, and these l points lie in $$p_{r,1}^{add}(-l), \ldots, p_{r,1}^{add}(1).$$

So on and so forth, participants construct m polynomials $$p_{r,i}^{add}(\cdot)$$

for i ∈[1,m]. Similarly, participants construct 2m polynomials $$p_{r,i}^{x}(\cdot),\ p_{r,i}^{y}(\cdot),\ \text{and}\ p_{r,i}^{z}(\cdot)$$

for i ∈[1,2m] in (l−1)-degree, by interpolating the corresponding l points of $(\vec{r}_x)\cdot[I_{ml}|-P_x]$, $(\vec{r}_y)\cdot[I_{ml}|-P_y]$, and $(\vec{r}_z)\cdot[I_{ml}|—P_z]$, respectively.[12]

After that, participants prepare an $n_{virtual}$-length vector $$\vec{v}_{code} = \vec{r}\cdot U + \vec{\gamma}_{mask}^{v}$$

for the interleave code verification. For the addition constraints, participants prepare a (k+l−2)-degree polynomial $$q_{add}(\bullet) = p_{mask}^{add}(\bullet) + \sum_{i=1}^{m} p_{r,i}^{add}(\bullet)\cdot p_i^{y}(\bullet).$$

For the quadratic constraints, participants still need to offer the linear verification for the sequence multiple gates. Hence, participants prepare $$q_x(\bullet) = p_{mask}^{x}(\bullet) + \sum_{i=1}^{m} p_{r,i}^{x}(\bullet)\cdot p_i^{x}(\bullet) + \sum_{i=m+1}^{2m} p_{r,i}^{x}(\bullet)\cdot p_{i-m}^{y}(\bullet),$$

$$q_y(\bullet) = p_{mask}^{y}(\bullet) + \sum_{i=1}^{m} p_{r,i}^{y}(\bullet)\cdot p_i^{y}(\bullet) + \sum_{i=m+1}^{2m} p_{r,i}^{y}(\bullet)\cdot p_{i-m}^{y}(\bullet),$$

$$q_z(\bullet) = p_{mask}^{z}(\bullet) + \sum_{i=1}^{m} p_{r,i}^{z}(\bullet)\cdot p_i^{z}(\bullet) + \sum_{i=m+1}^{2m} p_{r,i}^{z}(\bullet)\cdot p_{i-m}^{y}(\bullet),$$

$$q_0(\bullet) = p_{mask}^{0}(\bullet) + \sum_{i=1}^{m} \vec{r}_q\cdot\left(p_i^{x}(\bullet)\cdot p_i^{y}(\bullet) - p_i^{z}(\bullet)\right).$$

C. Advantage and Disadvantage

The largest advantage of the SodsZKP2 is that SodsZKP2 keeps the Shamir-secret-sharing scheme as same as Ligero [2]. Hence, the generation of a ZKP matrix can be easily achieved since the generation can be based on preprocessed random numbers and linear operations over Shamir-secret-sharing shares.

However, a Ligero ZKP has some row transformations based on a ZKP matrix. These row transformations include some polynomial multiplication requirements for each encoding row polynomial in the matrix. These requirements also may yield an efficiency problem for SodsZKP2. When each polynomial coefficients are in a secret-share form, the multiplication of two polynomial renders a large degree reduction overhead. Especially, the soundness error of a Ligero ZKP requires the degree of an encoding polynomial and the number of encoding polynomials to be large, which further amplifies the degree reduction overhead.

SodsZKP is a quantum-safe ZKP protocol supporting delegated multi-provers. Two approaches were instantiated to extend the previous MPC-in-the-head ZKP schemes to MPC-in-the-real ZKP protocols, i.e., SodsZKP1 and SodsZKP2. Each approach has benefits above the other one.

In the upcoming quantum computing era, SodsZKP, combined with SodsBC [8] and SodsMPC [9], consists of a set of complimenting quantum-safe cryptographic and distributed computing tools, which may form building blocks of the future Internet. The future Internet will surely serve distributed ledgers (by SodsBC [8]), smart contracts (by SodsMPC [9]) and trusted proofs (by SodzZKP) activities. Obviously, all services should be based on post-quantum (quantum-safe) cryptography tools.

Multi-Arbitrators and Self-Stabilization in Blockchain

A way to cope with the limited threshold of malicious participants during the execution in SodsBC, and recover from scenarios in which the threshold is violated is to have a commitment on randomization used by the founders in the genesis block in the blockchain.

A way to cope with a contract weakness in Blockchain contracts is to use heterogonous contract languages and implementations this can be also applied to SodsMPC. The fact that the contract is executed by the participants of the Blockchain eliminates the single of point's failure problem. Yet, each contract and the software it is written in (e.g. Solidity of Etherium, Plutus of Cardano), may have flaws.

The present invention proposes using multi-heterogeneous-Blockchain infrastructure, each running the contract written in its language, so that at least a threshold of the contract will decide correctly. Each contract will be associated with a portion, such as, secret share element in secret sharing scheme of a resource, say Bitcoin code that will be revealed to the proper side, upon decision. Hence, transferring resources according to the decisions of a threshold of the participants.

Self-Stabilization is obtained by using randomized consensus over selected participants that are chosen according to commitments. Commitments are done in the genesis block on secret shared of random numbers using Merkle trees and listing the roots of the Merkle trees to be used possibly stored in unmutable read only memory with (future) timing to be used information.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

REFERENCES

[1] Ittai Abraham, Dahlia Malkhi, and Alexander Spiegelman. Asymptotically optimal validated asynchronous byzantine agreement. In *PODC* 2019, pages 337-346.

[2] Michael Backes, Aniket Kate, and Arpita Patra. Computational verifiable secret sharing revisited. In *ASIACRYPT* 2011, pages 590-609.

[3] Joonsang Baek and Yuliang Zheng. Simple and efficient threshold cryptosystem from the gap diffie-hellman group. In *GLOBECOM* 2003, pages 1491-1495.

[4] Donald Beaver. Efficient multiparty protocols using circuit randomization. In *CRYPTO* 1991, pages 420-432.

[5] Zuzana Beerliová-Trub13053'fniová and Martin Hirt. Simple and efficient perfectly-secure asynchronous MPC. In *ASIACRYPT* 2007, pages 376-392.

[6] Michael Ben-Or, Boaz Kelmer, and Tal Rabin. Asynchronous secure computations with optimal resilience. In *PODC* 1994, pages 183-192.

[7] Alexandra Boldyreva. Threshold signatures, multisignatures and blind signatures based on the gap-diffie-hellman-group signature scheme. In *PKC* 2003, pages 31-46.

[8] Gabriel Bracha. Asynchronous byzantine agreement protocols. *Inf. Comput.,* 75(2):130-143, 1987.

[9] Johannes A. Buchmann, Erik Dahmen, and Andreas Hülsing. XMSS-A practical forward secure signature scheme based on minimal security assumptions. In PQCrypto 2011, pages 117-129.

[10] Christian Cachin, Klaus Kursawe, Frank Petzold, and Victor Shoup. Secure and efficient asynchronous broadcast protocols. In *CRYPTO* 2001, pages 524-541.

[11] Christian Cachin, Klaus Kursawe, and Victor Shoup. Random oracles in constantinople: Practical asynchronous byzantine agreement using cryptography. J. *Cryptology,* 18(3):219-246, 2005.

[12] Christian Cachin and Stefano Tessaro. Asynchronous veriable information dispersal. In *SRDS* 2005, pages 191-202.

[13] Miguel Castro and Barbara Liskov. Practical byzantine fault tolerance. In *OSDI* 1999, pages 173-186.

[14] Roberto Cortiñas, Felix C. Freiling, Marjan Ghajar-Azadanlou, Alberto Lafuente, Mikel Larrea, Lucia Draque Penso, and Iratxe Soraluze Arriola. Secure failure detection and consensus in trustedpals. *IEEE Trans. Dependable Secur. Comput.,* 9(4):610-625, 2012.

[15] Daniele Cozzo and Nigel P. Smart. Sharing the LUOV: threshold post-quantum signatures. In *IMACC* 2019, pages 128-153.

[16] Jintai Ding and Dieter Schmidt. Rainbow, a new multivariable polynomial signature scheme. In *ACNS* 2005, pages 164-175.

[17] Shlomi Dolev and Ziyu Wang. Sodsbc: Stream of distributed secrets for quantum-safe blockchain. In *IEEE Blockchain* 2020, pages 247-256.

[18] Sisi Duan, Michael K. Reiter, and Haibin Zhang. BEAT: asynchronous BFT made practical. In *CCS* 2018, pages 2028-2041.

[19] Tiago M. Fernández-Carames and Paula Fraga-Lamas. Towards post-quantum blockchain: A review on blockchain cryptography resistant to quantum computing attacks. *IEEE Access,* 8:21091-21116, 2020.

[20] Roy Friedman, Achour Mostefaoui, and Michel Raynal. Simple and efficient oracle-based consensus protocols for asynchronous byzantine systems. *IEEE Trans. Dependable Secur. Comput.,* 2(1):46-56, 2005.

[21] Adam Gagol, Damian Lesniak, Damian Straszak, and Michal Swietek. Aleph: Efficient atomic broadcast in asynchronous networks with byzantine nodes. In *AFT* 2019, pages 214-228.

[22] Vlad Gheorghiu, Sergey Gorbunov, Michele Mosca, and Bill Munson. Quantum proofing the blockchain. Technical report, 2017.

[23] Garth R. Goodson, Jay J. Wylie, Gregory R. Ganger, and Michael K. Reiter. Efficient byzantine-tolerant erasure-coded storage. In *DSN* 2004, pages 135-144.

[24] Lov K. Grover. A fast quantum mechanical algorithm for database search. In *STOC* 1996, pages 212-219.

[25] Bingyong Guo, Zhenliang Lu, Qiang Tang, Jing Xu, and Zhenfeng Zhang. Dumbo: Faster asynchronous BFT protocols. In *CCS* 2020, pages 803-818.

[26] James Hendricks, Gregory R. Ganger, and Michael K. Reiter. Verifying distributed erasure-coded data. In *PODC* 2007, pages 139-146.

[27] Andreas Hülsing. WOTS+-shorter signatures for hash-based signature schemes. Cryptology ePrint Archive, Report 2017/965.

[28] Beno13053'ft Libert, Marc Joye, and Moti Yung. Born and raised distributively: Fully distributed non-interactive adaptively-secure threshold signatures with short shares. *Theor. Comput. Sci.,* 645:1-24, 2016.

[29] Chao Liu, Sisi Duan, and Haibin Zhang. EPIC: efficient asynchronous BFT with adaptive security. In *DSN* 2020, pages 437-451.

[30] Yizhong Liu, Jianwei Liu, Qianhong Wu, Hui Yu, Yiming Hei, and Ziyu Zhou. SSHC: A secure and scalable hybrid consensus protocol for sharding blockchains with a formal security framework. *IEEE Trans. Dependable Secur. Comput,* 2020.

[31] Julian Loss and Tal Moran. Combining asynchronous and synchronous byzantine agreement: The best of both worlds. *Cryptology ePrint Archive, Report* 2018/235.

[32] Yuan Lu, Zhenliang Lu, Qiang Tang, and Guiling Wang. Dumbo-mvba: Optimal multi-valued validated asynchronous byzantine agreement, revisited. In *PODC* 2020, pages 129-138.

[33] Jean-Philippe Martin and Lorenzo Alvisi. Fast byzantine consensus. *IEEE Trans. Dependable Secur. Comput.,* 3(3):202-215, 2006.

[34] Andrew Miller, Yu Xia, Kyle Croman, Elaine Shi, and Dawn Song. The honey badger of BFT protocols. In *CCS* 2016, pages 31-42.

[35] Andrew Miller. Bug in aba protocolx€™s use of common coin 59. Online Forum, 2018. https://github.com/amiller/HoneyBadgerBFT/issues/59.

[36] Achour Mostefaoui, Moumen Hamouma, and Michel Raynal. Signature-free asynchronous byzantine consensus with t 2<n/3 and o($n^2$) messages. In *PODC* 2014, pages 2-9.

[37] Rafael Pass and Elaine Shi. Thunderella: Blockchains with optimistic instant confirmation. In *EUROCRYPT* 2018, pages 3-33.

[38] John Proos and Christof Zalka. Shor's discrete logarithm quantum algorithm for elliptic curves. *Quantum Inf. Comput.,* 3(4):317-344, 2003.

[39] Ruping Shen, Hong Xiang, Xin Zhang, Bin Cai, and Tao Xiang. Application and implementation of multivariate public key cryptosystem in blockchain (short paper). In *CollaborateCom* 2019, pages 419-428.

[40] Peter W. Shor. Algorithms for quantum computation: Discrete logarithms and factoring. In *FOCS* 1994, pages 124-134, 1994.

[41] Victor Shoup and Rosario Gennaro. Securing threshold cryptosystems against chosen ciphertext attack. In *EUROCRYPT* 1998, pages 1-16.

[42] Chrysoula Stathakopoulou, Tudor David, and Marko Vukolic. Mir-BFT: High-throughput BFT for blockchains. ARXIV 1906.05552, 2019.

[43] The Praxxis Team. Praxxis techical report. Technical report, 2019. https://praxxis.io/technical-paper.

[44] Maofan Yin, Dahlia Malkhi, Michael K. Reiter, Guy Golan-Gueta, and Ittai Abraham. Hotstuff: BFT consensus with linearity and responsiveness. In *PODC* 2019, pages 347-356.

[45] Ittai Abraham, Benny Pinkas, and Avishay Yanai. Blinder: MPC based scalable and robust anonymous committed broadcast. IACR ePrint 2020.248.

[46] Hillel Avni, Shlomi Dolev, Niv Gilboa, and Ximing Li. SSSDB: database with private information search. In *ALGOCLOUD* 2015, pages 49-61, 2015.

[47] Michael Backes, Aniket Kate, and Arpita Patra. Computational verifiable secret sharing revisited. In *ASIACRYPT* 2011, pages 590-609.

[48] Donald Beaver. Efficient multiparty protocols using circuit randomization. In *CRYPTO* 1991, pages 420-432.

[49] Zuzana Beerliova-Trub13̂053'fniovâ and Martin Hirt. Perfectly-secure MPC with linear communication complexity. In *TCC* 2008, pages 213-230.

[50] Michael Ben-Or, Boaz Kelmer, and Tal Rabin. Asynchronous secure computations with optimal resilience (extended abstract). In *PODC* 1994, pages 183-192.

[51] Eli Ben-Sasson, Alessandro Chiesa, Christina Garman, Matthew Green, lan Miers, Eran Tromer, and Madars Virza. Zerocash: Decentralized anonymous payments from bitcoin. In *S&P* 2014, pages 459-474.

[52] Nir Bitansky, Alessandro Chiesa, Yuval Ishai, Rafail Ostrovsky, and Omer Paneth. Succinct non-interactive arguments via linear interactive proofs. In *TCC* 2013, pages 315-333.

[53] Dor Bitan and Shlomi Dolev. Optimal-round preprocessing-mpc via polynomial representation and distributed random matrix (extended abstract). IACR ePrint 2019.1024.

[54] Sean Bowe, Alessandro Chiesa, Matthew Green, lan Miers, Pratyush Mishra, and Howard Wu. ZEXE: enabling decentralized private computation. In *S&P* 2020, pages 947-964.

[55] Gabriel Bracha. Asynchronous byzantine agreement protocols. *Inf. Comput.,* 75(2):130-143, 1987.

[56] Benedikt Bünz, Shashank Agrawal, Mahdi Zamani, and Dan Boneh. Zether: Towards privacy in a smart contract world. In *FC* 2020, pages 423-443.

[57] Vitalik Buterin. Ethereum whitepaper, 2013. https://github.com/ethereum/wiki/wiki/White-Paper.

[58] Christian Cachin, Klaus Kursawe, Anna Lysyanskaya, and Reto Strobl. Asynchronous verifiable secret sharing and proactive cryptosystems. In *CCS* 2002, pages 88-97.

[59] Raymond Cheng, Fan Zhang, Jernej Kos, Warren He, Nicholas Hynes, Noah M. Johnson, Ari Juels, Andrew Miller, and Dawn Song. Ekiden: A platform for confidentiality-preserving, trustworthy, and performant smart contracts. In *EuroS&P* 2019, pages 185-200.

[60] Koji Chida, Daniel Genkin, Koki Hamada, Dai Ikarashi, Ryo Kikuchi, Yehuda Lindell, and Ariel Nof. Fast large-scale honest-majority MPC for malicious adversaries. In *CRYPTO* 2018, pages 34-64.

[61] Ashish Choudhury, Martin Hirt, and Arpita Patra. Asynchronous multiparty computation with linear communication complexity. In *DISC* 2013, pages 388-402.

[62] Ivan Damgård, Matthias Fitzi, Eike Kiltz, Jesper Buus Nielsen, and Tomas Toft. Unconditionally secure constant-rounds multi-party computation for equality, comparison, bits and exponentiation. In *TCC* 2006, pages 285-304.

[63] Ivan Damgård and Jesper Buus Nielsen. Scalable and unconditionally secure multiparty computation. In *CRYPTO* 2007, pages 572-590.

[64] Shlomi Dolev, Karim Eldefrawy, Juan A. Garay, Muni Venkateswarlu Kumaramangalam, Rafail Ostrovsky, and Moti Yung. Brief announcement: Secure self-stabilizing computation. In *PODC* 2017, pages 415-417.

[65] Shlomi Dolev, Juan A. Garay, Niv Gilboa, Vladimir Kolesnikov, and Muni Venkateswarlu Kumaramangalam. Perennial secure multi-party computation of universal turing machine. *Theor. Comput. Sci.,* 769:43-62, 2019.

[66] Shlomi Dolev, Niv Gilboa, and Ximing Li. Accumulating automata and cascaded equations automata for communicationless information theoretically secure multi-party computation. *Theor. Comput. Sci.,* 795:81-99, 2019.

[67] Shlomi Dolev and Yin Li. Secret shared random access machine. In *ALGOCLOUD* 2015, pages 19-34, 2015.

[68] Shlomi Dolev and Ziyu Wang. SodsBC: Stream of distributed secrets for quantum-safe blockchain. *IACR ePrint* 2020.205.

[69] Sisi Duan, Michael K. Reiter, and Haibin Zhang. BEAT: asynchronous BFT made practical. In *Proceedings of the* 2018 *ACM SIGSAC Conference on Computer and Communications Security, CCS* 2018, pages 2028-2041, 2018.

[70] Andreas Hülsing. WOTS+−shorter signatures for hash-based signature schemes. *IACR Cryptology ePrint Archive,* 2017:965, 2017.

[71] Marc Jansen, Farouk Hdhili, Ramy Gouiaa, and Ziyaad Qasem. Do smart contract languages need to be turing complete? *In Blockchain* 2019, pages 19-26.

[72] Harry A. Kalodner, Steven Goldfeder, Xiaoqi Chen, S. Matthew Weinberg, and Edward W. Felten. Arbitrum: Scalable, private smart contracts. In *USENIX Security* 2018, pages 1353-1370.

[73] Aniket Kate, Andrew K. Miller, and Tom Yurek. Brief note: Asynchronous verifiable secret sharing with optimal resilience and linear amortized overhead. Arxiv 1902.06095, 2019.

[74] Ahmed E. Kosba, Andrew Miller, Elaine Shi, Zikai Wen, and Charalampos Papamanthou. Hawk: The blockchain model of cryptography and privacy-preserving smart contracts. In S&P 2016, pages 839-858.

[75] Donghang Lu, Thomas Yurek, Samarth Kulshreshtha, Rahul Govind, Aniket Kate, and Andrew K. Miller. Honeybadgermpc and asynchromix: Practical asynchronous MPC and its application to anonymous communication. In *CCS* 2019, pages 887-903.
[76] Anastasia Mavridou and Aron Laszka. Designing secure ethereum smart contracts: A finite state machine based approach. In *FC* 2018, pages 523-540.
[77] Andrew Miller, Yu Xia, Kyle Croman, Elaine Shi, and Dawn Song. The honey badger of BFT protocols. In *CCS* 2016, pages 31-42.
[78] Achour Mostéfaoui, Moumen Hamouma, and Michel Raynal. Signature-free asynchronous byzantine consensus with t 2<n/3 and o(n $^{2}$) messages. In PODC 2014, pages 2-9.
[79] Torben P. Pedersen. Non-interactive and information-theoretic secure verifiable secret sharing. In *CRYPTO* 1991, pages 129-140.
[80] Ethereum community. Common patterns, 2018. https://solidity.readthedocs.io/en/v0.4.24/common-patterns.html.
[81] Adi Shamir. How to share a secret. *Commun. ACM,* 22(11):612-613, 1979.
[82] Joachm von zur Gathen and Gadiel Seroussi. Boolean circuits versus arithmetic circuits. *Inf. Comput.,* 91(1): 142-154, 1991.
[83] Guy Zyskind, Oz Nathan, and Alex Pentland. Enigma: Decentralized computation platform with guaranteed privacy. *Arxiv* 1506.03471, 2015.
[84] J. Katz, V. Kolesnikov, and X. Wang, "Improved non-interactive zero knowledge with applications to post-quantum signatures," in CCS 2018, pp. 525-537.
[85] S. Ames, C. Hazay, Y. Ishai, and M. Venkitasubramaniam, "Ligero: Lightweight sublinear arguments without a trusted setup," in CCS 2017, pp. 2087-2104.
[86] X. Wang, S. Ranellucci, and J. Katz, "Authenticated garbling and efficient maliciously secure two-party computation," in CCS 2017, pp. 21-37.
[87] A. Shamir, "How to share a secret," Commun. ACM, vol. 22, no. 11, pp. 612-613, 1979.
[88] A. Choudhury, M. Hirt, and A. Patra, "Asynchronous multiparty computation with linear communication complexity," in DISC 2013, 2013, pp. 388-402.
[89] M. Backes, A. Kate, and A. Patra, "Computational verifiable secret sharing revisited," in ASIACRYPT 2011, pp. 590-609.
[90] M. Ben-Or, B. Kelmer, and T. Rabin, "Asynchronous secure computations with optimal resilience (extended abstract)," in PODC 1994, pp. 183-192.
[91] S. Dolev and Z. Wang, "SodsBC: Stream of distributed secrets for quantum-safe blockchain," in IACR Cryptol. ePrint Arch. 2020/205, 2020.
[92] S. Dolev and Ziyu Wang, "SodsMPC: Fsm based anonymous and private quantum-safe smart contracts," Manuscript, 2020.

APPENDIX A—ASYNCHRONOUS WEAK VERIFIABLE SECRET SHARING (AWVSS)

The motivation of a VSS scheme is to detect the malicious behavior of a dealer if it shares a secret under a higher reconstruction threshold than the one it claims. Some classical schemes achieve this motivation in a sharing stage, as the strong commitment property of a VSS scheme. A weak commitment VSS scheme delays the detection to a reconstruction stage [2], and consistently sets a shared secret to a default value when the dealer is dishonest.

The asynchronous weak VSS (awVSS) scheme that is being used follows this weak commitment property and works in an asynchronous network. Secret sharing may be complex in an asynchronous n=3f+1 environment. Due to the fact that an asynchronous adversary may delay the message delivery for an unlimited time in a sharing stage, only 2f+1 confirmation messages can be relied upon, since f of 2f+1 may be malicious. At most f honest participants may not express their opinions about the dealer. In the reconstruction stage, only 2f+1 received shares are relied upon, and also at most f may be incorrect.

Therefore, a Merkle branch proof is accompanied to each share, i.e., a hash-based cross checksum [23], and the Merkle root is distributed as a reliable-broadcast style (all-or-nothing) simultaneously, as a secret-sharing stage. Eventually, all honest participants will deliver the same Merkle root, which ensures that the following reconstruction stage only recovers one consistent secret or consistently sets the secret to default. The proposed awVSS scheme satisfies the secrecy, share agreement, share liveness, and weak commitment (reconstruction correctness) properties.

The reconstruction correctness property of the proposed awVSS scheme relies on the previous sharing stage termination, i.e., an honest participant should hold a well-distributed Merkle root and continue to execute the secret reconstruction. Hence, the awVSS sharing are always arranged before a consensus and the shared secret are reconstructed after the consensus, which consistently finalizes the secret sharing and ensures the eventual Merkle tree root delivery. If a participant completes a consensus without delivering the root temporarily, this participant should temporarily store a received share, and return to the reconstruction until waiting for the root delivery.

The proposed awVSS is the SodsBC/SodsBC++ basis, which shares AES keys for the censorship-resilient consensus (sharing symmetric keys before a consensus and recovering the keys after this round consensus) and shares distributed secrets for common random coins (sharing secrets before a consensus and the secrets for coins are recoverable after the next round consensus).

In Algorithm 4, the first Sharing step asks a dealer $p_{dealer}$ to insert a secret s in the free item of a random f-degree polynomial F(x), i.e., F(0)=s. $p_{dealer}$ regards all n shares as Merkle tree leaves rendering Root. $p_{dealer}$ sends a share $[s]_i$=F(i), Root, and the corresponding Merkle tree proofs, $branch_i$ to $p_i$. In Echo and Ready, participants verify if receiving the same Merkle root as in an RBC protocol. Hence, if the dealer is honest, every participant delivers a share and a consistent Merkle tree root. If the dealer is malicious and a condition (such as the same 2f+1 Echo messages) is not satisfied, then an awVSS for sharing a secret will not be finished. Moreover, Algorithm 10 only ensures the share deliver from at least f+1 honest participants, while all 2f+1 honest participants eventually deliver an identical Merkle root.

According to the proposed design, there are two Merkle tree checks during a reconstruction stage. Before interpolation, i.e., when receiving each share from another participant, a participant will use the previous delivered Merkle root to verify this received share, so that this participant can locate f+1 correct shares. Since a malicious dealer may distribute the shares under a t'>f+1 reconstructed threshold, honest participants may reconstruct inconsistent secrets without the second Merkle tree check. Hence, it is required that each participant to re-construct a Merkle tree from the n reconstructed shares, and compare the consistency of the re-construct Merkle root with the delivered root. Honest participants will not deliver a reconstructed secret and set the secret to default unless the second check passes.

Algorithm 4:
Asynchronous Weak Verifiable Secret Sharing (awVSS) [22] for $p_i \in \mathcal{P}$.

// Sharing stage. (A finite field encompasses some elements covering $p_i$, s and the F(x) coefficients.
A share $[s]_i = F(p_i)$ satisfies $branch_i$ having Root.)
Sharing: // (for $p_{dealer}$ and its secret s)
1: Generate an f-degree random polynomial F(x) with $F(0) = s$, make a Merkle tree from $F(p_1), \ldots, F(p_n)$, and send ⟨sharing, $[s]_i$, branch⟩ to $\forall p_i \in \mathcal{P}$.
Echo:
2: Upon receiving a ⟨sharing, $[s]_i$, $branch_i$⟩ message, extract Root from $branch_i$ and echo ⟨echo, Root⟩, if $branch_i$ satisfies $[s]_i$.
3: Upon receiving n − f echo messages having Root, broadcast ⟨ready, Root⟩.
Ready:
4: Upon receiving f + 1 ready messages having Root, broadcast ⟨ready, Root⟩ if not yet broadcast a ready.
5: Upon receiving n − f ready messages having Root, deliver Root; also deliver $[s]_i$ and $branch_i$ received in sharing, if $[s]_i$ and $branch_i$ satisfy Root.
// Reconstructing stage
Reconstruction-send:
6: Broadcast ⟨reconstruct, $[s]_i$, $branch_i$⟩, if have delivered $[s]_i$ and $branch_i$.
Reconstruction-receive:
7: Upon receiving a ⟨reconstruct, $[s]_j$, $branch_j$⟩, disregard this message if $branch_j$ does not have Root, or $branch_j$ does not satisfy $[s]_j$.
8: Upon receiving f + 1 reconstruct having Root and correct shares, reconstruct s' and all shares $F'(p_1), \ldots, F'(p_n)$. If $F'(p_1), \ldots, F'(p_n)$ lead to Root' = Root, set s ← s'; otherwise, s ← 0.

Theorem 3 Algorithm 4 is an awVSS Scheme.

The distribution of Root is in an identical way as the algorithm in Bracha's RBC [8], which ensures the root agreement and totality.

Share agreement: Assume an honest participant p delivers a share [s] corresponding to Root while another honest p' delivers [s'] corresponding to Root'. This assumption renders a contradiction which violets the root agreement.

Share liveness: If an honest participant $p_i$ delivers a share [s] ¿ with a corresponding Merkle root, Root, then $p_i$ must already receive 2f+1 ready messages having Root. Among these messages, at least f+1 honest participants sent ready messages. For these f+1 honest participants, they must already receive 2f+1 echo messages having Root. Similarly, there are at least f+1 echo messages among them being sent by honest participants. These f+1 honest participants receive a correct share and a Merkle branch accessing to Root, from the dealer, which renders the share liveness. If the dealer is malicious, it is possible that at most f honest participants may not receive their corresponding shares. But these f honest participants still deliver Root eventually.

Weak commitment: Assume two honest participants p and p' reconstruct two different secrets, i.e., s #s', respectively. If p obtains s, then p must deliver a Merkle root, Root previously, which satisfies the n shares of the secret s. In a similar way, p' reconstructs s', which means p' delivers another Root' corresponding to the n shares of the secret s'. This is a contradiction to the root agreement argument. Hence, s=s' must be satisfied.

Moreover, assume an honest participant p reconstruct a secret s but another honest participant p' sets the secret to a default value, e.g., s'←0. p reconstructs s, which means that p re-builds a new Merkle tree root after reconstruction and this new root equals to the previous delivered one, i.e., Root=$Root_{previous}$. If p' sets s'←0, then p' must re-built another Merkle tree root unequal to the previous delivered one, i.e., Root'≠$Root_{previous}$. These two arguments lead to Root #Root', which is also a contradiction violating the root agreement.

APPENDIX B—EXISTING ALGORITHM DETAILS

Bracha's broadcast protocol [8] is the first RBC protocol which makes sure the all-or-nothing style. The state-of-the-art RBC protocol originates from Cachin and Tessaro [12] utilizing the Reed-Solomon erasure coding, in order to decrease the $O(n^2)$ overhead for the all-to-all echoing. Miller et al. additionally assign hash Merkle tree cross checksum (Algorithm 5) to achieve the $O(|msg|n+\lambda n^2 \log n)$ communication overhead.

The widely used asynchronous BBA protocol is instantiated by Mostéfaoui et al. [36], which is signature-free and can terminate in constant (specifically, four) rounds (Algorithm 6). The original BBA protocol design [36] requires a refinement considering an imperfect common random coin scheme (a perfect coin source does not involve interaction).

Algorithm 5:
Reliable Broadcast (RBC) [12, 34] for $p_i \in P$ ($Branch_i$ corresponds to $\mathcal{D}_i$ having Root.)
Broadcast: // (for $p_{broadcaster}$ and a message msg)
1: (t = f + 1, n)-RS encode msg to $\{\mathcal{D}_1, \ldots, \mathcal{D}_n\}$ constructing a Merkle tree having Root and send ⟨broadcast, $\mathcal{D}_i$, $Branch_i$⟩ to $\forall p_i \in \mathcal{P}$.
Echo:
2: Upon receiving ⟨broadcast, $\mathcal{D}_i$, $Branch_i$⟩, broadcast⟨echo, $\mathcal{D}_i$, $Branch_i$⟩ if $Branch_i$ corresponds to $\mathcal{D}_i$.
3: Upon receiving ⟨echo, $\mathcal{D}_i$, $Branch_i$⟩, disregard it if $Branch_i$ does not correspond to $\mathcal{D}_i$.
4: Upon receiving n − f echo messages having Root, decode msg from f + 1 echo messages and get all n codewords leading to Root', and broadcast ⟨ready, Root⟩ if Root' = Root; otherwise abort.
Ready:
5: Upon receiving f + 1 messages having Root, broadcast ⟨ready, Root⟩ if do not broadcast ready yet.
6: Upon receiving n − f messages having Root, deliver msg if finish decoding in Echo; use Root to wait for f + 1 correct echo messages, and obtain msg.

Algorithm 6:
Binary Byzantine Agreement (BBA) [18] with the revision from [19] for $p_i \in P$ round ← 0. Set $estValue_{round} = estValue_0$ = resRBC (0: unfinished, 1: finished).
1: repeat
2: Broadcast $estValue_{round}$; sets $\{estValue_{round}\}$ ← [ ].
3: Upon receiving f + 1 $estValue_{round}$, broadcast $estValue_{round}$ if $estValue_{round}$ is not broadcast.
4: Upon receiving 2f + 1 $estValue_{round}$, set $\{estValue_{round}\} \leftarrow \{estValue_{round}\} \cup estValue_{round}$.
5: Upon $\{estValue_{round} \neq \emptyset$, broadcast $auxValue_{round}$ where $auxValue_{round} \in \{estValue_{round}\}$.
6: Upon receiving at least n − f $auxValue_{round}$ values constructing $\{auxValue_{round}\}$ which satisfies $\{auxValue_{round}\} \subseteq \{estValue_{round}\}$, broadcast $\{estValue_{round}\}$.
7: Upon receiving at least n − f $\{estValue_{round}\}_j$ sets, $p_i$ computes a union of the receive sets as $\{confValue_{round}\} = \cup_j \{estValue_{round}\}_j$.
8: $p_i$ calls a coin, rc = CommonRandomCoin( ).

-continued

Algorithm 6:
Binary Byzantine Agreement (BBA) [18] with the revision from [19] for $p_i \in P$

```
if |{confValue_round}| = 1 then
   if confValue_round = rc then
      return rc.
   else
      estValue_round+1 ← confValue_round.
else
   est_round+1 ← rc.
round ← round + 1.
until return
```

APPENDIX C: AN ANONYMOUS AND PRIVATE CONTRACT AUCTION EXAMPLE

We use an N=3 blind auction as an example to explain SodsMPC, Algorithm 14. Alice, Bob, and Carol would like to run a blind auction to buy from a seller. Business logic privacy: They do not want others (except Alice, Bob, and Carol) to know what logic they use, i.e., find the greatest input among the three inputs.

Data privacy: They do not want others (include each other) to know the bid value except for the actual paying price.

Anonymity: They want to keep the anonymity of the winner. The contract is deployed by one of the clients, e.g., Alice. After negotiating with Bob and Carol, Alice deploys all polynomial coefficients by t+1-threshold qsAVSS secret sharing. At least n−t servers will reveal the Merkle tree root of all the polynomial coefficient shares. Next, Alice communicates with Bob and Carol, to convince them that the contract is well-deployed. After everybody satisfies the deployment, all three clients deposit transactions.

We follow the Bitcoin transaction construction but replace the quantum-sensitive ECDSA scheme by a quantum-safe and hash-based signature scheme like $WOTS^+$[26]. A client signs the transaction content (value and payee) under the input public key rendering a signature sig. The money will be paid to the payee's public key address, add. FIG. 13 depicts the three deposit transactions.

Then, three clients offer their bids and the refund addresses in the secret-shared form. After receiving the input, n servers run the "mixing-then-contract" MPC for the three secret-shared bids. Our mixing program breaks the linkage of the MPC input/output order, which avoids the malicious servers to learn the exact identity of a refund account address. The mixed N bids in a new order, are the actual inputs to the FSM-based contract MPC program.

Figure 18:
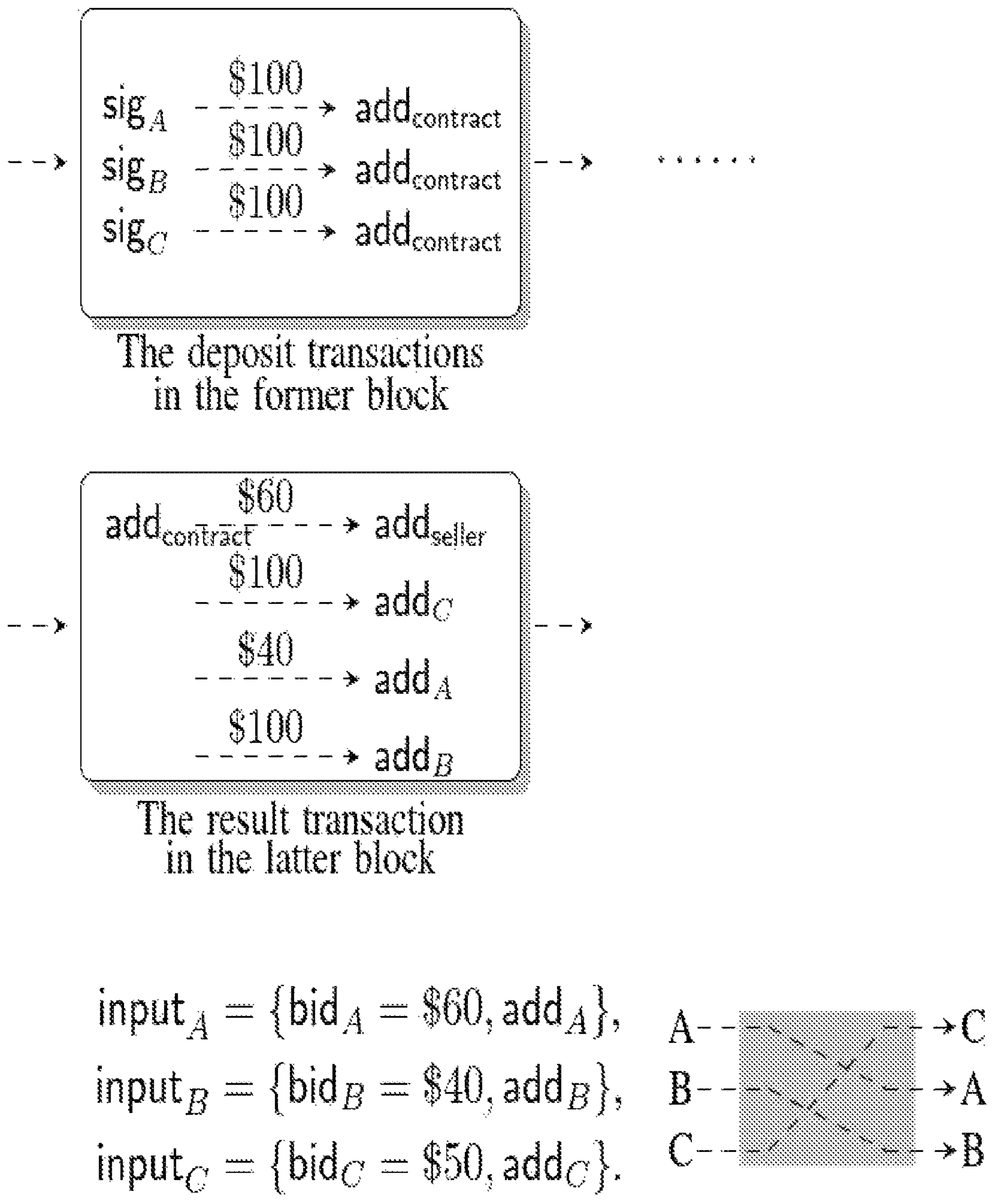
FIG. 18 shows the deposit/result transactions and the secret inputs.
Figure 19:
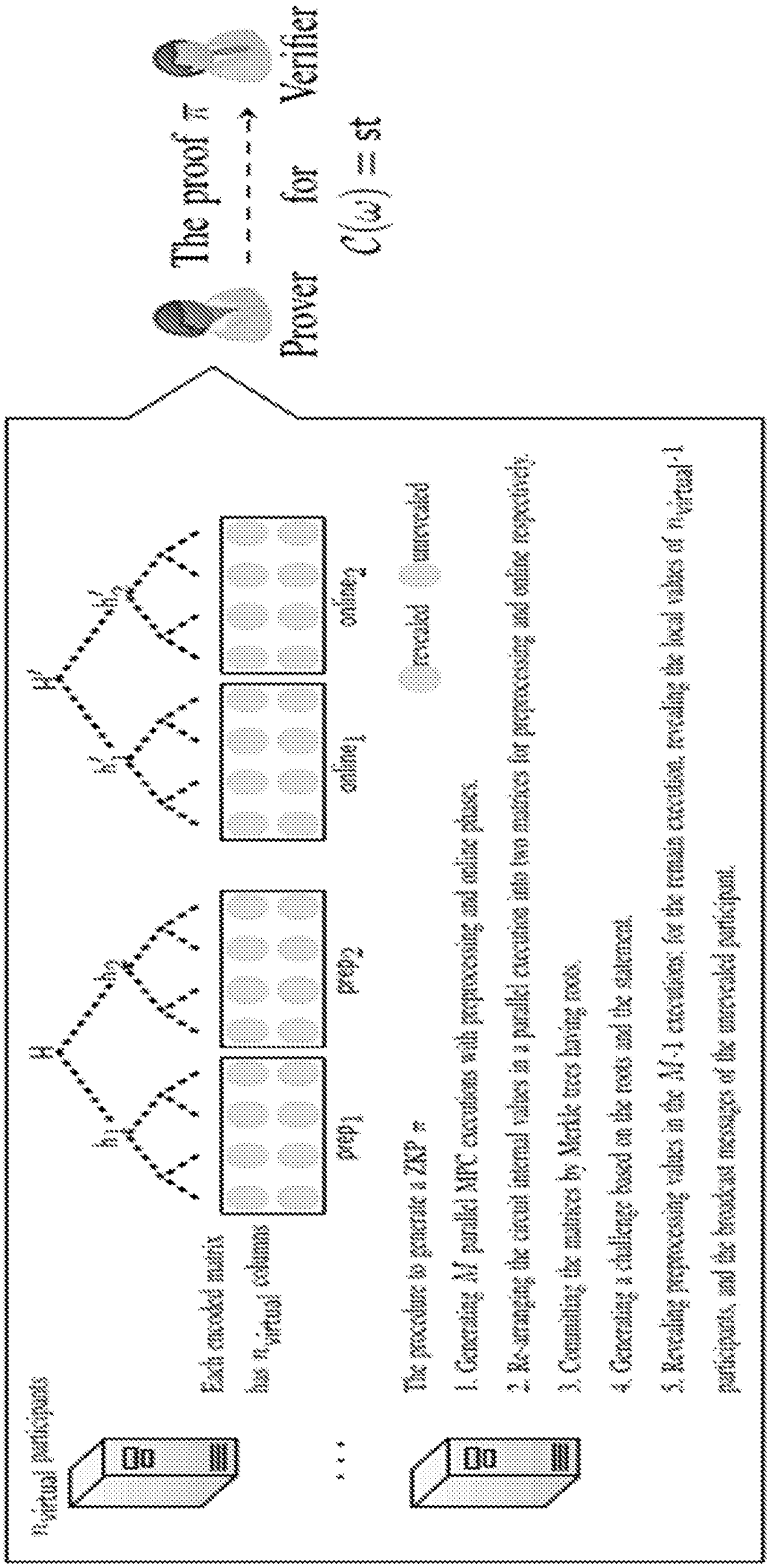
FIG. 19 schematically illustrates the MPC-in-the-head ZKP construction (KKW18 [1] scheme)
Figure 20:
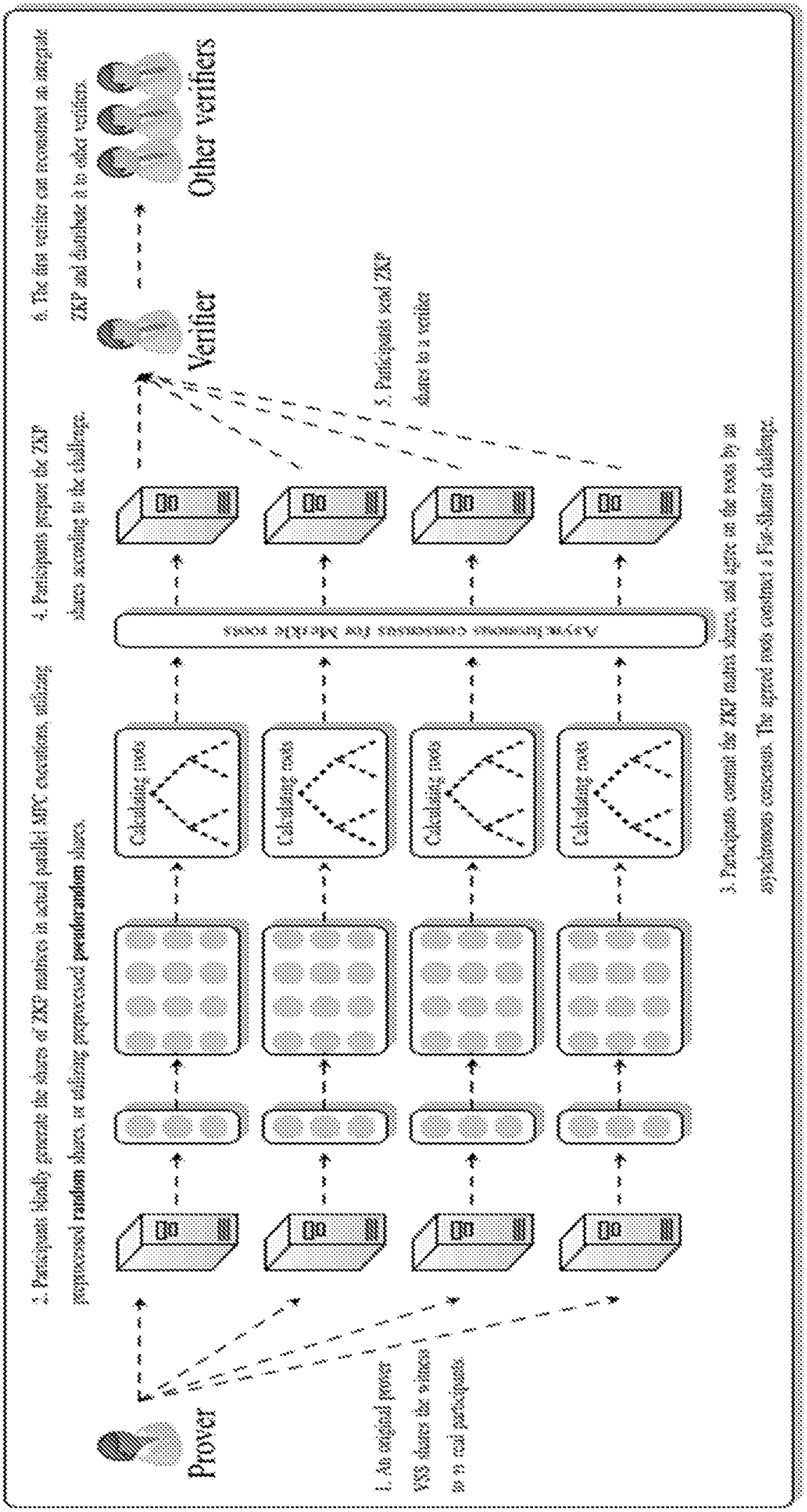
FIG. 20 schematically illustrates SodsZKP1 overview: generating ZKP shares in actual MPC executions (MPC-in-the-real)
Figure 21:
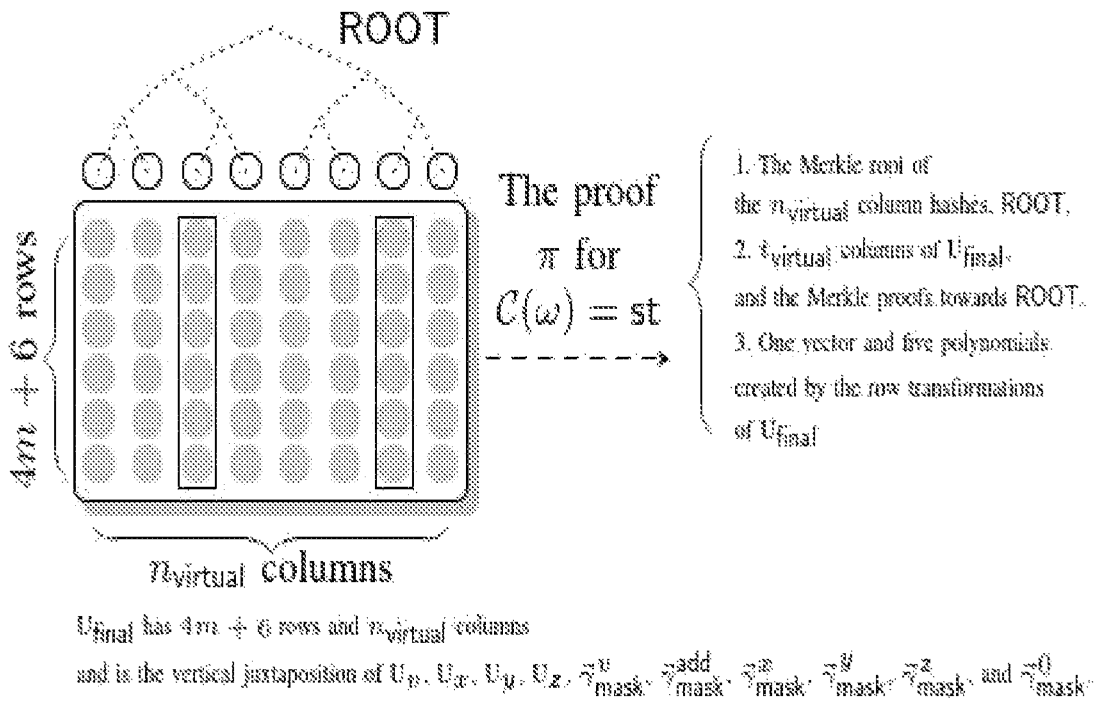
FIG. 21 schematically illustrates the Ligero [2] ZKP construction.
Figure 22:
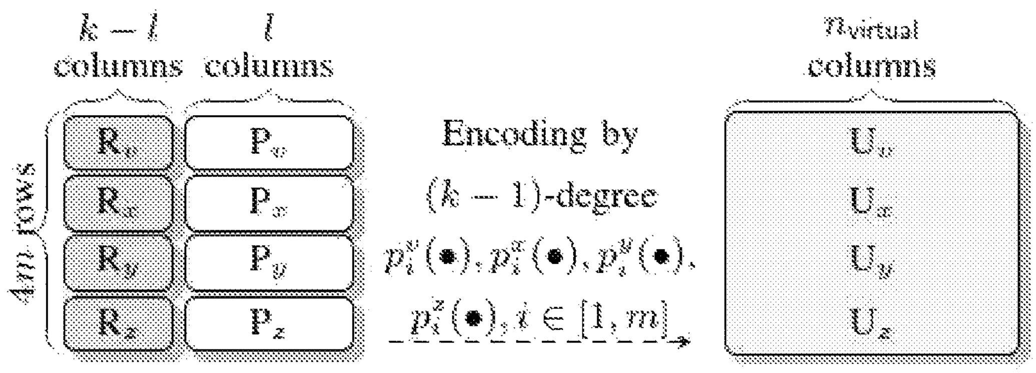
FIG. 22 schematically illustrates a given preprocessed random point matrix $R_v$, $R_x$, $R_y$, $R_z$, participants can encode the shares of $P_v$, $P_x$, $P_y$, $P_z$ to the shares of $U_v$, $U_x$, $U_y$, $U_z$ by $$p_i^v(\bullet)(p_i^x(\bullet),\ p_i^y(\bullet),\ p_i^z(\bullet),$$

For this three-bid auction (Algorithm 14), the contract invocates two FSM-based comparators. The first comparator compares the first two bids (after mixing) and outputs the larger input, while the second comparator compares the previous larger input with the third (after mixing) input and outputs the larger one, which is the largest bid (the auction winner). The mixed integer bids have to be converted to binary for comparison, and the program would convert them back to integer after two FSM-based comparators. Finally, the servers output the auction result (the result transaction in FIG. 18) in which Alice pays $60 to the seller and withdraws $40, and Bob and Carol both withdraw $100. The output payment is not a standard Bitcoin transaction with a payer signature. However, this MPC output cannot be modified (forged) by malicious servers, because of the MPC correctness.

From the final output, only Alice knows that she wins. Bob or Carol does not know who the winner is (only know the winner is not himself/herself). The other bids keep secret against other blockchain observers and the (at most)

$$t < \frac{n}{3}$$

malicious servers who execute the contract MPC program.

Algorithm 9:
SodsMPC Blind Auction Example (// Omit the contract deployment.)
Deposit: Every client $C_j$ (Alice, Bob, and Carol) sends a transaction having the $100 deposit money to the contract address $add_{contract}$.
Secret input: Every client $C_j$ secret-shares $input_j$ by qsAVSS (Algorithm 7). $input_j = \{bid_j, add_j\}$ includes a secret bid $bid_j$ and a refund address $add_j$.
Input consensus: Every server $S_i$ reliable broadcasts its input view $Input_i$ having several inputs. Utilizing n BBAs to finalize n RBCs, the ACS outputs the common subset of the input views, leading to the agreed $Input = \{input_A, input_B, input_C\}$.
MPC online:
1. Servers mix the secret bits $\{input_A, input_B, input_C\}$ by MPCMix (Algorithm 2) and obtain the shares of the random permutation $\pi(input_A, input_B, input_C)$. Assume $\pi(input_A, input_B, input_C) = \{input_C, input_A, input_B\}$.
2. Servers run the MPC for the contract FSM by inputting $\{input_C, input_A, input_B\}$.
(1) Compare $bid_C$ and $bid_A$ in the first $binComp_2$, and output the larger one $bid_1$.
(2) Compare $bid_1$ and $bid_B$ in the second $binComp_2$, and output the larger one $bid_2$.
3. Servers reconstruct $bid_2$ = $60 and $add_2 = add_A$, and the refund addresses in the mixed order $\{add_C, add_A, add_B\}$, and then put a transaction on the blockchain, which outputs $bid_2$ to $add_{seller}$, outputs $100-$bid_2$ = $40 to the related address $add_2 = add_A$, and outputs $100 to $add_C$ and $add_B$.

Everybody (except for the client himself/herself) cannot link the refund addresses ($add_C$, $add_A$, $add_B$) with the input signatures ($sig_A$, $sig_B$, $sig_C$), which keeps the winner anonymous. The business logic (i.e., the auction) also keeps secret to all but the three clients. The only known fact is that a $60 payment from an unknown payer is paid to the seller.

APPENDIX D: PARALLEL FSM EXECUTION: TOURNAMENT SORTING

The usefulness of the parallel FSM execution is illustrated, where several FSM state transitions can be done concurrently on different (sub) set of inputs. This technique allows us to share batches of inputs and outputs in their secret share form, and the shared outputs can serve as inputs to the next parallel FSM to process.

A concrete example is a blind sorting of N distinct inputs spending O(NlogN) time units and $O(N^2)$ blind comparisons. One time unit is the time overhead for a l-bit comparison. l is the length of the prime finite field $\mathbb{F}_p$, $l=[\log_2 p]$.

The sorting is based on the tournament structure, in which pairs (the first two, the third and fourth, and so on) of the original inputs are blindly compared. The greater value among each pair can be blindly chosen by a 2-condition comparison FSM (similar to $binComp_2$ in Sect. 4.2, but in different encoding), by blindly multiplying the inputs with the resulting state, one input by (blind) zero and the other by blind one. Thus, the first parallel FSM step output is (approximately, as N can be odd) the half inputs, i.e., the half that won over their pairs. In turn, these outputs are partitioned into new pairs. Next, the procedure repeats to find the N/4 winners among the pairs of winners. This iterative process repeats itself for logN times to blindly get the first largest value.

The first largest value is then stored in the first place of an output array, which will be blindly compared with each entry of the original N inputs. Whenever it is an equality, the original input is blindly set to zero, as a preparation for finding the second largest.

After that, a new (blind) tournament with logN time units is executed resulting in the second largest value, which is assigned to the second place of the output array. Again the second largest value will be compared with every input and sets the appearance of it to be zero, as a preparation for the third parallel tournament execution. Finally, the output array is filled with new values one by one until it reaches the N-th value. Thus, the sorting costs O(NlogN) time units in total.

In each time unit, the program consumes O(N) blind comparisons. We spend $$\frac{N}{2}$$

parallel comparisons in the beginning layer of one tournament, and the second layer costs $$\frac{N}{4}$$

parallel comparisons, and so on. In there are N blind comparisons for zeroing the found (current) greatest in the input array, as a preparation for finding the next greatest. Thus, the total number of comparisons is $$\frac{N}{2} + \frac{N}{4} + \ldots + 2 + N = O(N)$$

parallel comparisons in one tournament. Hence, N tournaments consume $O(N^2)$ parallel comparisons in total.

The invention claimed is:

1. A method for performing real-time post-quantum secure computation of a digital transaction, by a plurality of distributed participants being permissioned verification servers that are connected over data communication channels, resulting in the generation of an asynchronous blockchain consensus protocol, comprising:

a) creating common randomization to all of said participants which remains unrevealed until being used by said participants, by:

a.1) assigning to each participant a unique polynomial having a maximal degree being common to all participants;

a.2) allowing each participant to select a random value;

a.3) allowing each participant to send his selected random value to all other participants over data communication channels using a secret sharing scheme based on points on his unique polynomial, such that said secret hides the details of said random value and all other participants that receive shares of said selected random value over said data communication channels will not be able to reconstruct said selected random value from the received shares;

b) creating a secret sharing pool of all shares of all participants;

c) building a post-quantum secure asynchronous consensus of honest participants, in rounds, by sharing, using shares of said pool, Secure Hashing Algorithm (SHA) and Advanced Encryption Standard (AES) symmetric keys between participants over said data communication channels before each consensus round and recovering said keys after each consensus round, wherein multiple participants jointly perform consensus building rounds to compute the outcome, while keeping their private inputs confidential;

d) using said asynchronous consensus to add shares to said pool by creating a random global value from said secret sharing pool by selecting t+1 secret shared random values suggested by distinct t+1 participants, where at least one of said secret shared random values is produced by a non-Byzantine participant;

e) during each consensus round, generating common random coins for which a consensus has been obtained, from shares belonging to at least one honest participant in said consensus round, and locking new created coins by a post-quantum secure asynchronous Byzantine Fault Tolerance (aBFT)-based blockchain consensus protocol, while the consensus itself provides the consensus ability on transactions in Block(s) for said aBFT protocol; and f) at the end of each consensus round, validating said transaction using the locked common random coin and revealing the secret to all participants.

2. A method according to claim 1, further comprising generating consensus for additional extra coins.

3. A method according to claim 1, wherein each participant generates a coin for obtaining a consensus.

4. A method according to claim 1, wherein the agreement for the pool utilizes the aBFT protocol used for locking the common randomization.

5. A method according to claim 1, wherein the selected random value is "0" or "1".

6. A method according to claim 1, further comprising generating a nested hash value from a previous committed block in the blockchain and generating a new nested hash value for future Provable Reliable BroadCast (PRBC).

7. A method according to claim 6, further comprising dividing an original transaction into two successive transactions by performing a commit and unlock process, by:

a) generating a committed transaction that commits a payment to a payee with an encrypted pad;

b) generating an unlock transaction to open a committed transaction by decrypting said pad and prove the ownership of a user by revealing the secret of the money source.

8. A method according to claim 1, wherein a participant launches the following instances:

a) a block part RBC proposal using AES encryption; and b) secretly sharing a transaction using an Asynchronous Weak Verifiable Secret Sharing (awVSS) invocation for future binary Byzantine agreement (BBA) coins.

9. A method according to claim 1, further comprising using a permissionless blockchain for providing a dynamic consensus committee member selection by:

a) providing a list containing—size committee members being the current online participant candidates, based on an agreed upon criteria;

b) providing transactions rights to other members, based on said agreed upon criteria;

c) during a current epoch being the time period in which one committee dominates the blockchain, allowing the current-size committee to select the new-size committee and wait for new participants to complete a bootstrap process, where until then, said current committee handles over the right to create blocks to said new committee; and d) after the selections:

d.1) allowing the current participants to write the selection results to said blockchain;

d.2) allowing the new participants to start creating end-to-end private and authenticated connections between every two participants.

10. A method according to claim 9, wherein the agreed upon criteria is a proof a stack.

11. A method according to claim 9, wherein the public information of one participant consists of its IP address and its public key of a hash-based post-quantum secure signature.

12. A method according to claim 9, wherein the choice of any two Previously Presented participants is not correlated, to thereby ensures uniform selection across all participants.

13. A method according to claim 9, wherein commitments are done in the genesis block of the blockchain on secret shared of random numbers, using Merkle trees and listing the roots of the Merkle trees to be used.

14. A method for performing real-time post-quantum secure execution of smart contracts using online Multi-Party Computation (MPC), comprising:

a) representing said contract as a Final State Machine (FSM) having hidden logic;

b) assigning one of the contract clients to be the contract creator;

c) allowing said contract creator to share, over data communication channels, all coefficients of a blind polynomial with secret-shared coefficients, said blind polynomial representing state transition of said FSM and having a maximal degree being common to all contract clients;

d) using MPC to compute said blind polynomial, to obtain contract business logic privacy of said contract;

e) allowing said contract creator to create a transaction including the Merkle tree roots of all the coefficient shares;

f) after at least servers verify said transaction, putting said transaction in a blockchain;

g) allowing said contract creator to communicate with other contract clients for the actual polynomials and for the shares distributed by said contract creator, to verify to each contract clients the coefficient share roots;

h) allowing said other contract clients to decide whether to join the contract created by said contract creator;

i) executing said contract by allowing said clients to interact, over said data communication channels, for several rounds to complete execution and to deposit money to the contract address and offer their secret inputs to an MPC program using secret sharing;

j) mixing the secret inputs before executing the contract logic to hide the permutation relation between the contract inputs and the outputs; and k) keeping the integer secret shares form for the mixed inputs according to the requirement of an actual contract, or convert the inputs to binary representation on demand.

15. A method according to claim 14, further comprising:

a) using a multi-heterogeneous-blockchains, each of which running the contract written in its language, such that at least a threshold of the contract will decide correctly;

b) associating each contract with a portion of a resource that will be revealed to the proper side, upon decision; and c) transferring resources according to the decisions of a threshold of the participants.

16. A method according to claim 15, wherein the portion of a resource is selected from the group of:

a secret share element in secret sharing scheme of a resource;

a Bitcoin code.

17. A system for performing real-time post-quantum secure computation of a digital transaction using in an asynchronous blockchain consensus protocol, comprising:

a) a plurality of permissioned verification servers being a plurality of distributed participants that are adapted to:

b) create common randomization to all of said participants which remains unrevealed until being used by said participants, by:

b.1) assigning to each participant a unique polynomial having a maximal degree being common to all participants;

b.2) allowing each participant to select a random value;

b.3) allowing each participant to send his selected random value to all other participants, over data communication channels, using a secret sharing scheme based on points on his unique polynomial, such that said secret hides the details of said selected random value and all other participants that receive shares of said selected random value, over said data communication channels, will not be able to reconstruct said selected random value from the received shares;

c) create a pool of all shares of all participants;

d) build a post-quantum secure asynchronous consensus of honest participants, in rounds, by sharing symmetric keys using shares of said pool, Secure Hashing Algorithm (SHA) and Advanced Encryption Standard (AES) between participants over said data communication channels, before each consensus round and recovering said keys after each consensus round, wherein multiple participants jointly perform consensus building rounds to compute the outcome, while keeping their private inputs confidential;

e) during each consensus round, generate common random coins for which a consensus has been obtained, from shares belonging to at least one honest participant in said consensus round, and locking new created coins by a post-quantum secure asynchronous Byzantine Fault Tolerance (aBFT)-based blockchain consensus protocol, while the consensus itself provides the consensus ability on transactions in Block(s) for said aBFT protocol; and f) at the end of each consensus round, validate said transaction using the locked common random coin and revealing the secret to all participants.

18. A system for performing real-time post-quantum secure execution of smart contracts using online Multi-Party Computation (MPC), comprising a plurality of permissioned verification servers being adapted to:

a) represent said contract as a Final State Machine (FSM) having hidden logic;

b) assign one of the N contract clients to be the contract creator;

c) allow said contract creator to share over data communication channels all coefficients of a blind polynomial with secret-shared coefficients, said blind polynomial representing state transition of said FSM and having a maximal degree being common to all contract clients;

d) perform MPC to compute said blind polynomial, to obtain contract business logic privacy of said contract;

e) allow said contract creator to create a transaction including the Merkle tree roots of all the coefficient shares;

f) after at least n-t servers verify said transaction, put said transaction in a blockchain;

g) allow said contract creator to communicate with other N−1 contract clients for the actual polynomials and for the shares distributed by said contract creator, to verify to each contract clients the coefficient share roots;

h) allow said other N−1 contract clients to decide whether to join the contract created by said contract creator;

i) execute said contract by allowing said N clients to interact, over said data communication channels, for several rounds to complete execution and to deposit money to the contract address and offer their secret inputs to an MPC program using secret sharing;

j) mix the secret inputs before executing the contract logic to hide the permutation relation between the contract inputs and the outputs; and k) keep the integer secret shares form for the mixed inputs according to the requirement of an actual contract, or convert the inputs to binary representation on demand, wherein multiple participants jointly perform several rounds of interaction to compute the outcome of a contract while keeping their private inputs confidential.

19. A system for performing real-time post-quantum secure computation of a digital transaction using a Zero-Knowledge Proof (ZKP), by a plurality of distributed participants being a plurality of permissioned verification servers that are adapted to:

a) allow an original prover P to share a witness ω and (t+1)-degree Verifiable Secret Sharing (VSS) scheme to all actual participants, such that at the end of secret sharing, at most t malicious participants do not learn any information about @ when n=3t+1 is not violated;

b) allow all participants to run actual and parallel M MPC executions to compute the shares of a ZKP by blind computations for 2M matrices that actual participants compute the ZKP matrices from preprocessed random shares;

c) upon completing the generation of the 2M matrices by said participants, reconstruct the output of the circuit on the input of the shares of the witness ω;

d) if the output is not a correct statement and the prover offers an incorrect witness ω for said statement, allow participants to abort;

e) allow each participant to commit his 2M matrices and agree on all the roots from at least n−t participants as an asynchronous consensus;

f) after obtaining said asynchronous consensus, allow participants to make computations, based on the consensus roots of the shared ZKP matrices and said statement;

g) allow actual participants to reveal parts of the 2M matrices to generate the final ZKP shares; and h) allow a verifier to reconstruct an integrate ZKP from the ZKP shares and verify the ZKP validity.

20. A method for continuously generating a pool of post-quantum secure common random coins for executing a digital transaction, by a plurality of distributed participants being verification servers that are connected over data communication channels, comprising:

a) creating common randomization to all of said participants which remains unrevealed until being used by said participants, by allowing each participant to select a random value and to send his selected random value to all other participants using a secret sharing scheme;

b) creating a pool of all shares of all participants;

c) building a post-quantum secure asynchronous consensus of participants, in rounds, while during each round, using shares of said pool, Secure Hashing Algorithm (SHA) and Advanced Encryption Standard (AES) to continuously generate from shares belonging to at least one honest participant in said round, common random coins, d) using said asynchronous consensus to add shares to said pool by creating a random global value from said secret sharing pool by selecting t+1 secret shared random values suggested by distinct t+1 participants, where at least one of said secret shared random values is produced by a non-Byzantine participant; and e) using said asynchronous consensus to obtain an agreement among said participants on the current content of said pool, for generated common random coins required for the next asynchronous consensus round.

* * * * *